United States Patent
Matloff

(10) Patent No.: US 9,878,258 B2
(45) Date of Patent: Jan. 30, 2018

(54) REVERSE PROPULSION AERIAL GAMING SYSTEMS, METHODS, AND DEVICES

(71) Applicant: ROOFTOP GROUP INTERNATIONAL PTE. LTD., Singapore (SG)

(72) Inventor: Darren Scott Matloff, Austin, TX (US)

(73) Assignee: ROOFTOP GROUP INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 15/455,683

(22) Filed: Mar. 10, 2017

(65) Prior Publication Data
US 2017/0259183 A1    Sep. 14, 2017

Related U.S. Application Data

(60) Provisional application No. 62/307,342, filed on Mar. 11, 2016, provisional application No. 62/362,569, (Continued)

(51) Int. Cl.
*A63H 27/00*    (2006.01)
*B64C 27/08*    (2006.01)
(Continued)

(52) U.S. Cl.
CPC ............. *A63H 27/12* (2013.01); *A63H 27/00* (2013.01); *B64C 27/08* (2013.01); *B64C 27/14* (2013.01);
(Continued)

(58) Field of Classification Search
CPC ...... A63H 27/00; A63H 27/004; A63H 27/04; A63H 27/02; A63H 27/06; A63H 27/008; A63H 27/12; A63H 27/14
See application file for complete search history.

(56) References Cited

U.S. PATENT DOCUMENTS

2002/0106966 A1* 8/2002 Jimenez ............... A63H 27/004
                                                         446/454
2010/0301168 A1* 12/2010 Raposo ................. A63H 23/00
                                                         244/171.2
(Continued)

FOREIGN PATENT DOCUMENTS

CN           205055411      3/2016
WO     WO 2015/060515 A1    4/2015

OTHER PUBLICATIONS

International Search Report and Written Opinion in International Patent Application No. PCT/US2017/021932, dated Jun. 23, 2017, in 18 pages.

*Primary Examiner* — Damon Pierce
(74) *Attorney, Agent, or Firm* — Knobbe Martens Olson & Bear LLP

(57) ABSTRACT

An optical-based aerial gaming system comprises: a multi-rotor unmanned flying device comprising: a main body; a plurality of propulsion units, a wireless receiver configured to receive data via radio communication; a wireless transmitter configured to send data via radio communication; one or more light generators configured to project laser or infrared light from the unmanned flying device; and one or more light sensors configured to detect laser or infrared light projected by a separate unmanned flying device; and a remote control unit comprising: a wireless transmitter configured to send data via radio communication; and a wireless receiver configured to receive data via radio communication, wherein the unmanned flying device is configured to transmit to the remote control unit, using the wireless transmitter of the unmanned flying device, at least a portion of encoded data of the detected laser or infrared light.

19 Claims, 33 Drawing Sheets

Related U.S. Application Data filed on Jul. 14, 2016, provisional application No. 62/362,570, filed on Jul. 14, 2016, provisional application No. 62/362,565, filed on Jul. 14, 2016, provisional application No. 62/362,562, filed on Jul. 14, 2016, provisional application No. 62/362,547, filed on Jul. 14, 2016, provisional application No. 62/362,555, filed on Jul. 14, 2016, provisional application No. 62/362,563, filed on Jul. 14, 2016, provisional application No. 62/362,568, filed on Jul. 14, 2016.

(51) Int. Cl.
*B64C 27/14* (2006.01)
*B64C 39/02* (2006.01)
*F41A 33/02* (2006.01)
*G08C 17/02* (2006.01)
*G08C 23/04* (2006.01)

(52) U.S. Cl.
CPC ............ *B64C 39/024* (2013.01); *F41A 33/02* (2013.01); *G08C 17/02* (2013.01); *G08C 23/04* (2013.01); *B64C 2201/024* (2013.01); *B64C 2201/042* (2013.01); *B64C 2201/108* (2013.01); *B64C 2201/12* (2013.01); *B64C 2201/146* (2013.01); *B64C 2201/165* (2013.01); *B64C 2203/00* (2013.01)

(56) References Cited

U.S. PATENT DOCUMENTS

| | | | |
|---|---|---|---|
| 2014/0099853 A1* | 4/2014 | Condon | A63H 30/04 446/37 |
| 2014/0100037 A1* | 4/2014 | Condon | A63H 30/04 463/40 |
| 2014/0263823 A1* | 9/2014 | Wang | B64C 39/028 244/17.23 |
| 2015/0283459 A1 | 10/2015 | Condon et al. | |
| 2016/0008709 A1 | 1/2016 | Pai | |
| 2016/0016652 A1* | 1/2016 | Barrett | B64C 25/06 244/15 |
| 2016/0023744 A1 | 1/2016 | Wang et al. | |

* cited by examiner

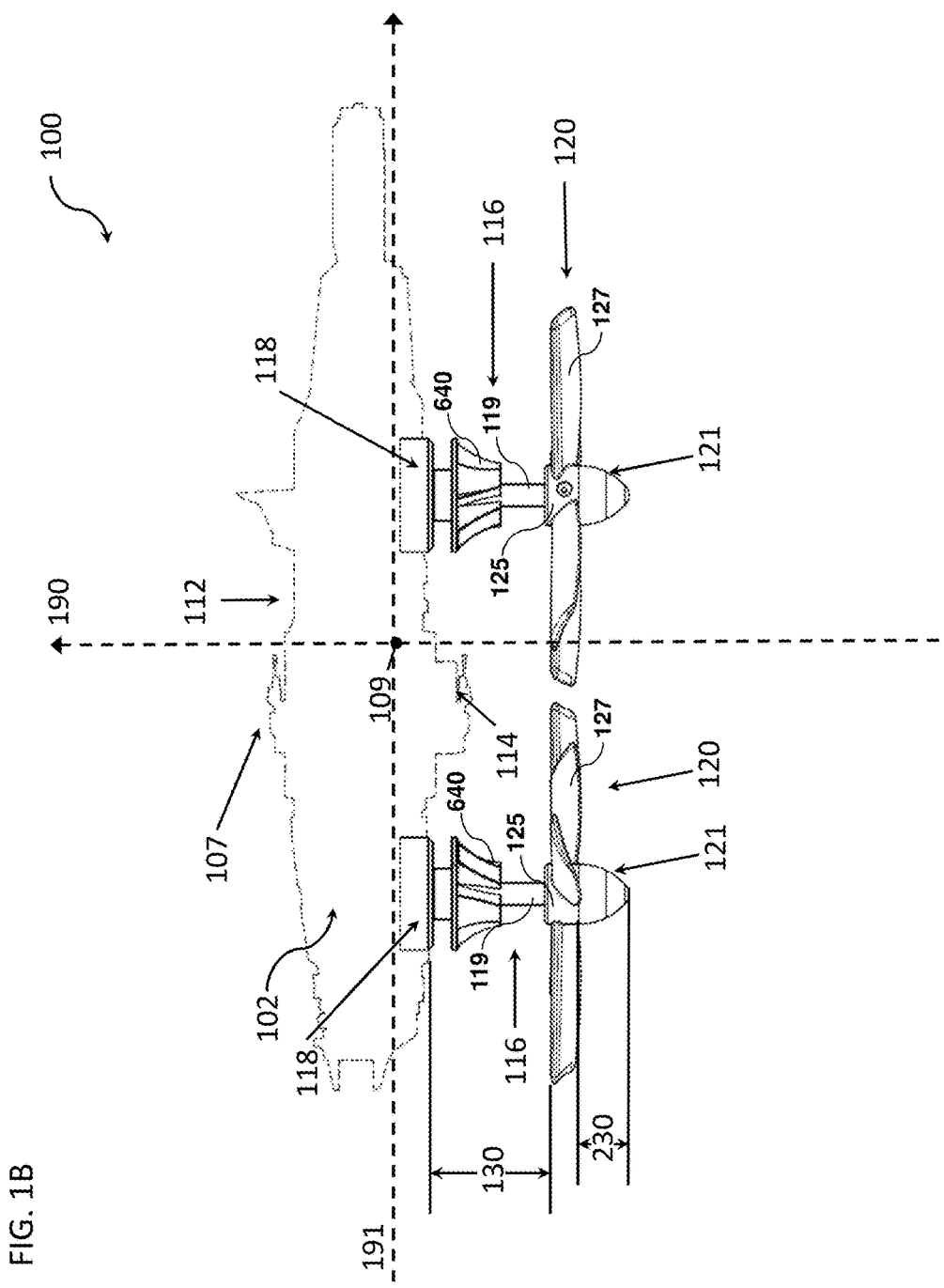

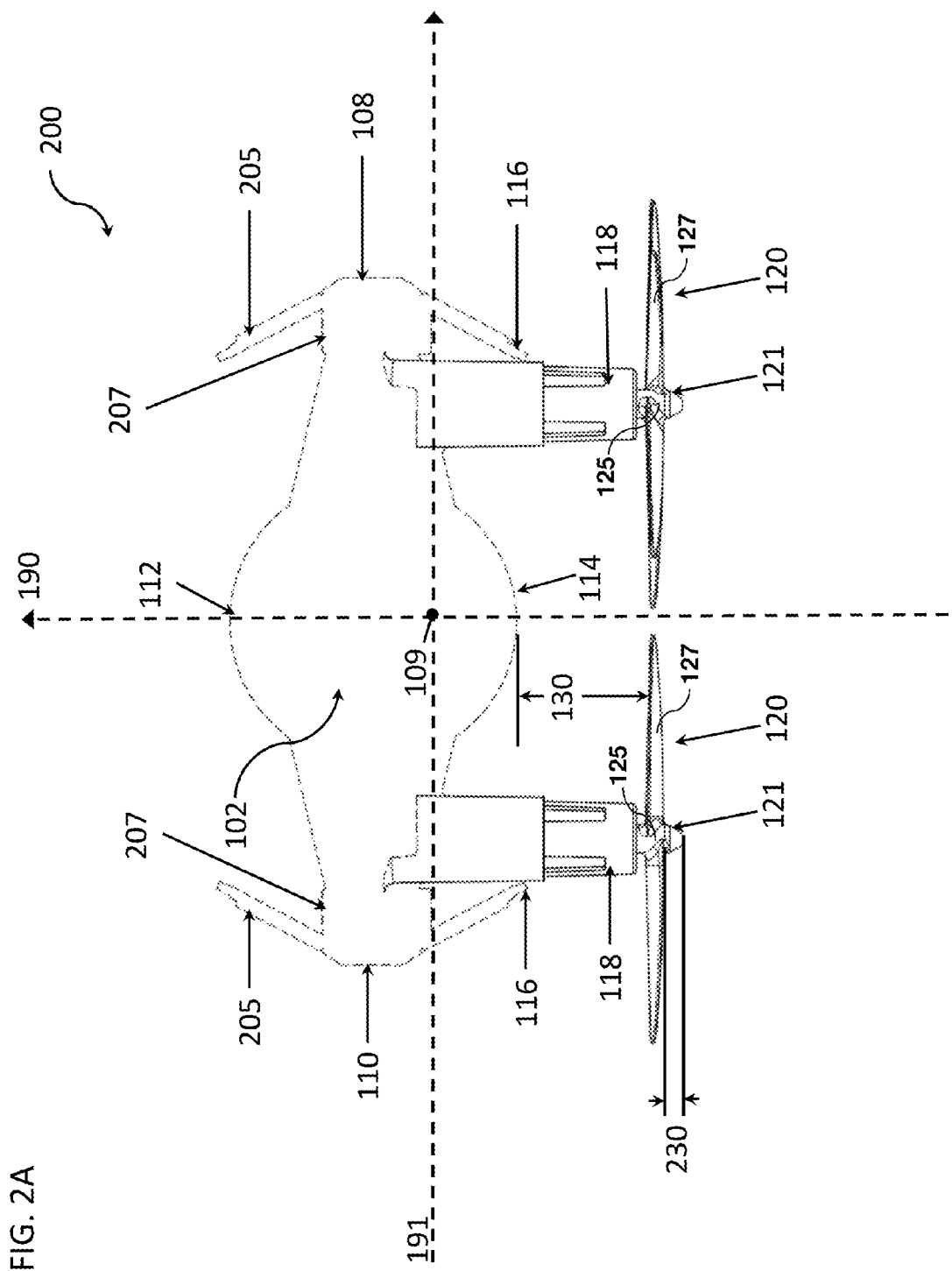

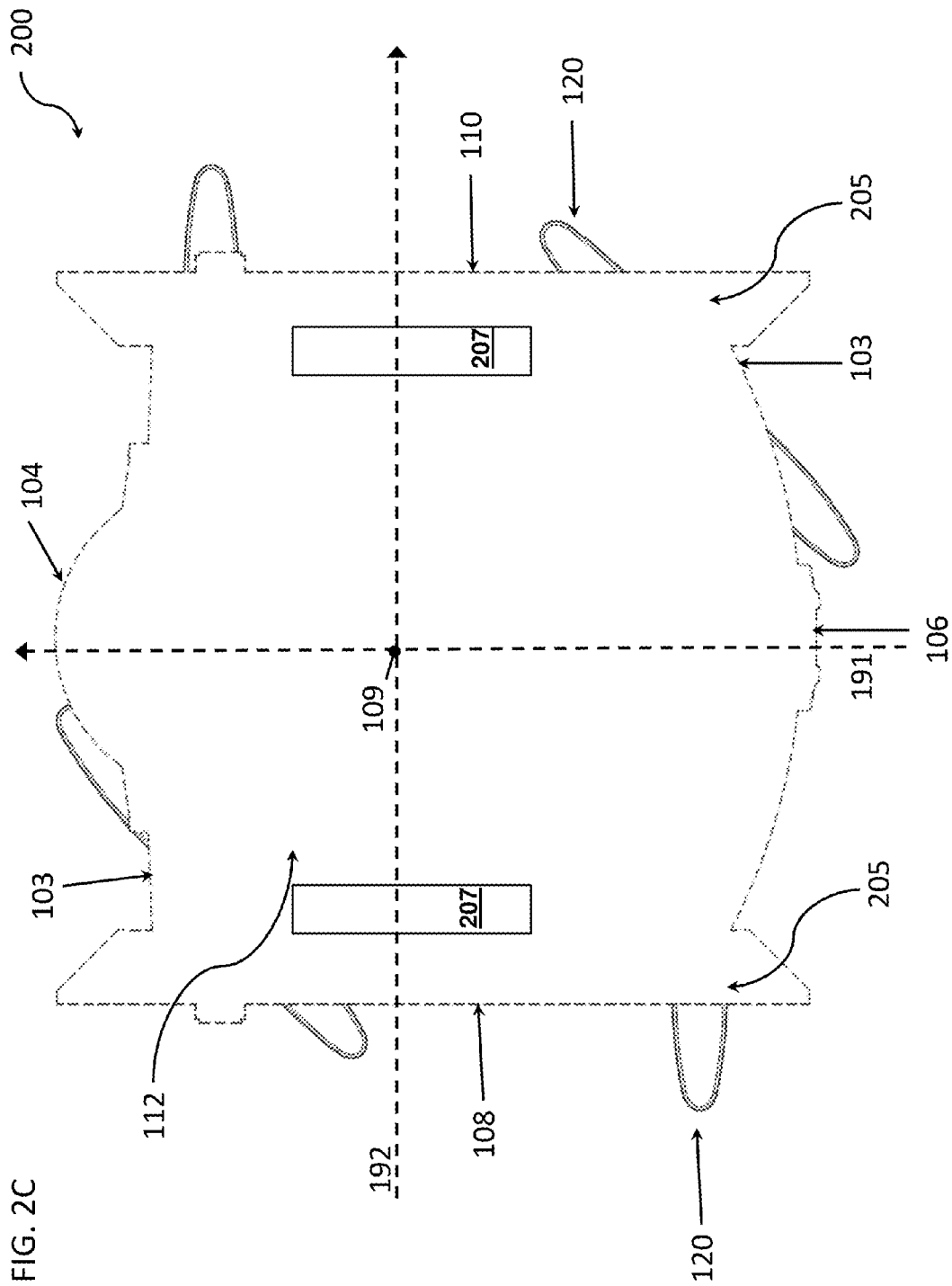

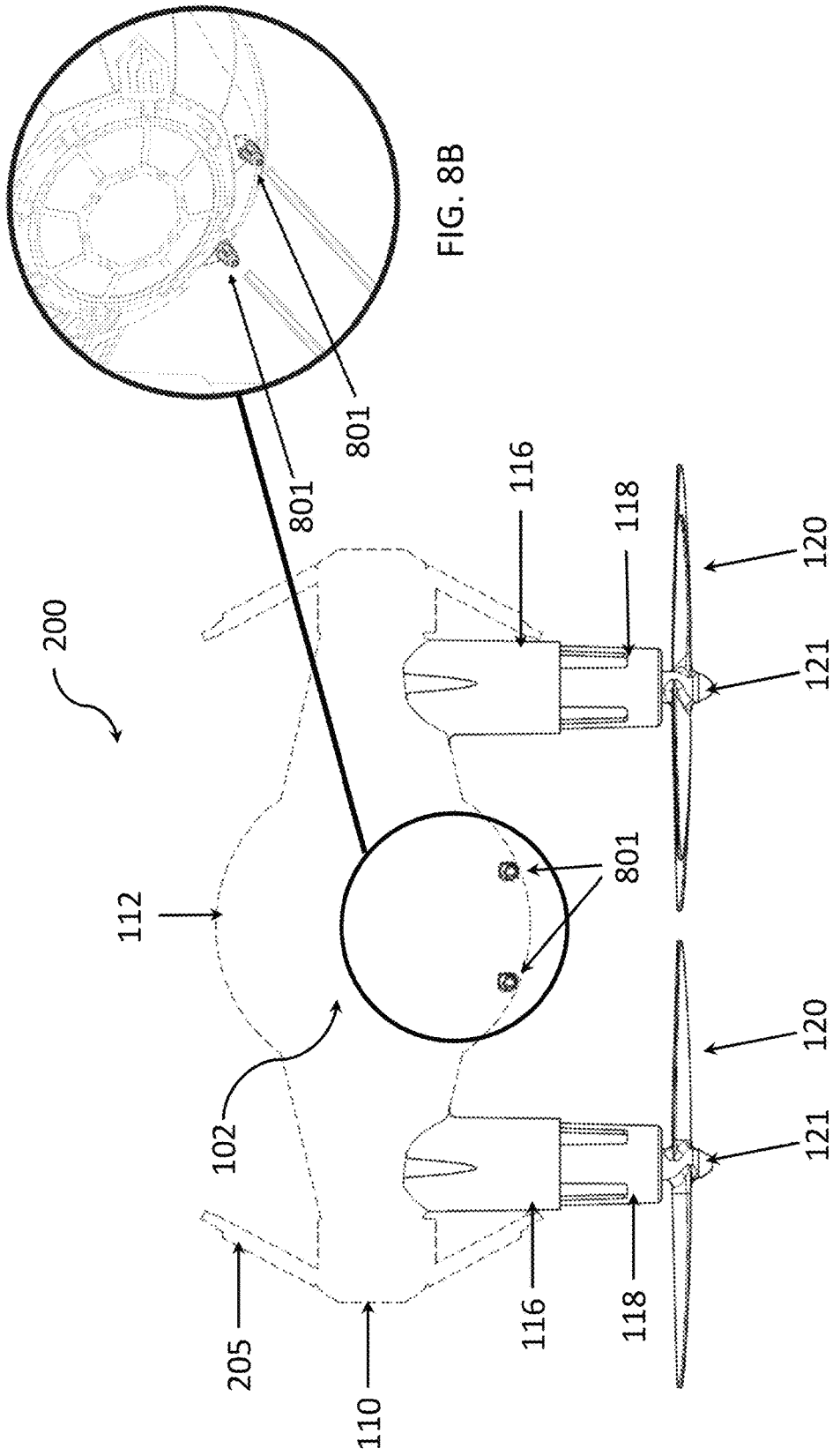

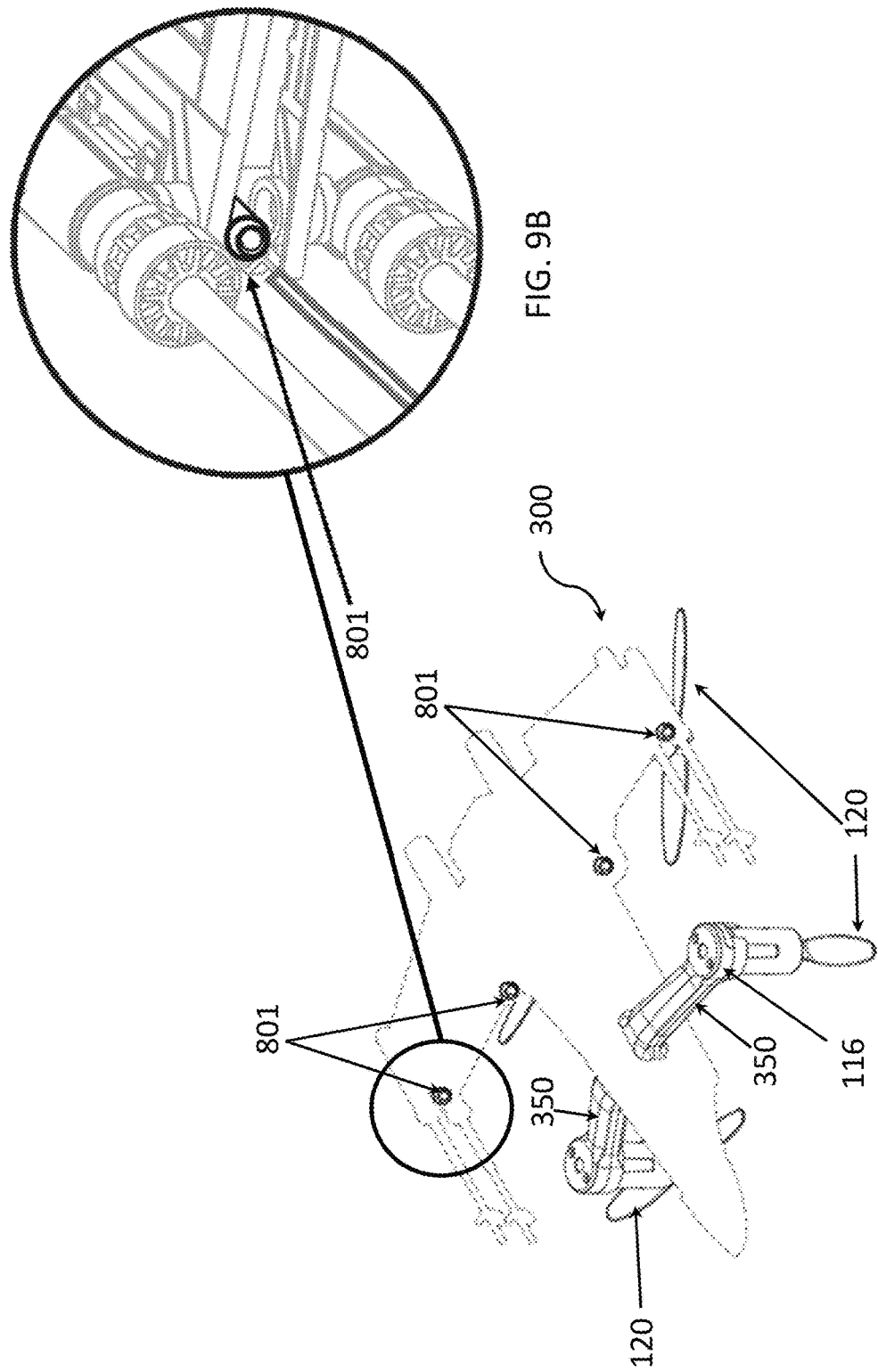

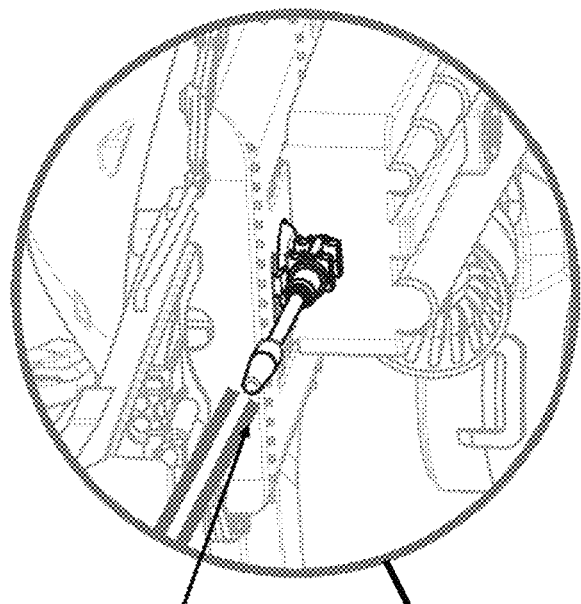
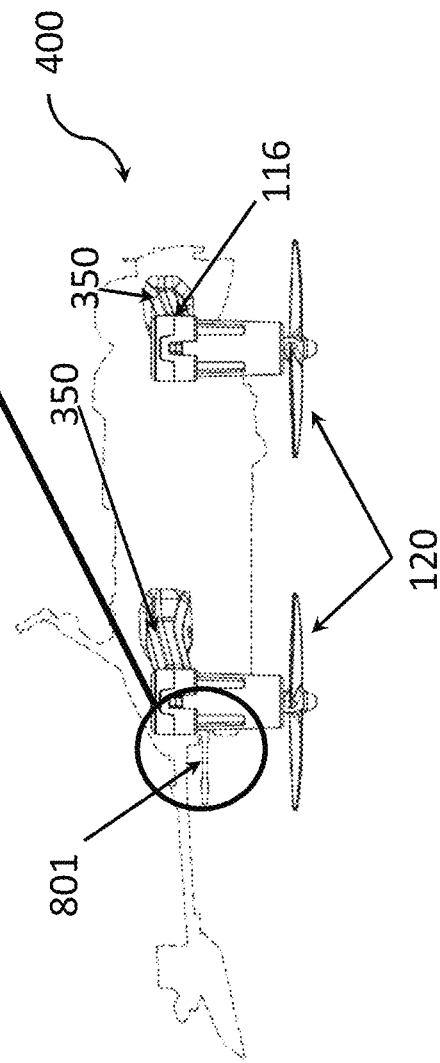

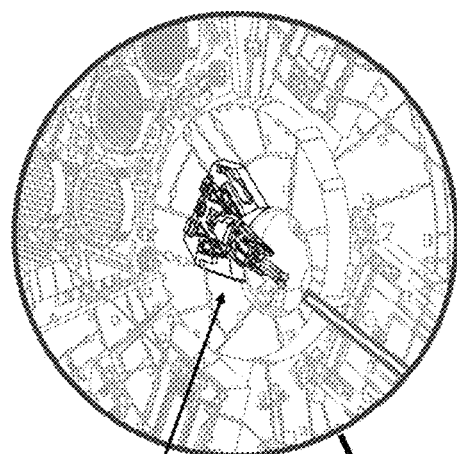
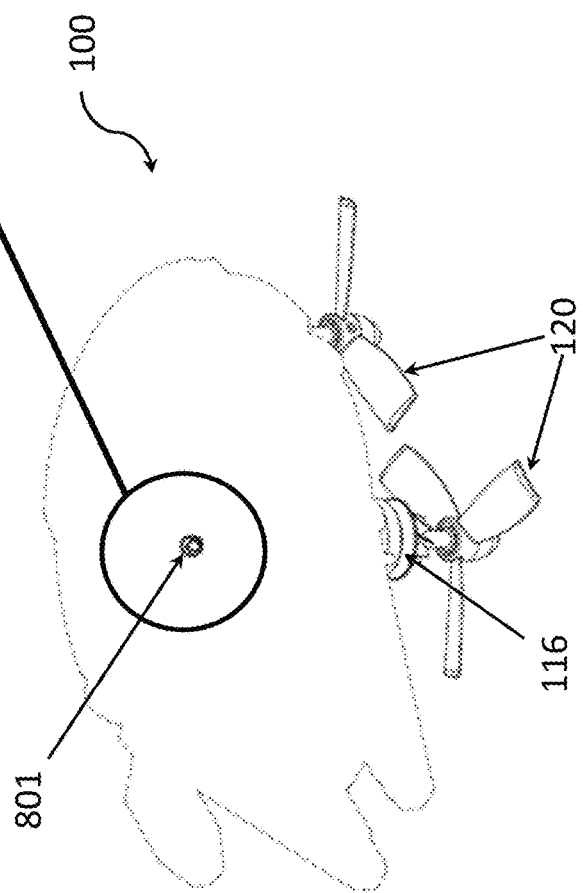
FIG. 11B
FIG. 11A

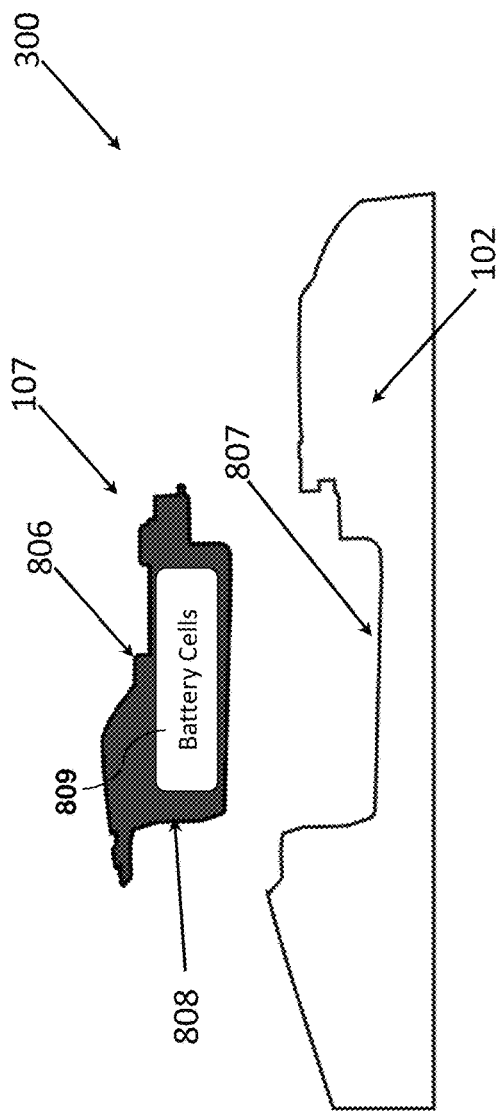
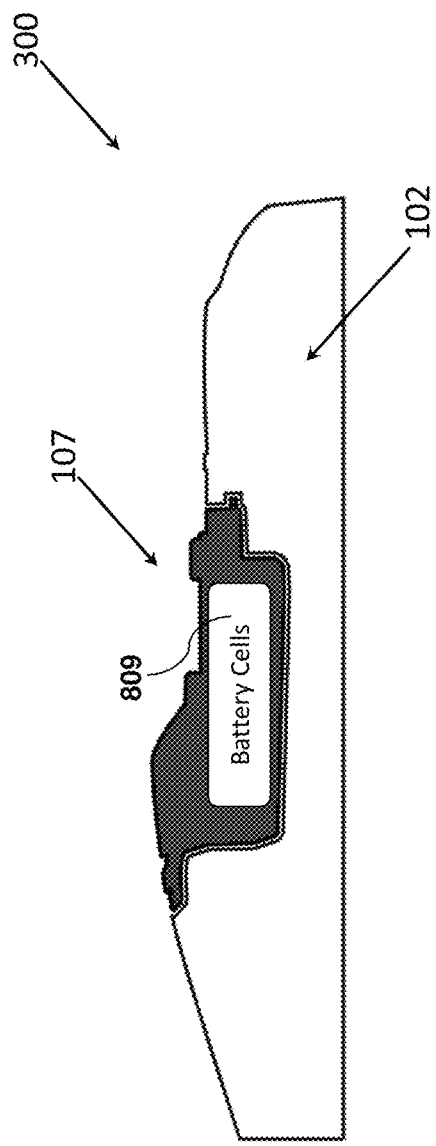

REVERSE PROPULSION AERIAL GAMING SYSTEMS, METHODS, AND DEVICES

CROSS-REFERENCE TO RELATED APPLICATIONS

This application claims the benefit of U.S. Provisional Application No. 62/307,342, filed Mar. 11, 2016, titled REVERSE PROPULSION FLYING SYSTEMS, METHODS, AND DEVICES; U.S. Provisional Application No. 62/362,569, filed Jul. 14, 2016, titled DRONE WITH REVERSIBLE PROPULSION LOCATED BELOW A BODY OF A DRONE; U.S. Provisional Application No. 62/362,570, filed Jul. 14, 2016, titled DRONE WITH REVERSIBLE PROPULSION LOCATED BELOW A BODY OF A DRONE; U.S. Provisional Application No. 62/362,565, filed Jul. 14, 2016, titled DRONE WITH TRANSPARENT BLADES; U.S. Provisional Application No. 62/362,562, filed Jul. 14, 2016, titled DRONE WITH LASER LIGHT GENERATOR AND LIGHT SENSOR AND A METHOD OF OPERATING THE SAME; U.S. Provisional Application No. 62/362,547, filed Jul. 14, 2016, titled DRONE WITH AN INTERNAL FRAME FOR SUPPORTING DRONE PAYLOADS; U.S. Provisional Application No. 62/362,555, filed Jul. 14, 2016, titled DRONE WITH DETACHABLE PROPELLER; U.S. Provisional Application No. 62/362,563, filed Jul. 14, 2016, titled BATTERY PACK FOR A DRONE; and U.S. Provisional Application No. 62/362,568, filed Jul. 14, 2016, titled DRONE WITH REVERSIBLE PROPULSION AND SHOCK ABSORBER. Each of the foregoing applications is hereby incorporated by reference herein in its entirety.

BACKGROUND

Field

The disclosure relates generally to the field of unmanned flying devices, and more specifically to unmanned flying devices comprising downward oriented propulsion systems and for conducting aerial games.

Description

Remote control flying systems are commonly used for enjoyment and other purposes. Various remote control airplanes, helicopters, quadcopters, and the like are available on the market. With increasing miniaturization of electronics and development of new battery and motor technologies, such devices have become cheaper to manufacture, more reliable, and more popular. Some such devices are even making their way into commercial and other non-toy uses, such as for aerial photography, search and rescue, package delivery, and the like.

Multi-rotor aircraft, commonly referred to as drones, have become increasingly popular. One of the most common types of drones is a quad copter, which comprises a central body and four laterally extending arms. Each of the laterally extending arms has a motor and propeller attached to its distal end. Such a design can be relatively easy to control, because the propellers are positioned above and laterally away from the main body, leading to a relatively stable configuration. While such a design can be relatively easy to control and stabilize, it also leads to a utilitarian appearance of the drone.

SUMMARY

The disclosure herein presents various embodiments of unmanned flying devices comprising reverse propulsion systems wherein rotors are positioned below a main body of the flying device (e.g., below the flying device's center of gravity), as opposed to a typical multirotor unmanned flying device that comprises rotors positioned laterally outward from the main body and above the center of gravity. In some embodiments, the downward oriented rotors are configured to also act as landing gear, thus eliminating the need for separate landing gear that may take away from the aesthetic design of a flying device that is intended to mimic or look similar in appearance to a well-known object. Such well-known objects may also be real or described in a work of fiction, such as a fictional spacecraft from a movie. In some embodiments, a drone comprises laser or infrared light generators and sensors for conducting mock battles with other drones. In some embodiments, such a drone is configured to communicate wirelessly with a remote control unit to enable activation of the generators and reporting of status of the sensors. In some embodiments, an optical battling drone system comprises a plurality of drones and a plurality of remote control units configured to communicate with each other for conducting mock battles. Various other features and benefits of unmanned flying devices comprising reverse propulsion systems, optical battling systems, and/or other features are presented below in the detailed description.

According to some embodiments, an optical-based aerial gaming system comprises: a multirotor unmanned flying device comprising: a main body; a plurality of propulsion units each comprising a motor and a propeller, wherein the propeller comprises a hub and radially extending blades, the hub coupled to an output shaft of the motor, wherein each of the plurality of propulsion units extends in a downward direction from the main body when lateral and longitudinal axes of the main body are oriented horizontally with respect to a ground surface, and wherein one or more of the propellers of the plurality of propulsion units comprises an operating envelope sized and positioned such that a portion of the main body is positioned directly above greater than 40% of the operating envelope; a wireless receiver configured to receive data via radio communication; a wireless transmitter configured to send data via radio communication; a controller configured to, based at least in part on flight control data received by the wireless receiver, control the motors of the plurality of propulsion units to cause the unmanned flying device to fly; one or more light generators configured to project laser or infrared light from the unmanned flying device, the projected laser or infrared light comprising encoded data; and one or more light sensors configured to detect laser or infrared light projected by a separate unmanned flying device, the detected laser or infrared light comprising encoded data; and a remote control unit comprising: a wireless transmitter configured to send data via radio communication; a wireless receiver configured to receive data via radio communication; one or more flight control inputs configured to be user operable to cause the wireless transmitter to send the flight control data to the unmanned flying device to control flight of the unmanned flying device; and one or more optical weapon firing inputs configured to be user operable to cause the wireless transmitter to send firing data to the unmanned flying device to cause the one or more light generators of the unmanned flying device to project light; wherein the unmanned flying device is configured to transmit to the remote control unit, using the wireless transmitter of the unmanned flying device, at least a portion of the encoded data of the detected laser or infrared light.

According to some embodiments, an optical-based aerial gaming system comprises: a multirotor unmanned flying device comprising: a main body; a plurality of propulsion units, wherein each propulsion unit comprises a motor and a propeller, wherein the propeller comprises a hub and radially extending blades, the hub coupled to an output shaft of the motor, a wireless receiver configured to receive data via radio communication; a wireless transmitter configured to send data via radio communication; a controller configured to, based at least in part on flight control data received by the wireless receiver, control the motors of the plurality of propulsion units to cause the unmanned flying device to fly; one or more light generators configured to project laser or infrared light from the unmanned flying device, the projected laser or infrared light comprising encoded data; and one or more light sensors configured to detect laser or infrared light projected by a separate unmanned flying device, the detected laser or infrared light comprising encoded data; and a remote control unit comprising: a wireless transmitter configured to send data via radio communication; a wireless receiver configured to receive data via radio communication; one or more flight control inputs configured to be user operable to cause the wireless transmitter to send the flight control data to the unmanned flying device to control flight of the unmanned flying device; and one or more optical weapon firing inputs configured to be user operable to cause the wireless transmitter to send firing data to the unmanned flying device to cause the one or more light generators of the unmanned flying device to project light; wherein the unmanned flying device is configured to transmit to the remote control unit, using the wireless transmitter of the unmanned flying device, at least a portion of the encoded data of the detected laser or infrared light.

In some embodiments, the remote control unit further comprises: a second wireless transmitter configured to send data via radio communication to a separate remote control unit; and a second wireless receiver configured to receive data via radio communication from the separate remote control unit. In some embodiments, the remote control unit further comprises: a third wireless transmitter configured to send data via radio communication to a mobile computing device; and a third wireless receiver configured to receive data via radio communication from the mobile computing device. In some embodiments, at least two of the wireless transmitters of the remote control unit are configured to transmit data using a same frequency but different transmission timing and/or modulation to reduce interference between the at least two of the wireless transmitters. In some embodiments, the remote control unit is configured to transmit to the mobile computing device, via the third wireless transmitter, at least some data received by the remote control unit from the unmanned flying device. In some embodiments, the remote control unit further comprises an electronic database comprising game status data, and the remote control unit is configured to update the game status data in real-time based at least partially on data received from the separate remote control unit via the second wireless receiver and data received from the unmanned flying device. In some embodiments, the game status data comprises data indicating the unmanned flying device has sustained a virtual hit from the separate unmanned flying device, and the remote control unit is configured to activate one or more of a visual indication, a sound effect, and a vibration responsive to the unmanned flying device sustaining the virtual hit. In some embodiments, the encoded data of the projected or detected light comprises one or more of the following: an identifier associated with the unmanned flying device, an identifier associated with the separate unmanned flying device, an identifier associated with the remote control unit, an identifier associated with the separate remote control unit, an executable instruction, a virtual weapon type, and a power level of a virtual weapon. In some embodiments, the plurality of propulsion units extend in a downward direction from the main body when lateral and longitudinal axes of the main body are oriented horizontally with respect to a ground surface, and wherein each of the plurality of propulsion units comprises: a column having proximal and distal ends, the column attached to a bottom portion of the main body at the proximal end, a vertical axis of the column being perpendicular to the lateral and longitudinal axes of the main body, the propeller being positioned below the distal end of the column, wherein the hub of the propeller comprises a landing pad for engaging the ground surface when the unmanned flying device is not in flight, the landing pad extending downward beyond a lowermost portion of the radially extending blades, to keep the radially extending blades from contacting the ground surface when the unmanned flying device is not in flight, the landing pad configured to have a length sufficient to raise the propeller above the ground when the device is in contact with a substantially flat surface, the landing pad further configured to have a length sufficient to provide the propeller sufficient space to provide lift for the device. In some embodiments, the main body comprises a shape that extends laterally beyond at least some of the columns of the plurality of propulsion units. In some embodiments, the propellers of at least some of the plurality of propulsion units comprise an operating envelope sized and positioned such that a portion of the main body is positioned directly above greater than 40% of the operating envelope. In some embodiments, the controller is further configured to cause the unmanned flying device to perform a flight sequence when the one or more light sensors detect the laser or infrared light generated by the separate unmanned flying device. In some embodiments, the controller is configured to select the flight sequence for the unmanned flying device to perform from a plurality of potential flight sequences, the selection based at least partially on one or more of the following: a number of times the one or more light sensors has detected laser or infrared light, a virtual health level of the unmanned flying device, an amount of virtual damage to the unmanned flying device, and a type of virtual weapon used by the second unmanned flying device. In some embodiments, the controller is further configured to disrupt at least a portion of the flight sequence responsive to the unmanned flying device receiving flight sequence override data from the remote control unit.

According to some embodiments, a multirotor unmanned flying device for aerial gaming comprises: a main body; a plurality of propulsion units extending in a downward direction from the main body when lateral and longitudinal axes of the main body are oriented horizontally with respect to a ground surface, wherein each of the plurality of propulsion units comprises: a column having proximal and distal ends, the column attached to a bottom portion of the main body at the proximal end, a vertical axis of the column being perpendicular to the lateral and longitudinal axes of the main body; a motor positioned within the column and oriented such that an output shaft of the motor extends downward toward the distal end of the column; a propeller positioned below the distal end of the column, the propeller comprising a hub and radially extending blades, the hub coupled to the output shaft of the motor, wherein the propeller is positioned below a center of gravity of the unmanned flying device, and the propeller is configured to project thrust downward away from the main body to provide lift for the unmanned flying device, wherein the hub of the propeller comprises a landing pad for engaging the ground surface when the unmanned flying device is not in flight, the landing pad extending downward beyond a lowermost portion of the radially extending blades, to keep the radially extending blades from contacting the ground surface when the unmanned flying device is not in flight, the landing pad configured to have a length sufficient to raise the propeller above the ground when the device is in contact with a substantially flat surface, the landing pad further configured to have a length sufficient to provide the propeller sufficient space to provide lift for the device; a wireless receiver configured to receive data instructions from a wireless remote control unit; a controller configured to receive said data instructions from said wireless receiver for processing and to control the motors of the plurality of propulsion units to cause the unmanned flying device to fly; one or more light generators configured to project infrared or laser light from the unmanned flying device to simulate firing of a weapon; one or more light sensors configured to detect infrared or laser light generated by a second flying device to simulate being hit by a weapon; and a power source configured to be inserted into said main body and to provide power to at least the wireless receiver, the controller, and the motors of the plurality of propulsion units.

According to some embodiments, an unmanned flying device comprises: a main body; a plurality of propulsion units extending in a downward direction from the main body when lateral and longitudinal axes of the main body are oriented horizontally with respect to a ground surface, wherein each of the plurality of propulsion units comprises: a column having proximal and distal ends, the column attached to a bottom portion of the main body at the proximal end, a vertical axis of the column being perpendicular to the lateral and longitudinal axes of the main body; a motor positioned within the column and oriented such that an output shaft of the motor extends downward toward the distal end of the column; a propeller positioned below the distal end of the column, the propeller comprising a hub and radially extending blades, the hub coupled to the output shaft of the motor, wherein the propeller is positioned below a center of gravity of the unmanned flying device, and the propeller is configured to project thrust downward away from the main body to provide lift for the unmanned flying device, wherein the hub of the propeller comprises a landing pad for engaging the ground surface when the unmanned flying device is not in flight, the landing pad extending downward beyond a lowermost portion of the radially extending blades, to keep the radially extending blades from contacting the ground surface when the unmanned flying device is not in flight, the landing pad configured to have a length sufficient to raise the propeller above the ground when the device is in contact with a substantially flat surface, the landing pad further configured to have a length sufficient to provide the propeller sufficient space to provide lift for the device; a wireless receiver configured to receive data instructions from a wireless remote control unit; a controller configured to receive said data instructions from said wireless receiver for processing and to control the motors of the plurality of propulsion units to cause the unmanned flying device to fly; and a power source configured to be inserted into said main body and to provide power to at least the wireless receiver, the controller, and the motors of the plurality of propulsion units.

In some embodiments, the main body comprises a shape that extends laterally beyond the columns of the plurality of propulsion units. In some embodiments, the columns of the plurality of propulsion units are spaced laterally apart sufficiently for none of the propellers to have overlapping operating envelopes. In some embodiments, the columns of the plurality of propulsion units are positioned completely beneath the main body. In some embodiments, each of the propellers of the plurality of propulsion units comprises an operating envelope sized and positioned such that a portion of the main body is positioned directly above greater than 40% of the operating envelope. In some embodiments, the main body comprises one or more openings for air to pass therethrough, at least a portion of the one or more openings being positioned directly above the operating envelope of the propeller, wherein the portion of the one or more openings that is positioned directly above the operating diameter of the propeller is not included in a calculation of portion of the main body being positioned directly above greater than 40% of the operating envelope. In some embodiments, each of the propellers of the plurality of propulsion units comprises an operating envelope sized and positioned such that a portion of the main body is positioned directly above greater than 70% of the operating envelope. In some embodiments, the portion of the main body that is positioned directly above the operating envelope of the propeller does not comprise any openings for air to pass therethrough. In some embodiments, a vertical distance between an uppermost surface of the blades of the propeller and a lowermost surface of the portion of the main body positioned directly above the operating envelope is less than the a diameter of the operating envelope. In some embodiments, the vertical distance between the uppermost surface of the blades of the propeller and the lowermost surface of the portion of the main body positioned directly above the operating envelope is greater than 30% of the diameter of the operating envelope. In some embodiments, a vertical distance between an uppermost surface of the blades of the propeller and a lowermost surface of the portion of the main body positioned directly above the operating envelope is within a range of 25% to 50% of a diameter of the operating envelope. In some embodiments, each of the plurality of propulsion units further comprises: a turbine positioned above the propeller to increase airflow to the propeller to at least partially compensate for airflow blocked by the portion of the main body that is positioned directly above the operating envelope of the propeller. In some embodiments, the unmanned flying device further comprises: one or more additional propulsion units each coupled to the main body by an arm extending laterally from the main body. In some embodiments, the arm extending laterally from the main body is detachable from the main body. In some embodiments, the arm extending laterally from the main body is detachable from the main body at a coupling, the coupling comprising electrical contacts for transmission of power from the power source to the motor. In some embodiments, the unmanned flying device does not comprise any propulsion units coupled to the main body by an arm extending laterally from the main body. In some embodiments, the landing pad further comprises a flat tip portion. In some embodiments, the flat tip portion of the landing pad comprises a width of at least one millimeter. In some embodiments, the flat tip portion of the landing pad comprises a diameter that is at least 25% of a diameter of the hub of the propeller. In some embodiments, the landing pad extends downward beyond the lowermost portion of the radially extending blades for a distance that is at least 4% of an operating diameter of the propeller, to increase propeller efficiency when the unmanned flying device is operating near or in contact with the ground surface. In some embodiments, the motor of each of the plurality of propulsion units is slidably coupled to the column such that the motor can translate in a direction parallel to the vertical axis of the column, and each of the plurality of propulsion units further comprises: a spring positioned within the column and configured to bias the motor toward the distal end of the column, wherein the spring is configured to absorb at least a portion of a landing impact load introduced through the landing pad of the hub of the propeller, and wherein the output shaft of the motor comprises a length sufficient to enable the propeller to translate with respect to the column, as a result of the landing impact load, without the propeller contacting the column. In some embodiments, the column and output shaft of the motor are sized such that, when the motor is positioned at a distal-most position with respect to the column, the blades of the propeller are positioned at least 10 millimeters away from, but no more than 36 millimeters away from, any portion of the main body located directly above an operating diameter of the propeller. In some embodiments, the unmanned flying device further comprises: one or more light generators configured to project infrared or laser light from the unmanned flying device to simulate firing of a weapon; and one or more light sensors configured to detect infrared or laser light generated by a second flying device to simulate being hit by a weapon. In some embodiments, the unmanned flying device further comprises: a wireless transmitter configured to transmit data to the remote control unit responsive to the one or more light sensors detecting the infrared or laser light generated by the second flying device. In some embodiments, the one or more light generators are configured to project infrared or laser light comprising encoded data, the encoded data comprising at least an identifier associated with the unmanned flying device. In some embodiments, the one or more light sensors are configured to detect a plurality of light frequencies. In some embodiments, the main body comprises a decorative shell representative of a scale model of a real-world or fictional manned flying device, the decorative shell attached to an internal frame, the internal frame comprising a higher rigidity than the decorative shell. In some embodiments, the main body comprises a decorative outer shape representative of a scale model of a real-world or fictional manned flying device, the decorative outer shape having a portion of the scale model missing at a cavity configured for insertion therein of the power source, and wherein the power source comprises a battery coupled to a decorative surface, the decorative surface configured to complete the scale model when the power source is inserted into the cavity of the main body. In some embodiments, the scale model of the real-world or fictional manned flying device represents a fictional spacecraft. In some embodiments, the main body comprises a rigid internal frame disposed within a flexible housing. In some embodiments, the main body comprises an integrally connected removable portion that houses the power source. In some embodiments, the propeller is constructed from a substantially transparent material to reduce a visibility of the propeller while in motion.

According to some embodiments, a multirotor unmanned flying device for aerial gaming comprises: a main body; a plurality of propulsion units extending in a downward direction from the main body when lateral and longitudinal axes of the main body are oriented horizontally with respect to a ground surface, wherein each of the plurality of propulsion units comprises: a column having proximal and distal ends, the column attached to a bottom portion of the main body at the proximal end; a motor positioned within the column; a propeller positioned below the distal end of the column, the propeller comprising a hub and radially extending blades, the hub coupled to an output shaft of the motor, wherein the propeller is positioned below a center of gravity of the unmanned flying device, and the propeller is configured to project thrust downward away from the main body to provide lift for the unmanned flying device, wherein the hub of the propeller comprises a landing pad for engaging the ground surface when the unmanned flying device is not in flight; a wireless receiver configured to receive data instructions from a wireless remote control unit; a wireless transmitter configured to send data instructions to the wireless remote control unit; a controller configured to receive said data instructions from said wireless receiver for processing and to control the motors of the plurality of propulsion units to cause the unmanned flying device to fly; one or more light generators configured to project directional laser or infrared light from the unmanned flying device; and one or more light sensors configured to detect laser or infrared light generated by a second unmanned flying device, wherein the controller is further configured to cause the unmanned flying device to perform a flight sequence when the one or more light sensors detect the laser or infrared light generated by the second unmanned flying device.

In some embodiments, the controller is configured to select the flight sequence for the unmanned flying device to perform from a plurality of potential flight sequences, the selection based at least partially on one or more of the following: a number of times the one or more light sensors has detected laser or infrared light, a virtual health level of the unmanned flying device, an amount of virtual damage to the unmanned flying device, and a type of virtual weapon used by the second unmanned flying device. In some embodiments, the plurality of potential flight sequences comprises one or more of the following flight sequences: automatic landing of the unmanned flying device, rocking side to side of the unmanned flying device, reduction of a speed of the unmanned flying device. In some embodiments, the controller is further configured to disrupt at least a portion of the flight sequence responsive to the wireless receiver receiving flight sequence override data from the remote control unit. In some embodiments, the controller is further configured to cause the wireless transmitter to transmit hit data to the remote control unit when the one or more light sensors detect the laser or infrared light generated by the second unmanned flying device, the hit data configured to indicate to the remote control unit that the unmanned flying device has sustained a virtual hit. In some embodiments, the wireless receiver is further configured to receive hit data from the second unmanned flying device responsive to the second unmanned flying device detecting light generated by at least one of the one or more light generators, the hit data configured to indicate to the unmanned flying device that the second unmanned flying device has sustained a virtual hit. In some embodiments, the controller is further configured to cause the wireless transmitter to transmit data to the remote control unit indicating that the unmanned flying device has achieved a virtual hit on the second unmanned flying device. In some embodiments, each of the one or more light generators are configured to generate either infrared light or class II laser light. In some embodiments, the one or more light sensors are each configured to detect one type of light at any given time. In some embodiments, at least one of the one or more light generators is configured to generate infrared light and class II laser light. In some embodiments, the one or more light generators are configured such that a dispersion field of the infrared light comprises a larger angle than a dispersion field of the class II laser light. In some embodiments, the one or more light generators are configured to project laser or infrared light that comprises encoded data for receipt and interpretation by the second flying device. In some embodiments, the encoded data comprises one or more of the following: an identifier associated with the unmanned flying device, an identifier associated with the remote control unit, an executable instruction, a virtual weapon type, and a power level of a virtual weapon. In some embodiments, the controller is configured to cause the one or more light generators to generate light responsive to receipt of a virtual weapon firing command in the data instructions from the remote control unit. In some embodiments, the controller is further configured to cause the one or more light generators to repeatedly generate light, responsive to repeated receipt of the virtual weapon firing command, with a delay of at least 0.2 seconds between repeated light generations. In some embodiments, the flight sequence comprises gradually decreasing power to all motors, wherein the gradual decrease in power is based at least in part on a distance of the unmanned flying device from a flat surface below the unmanned flying device, wherein the gradual decrease in power is configured to occur over at least one second.

According to some embodiments, an optical-based virtual battling system comprises: a plurality of unmanned flying devices, wherein each unmanned flying devices comprises: a main body; a plurality of propulsion units, wherein each propulsion unit comprises a motor and a propeller, wherein the propeller comprises a hub and radially extending blades, the hub coupled to an output shaft of the motor, a wireless receiver configured to receive data instructions; a wireless transmitter configured to send data instructions; a controller configured to receive said data instructions from said wireless receiver for processing and to control the motors of the plurality of propulsion units to cause the unmanned flying device to fly; one or more light generators configured to project directional laser or infrared light from the unmanned flying device; and one or more light sensors configured to detect laser or infrared light projected by a separate unmanned flying device; and a plurality of remote control units, each remote control unit associated with one of the plurality of unmanned flying devices, each remote control unit comprising: a wireless transmitter configured to send data instructions to the associated unmanned flying device; a wireless receiver configured to receive data instructions from the associated unmanned flying device; one or more flight control inputs configured to be user operable to cause the wireless transmitter to send data instructions that control flight of the associated unmanned flying device; and one or more optical weapon firing inputs configured to be user operable to cause the wireless transmitter to send data instructions that cause the one or more light generators of the associated unmanned flying device to project light; wherein the controller of each of the unmanned flying devices is further configured to, responsive to the one or more light sensors detecting laser or infrared light, cause the wireless transmitter of the unmanned flying device to send hit data to the remote control unit associated with that unmanned flying device, the hit data indicating the unmanned flying device has sustained a virtual weapon hit.

In some embodiments, the wireless transmitter of each unmanned flying device is further configured to transmit data to any of the other unmanned flying devices, and the wireless receiver of each unmanned flying device is further configured to receive data from any of the other unmanned flying devices. In some embodiments, the wireless transmitter of each remote control unit is further configured to transmit data to any of the other remote control units, and the wireless receiver of each remote control unit is further configured to receive data from any of the other remote control units. In some embodiments, each of the unmanned flying devices further comprises a camera, and the wireless transmitter of each unmanned flying device is configured to transmit video from the camera to the remote control unit associated with that unmanned flying device. In some embodiments, each of the unmanned flying devices further comprises two or more cameras, and the wireless transmitter of each unmanned flying device is configured to transmit video from the two or more cameras to the remote control unit associated with that unmanned flying device. In some embodiments, the controller is further configured to combine video from the two or more cameras into a single video feed prior to transmitting video from the two or more cameras. In some embodiments, the plurality of remote control units are each further configured to communicate with a mobile device to transmit the video received from the unmanned flying device to the mobile device for display.

According to some embodiments, an unmanned flying device comprises: a main body; a plurality of propulsion units, wherein each propulsion unit comprises a motor and a propeller, wherein the propeller comprises a hub and radially extending blades, the hub coupled to an output shaft of the motor, a wireless receiver configured to receive data instructions from a wireless remote control unit; a wireless transmitter configured to send data instructions to the wireless remote control unit; a controller configured to receive said data instructions from said wireless receiver for processing and to control the motors of the plurality of propulsion units to cause the unmanned flying device to fly; one or more light generators configured to project directional laser or infrared light from the unmanned flying device; and one or more light sensors configured to detect laser or infrared light generated by a second unmanned flying device, wherein the controller is further configured to cause the unmanned flying device to perform a flight sequence when the one or more light sensors detect the laser or infrared light generated by the second unmanned flying device.

In some embodiments, the controller is configured to select the flight sequence for the unmanned flying device to perform from a plurality of potential flight sequences, the selection based at least partially on one or more of the following: a number of times the one or more light sensors has detected laser or infrared light, a virtual health level of the unmanned flying device, an amount of virtual damage to the unmanned flying device, and a type of virtual weapon used by the second unmanned flying device. In some embodiments, the plurality of potential flight sequences comprises one or more of the following flight sequences: automatic landing of the unmanned flying device, rocking side to side of the unmanned flying device, reduction of a speed of the unmanned flying device. In some embodiments, the controller is further configured to disrupt at least a portion of the flight sequence responsive to the wireless receiver receiving flight sequence override data from the remote control unit. In some embodiments, the controller is further configured to cause the wireless transmitter to transmit hit data to the remote control unit when the one or more light sensors detect the laser or infrared light generated by the second unmanned flying device, the hit data configured to indicate to the remote control unit that the unmanned flying device has sustained a virtual hit. In some embodiments, the wireless receiver is further configured to receive hit data from the second unmanned flying device responsive to the second unmanned flying device detecting light generated by at least one of the one or more light generators, the hit data configured to indicate to the unmanned flying device that the second unmanned flying device has sustained a virtual hit. In some embodiments, the controller is further configured to cause the wireless transmitter to transmit data to the remote control unit indicating that the unmanned flying device has achieved a virtual hit on the second unmanned flying device. In some embodiments, each of the one or more light generators are configured to generate either infrared light or class II laser light. In some embodiments, the one or more light generators are configures such that a dispersion field of the infrared light comprises a larger angle than a dispersion field of the class II laser light. In some embodiments, the one or more light generators are configured to project laser or infrared light that comprises encoded data for receipt and interpretation by the second flying device. In some embodiments, the encoded data comprises one or more of the following: an identifier associated with the unmanned flying device, an identifier associated with the remote control unit, an executable instruction, a virtual weapon type, and a power level of a virtual weapon. In some embodiments, the controller is configured to cause the one or more light generators to generate light responsive to receipt of a virtual weapon firing command in the data instructions from the remote control unit. In some embodiments, the controller is further configured to cause the one or more light generators to repeatedly generate light, responsive to repeated receipt of the virtual weapon firing command, with a delay of at least 0.2 seconds between repeated light generation. In some embodiments, the flight sequence comprises gradually decreasing power to all motors, wherein the gradual decrease in power is based at least in part on a distance of the unmanned flying device from a surface below the unmanned flying device, wherein the decrease in power is configured to occur over at least one second.

According to some embodiments, an unmanned flying device comprises a main body and a plurality of propulsion units extending downward therefrom. In some embodiments, the propulsion units comprise a central column comprising a motor, and a rotor or propeller extending radially beyond the column and configured to propel the flying device in flight. In some embodiments, the central columns are all positioned within a radially outer envelope of the main body. In some embodiments, the central columns are sized such that the propellers or rotors are positioned a predetermined distance away from the main body, the predetermined distance falling within a range having a minimum value large enough to minimize the effects of the main body on the propellers, but having a maximum value small enough to minimize any negative aesthetic effects of the columns and to allow relatively stable flight by keeping the propellers relatively close to the center of gravity of the flying device. In some embodiments, the propulsion units comprise at least one shock absorbing component that enables the propulsion units to absorb an impact or shock load when the aircraft uses the propellers as landing gear. In some embodiments, the flying device comprises forward facing and rearward facing cameras and is configured to stitch together images from those cameras to generate a picture-in-picture or screen in screen video stream that can be streamed wirelessly to a user device.

According to some embodiments, an unmanned flying device comprises: a main body; and a plurality of propulsion units extending downward from the main body, wherein each propulsion unit comprises a column having a propeller positioned at a distal end of the column, the propeller positioned below a center of gravity of the flying device, and wherein each propulsion unit comprises a shock absorbing member configured to absorb at least a portion of a landing impact load introduced through the propeller.

BRIEF DESCRIPTION OF THE DRAWINGS

The foregoing and other features, aspects, and advantages of the present disclosure are described in detail below with reference to the drawings of various embodiments, which are intended to illustrate and not to limit the disclosure. The drawings comprise the following figures in which:

FIGS. 1A-1D illustrate an embodiment of an unmanned flying device comprising a reverse propulsion system.

FIGS. 2A-2C illustrate another embodiment of an unmanned flying device comprising a reverse propulsion system.

FIG. 8A illustrates an embodiment of an unmanned flying device with light generators.

FIG. 8B is a detail view of the embodiment of FIG. 8A, illustrating two light generators positioned in laser cannons of the unmanned flying device of FIG. 8A.

FIG. 9A illustrates another embodiment of an unmanned flying device with light generators.

FIG. 9B is a detail view of the embodiment of FIG. 9A, illustrating a light generator positioned in a laser cannon of the unmanned flying device of FIG. 9A.

FIG. 10A illustrates another embodiment of an unmanned flying device with light generators.

FIG. 10B is a detail view of the embodiment of FIG. 10A, illustrating a light generator positioned in a laser cannon of the unmanned flying device of FIG. 10A.

FIG. 11A illustrates another embodiment of an unmanned flying device with light generators.

FIG. 11B shows a light generator positioned in the laser cannon of the unmanned flying device of FIG. 11A.

FIG. 12A illustrates a side section view of part of an unmanned flying device and a battery pack, wherein the battery pack is separated from the unmanned flying device.

FIG. 12B illustrates a side section view of part of an unmanned flying device and a battery pack, wherein the battery pack is fitted into the body of the unmanned flying device.

DETAILED DESCRIPTION OF THE EMBODIMENTS

Although several embodiments, examples, and illustrations are disclosed below, it will be understood by those of ordinary skill in the art that the disclosure described herein extends beyond the specifically disclosed embodiments, examples, and illustrations and includes other uses of the disclosure and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing the disclosures herein described.

Figure 5:
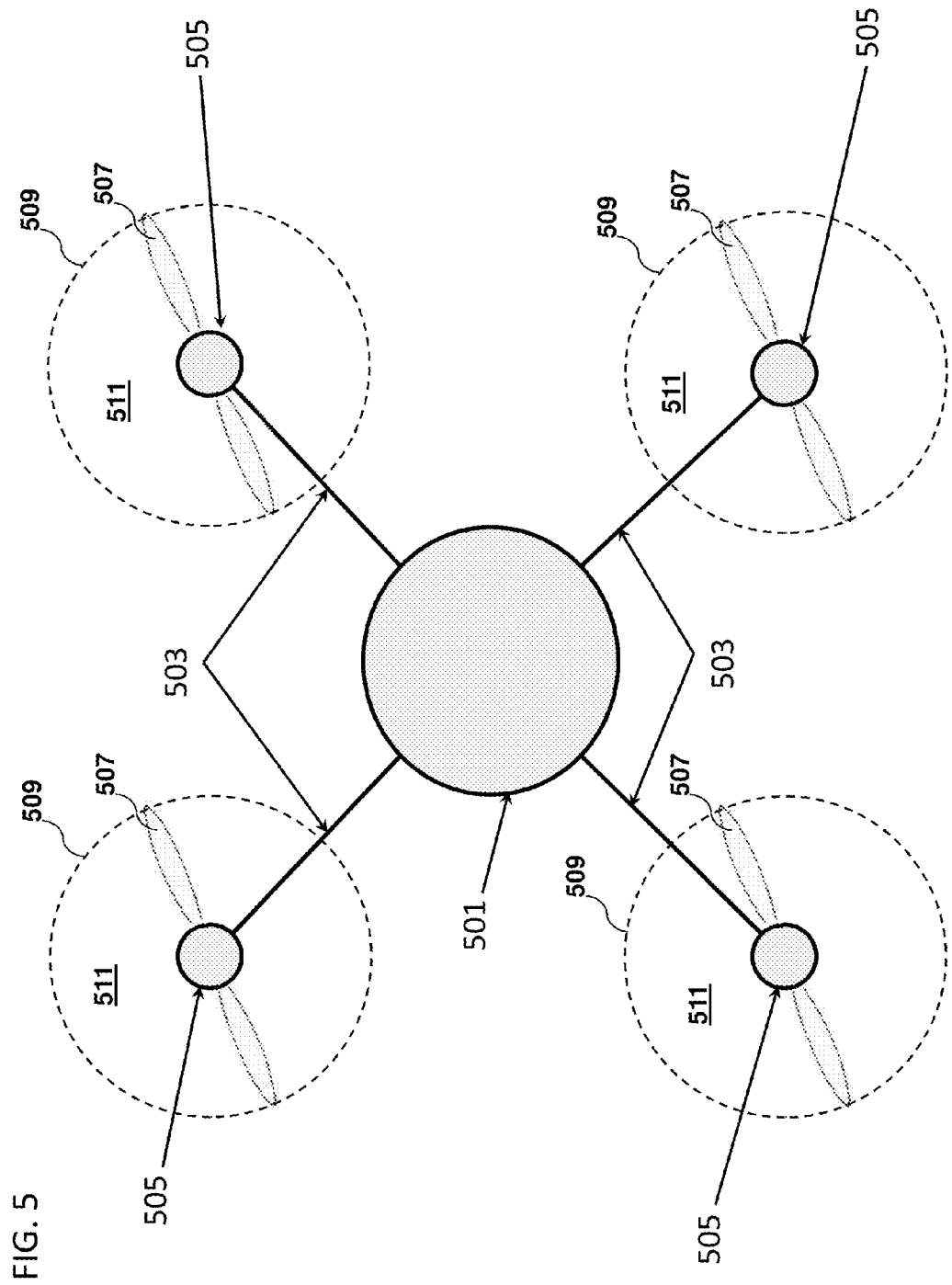
FIG. 5 illustrates a schematic diagram of an embodiment of an unmanned flying device.

Unmanned flying devices, such as small battery-powered multi-rotor aircraft, sometimes referred to as drones, are becoming increasingly popular. Such devices can be used for entertainment and commercial purposes. For example, unmanned flying devices can be used for aerial photography and other purposes. In some cases, unmanned flying devices are designed primarily with function in mind. Accordingly, such flying devices may comprise, for example, a central body portion comprising control electronics, a battery, and/or the like, and four elongate arms extending radially therefrom, having a motor and propeller or rotor positioned at the end of each of the elongate arms. FIG. 5 illustrates a simplified schematic diagram of such a design comprising a central body 501, four elongate arms 503, and a motor 505 positioned at the end of each of the elongate arms. Such a design can be desirable from a function and efficiency standpoint, because the materials required to produce such a device are relatively minimal, thus minimizing weight, and positioning the motors/rotors at the end of elongate arms can help with maneuverability and stability. Minimal weight also provides for less power required to fly and may provide for smaller batteries, cheaper components used to achieve flight (for example, a motor), or more flight-time.

Although flying systems such as drones may be used generally for enjoyment or other purposes, it can also be desirable to have a flying system that looks similar to actual vehicles capable of flight, or flying vehicles, such as passenger airplanes, army helicopters, or others. The desire to mimic in appearance vehicles that already exist also extends to fictional flying vehicles in text or film, such as spaceships from a series of movies. It should be appreciated that modeling the design of a remote control flying system based on a fictional flying vehicle poses its own challenges when the fictional flying vehicles uses systems for flight not yet invented, for example a flying vehicle appearing to defy gravity with no manipulation of the surrounding air. Because remote control flying systems rely primarily on the manipulation of the surrounding air to achieve flight, it is desirable to model such systems in a way to appear as close to the physical look of the flying vehicle it is attempting to mimic as possible. The embodiments described herein, alone or in combination, are applied to address this problem, among other problems.

In cases where it is desirable to design a flying device that mimics or looks like a particular object or vehicle, such as a real-world vehicle (e.g., a commercial or military aircraft), a fictional vehicle (e.g., a spaceship from a book, TV show, or movie), and/or the like, it can be desirable to move away from a primarily function-based design and make the flying device look as close as possible to the vehicle the flying device is imitating, but still retain adequate functional characteristics to enable the device to operate satisfactorily as a flying device. For example, as will be described in more detail below, various embodiments disclosed herein are designed to look like spaceships and other devices from a series of movies.

Figure 1A:
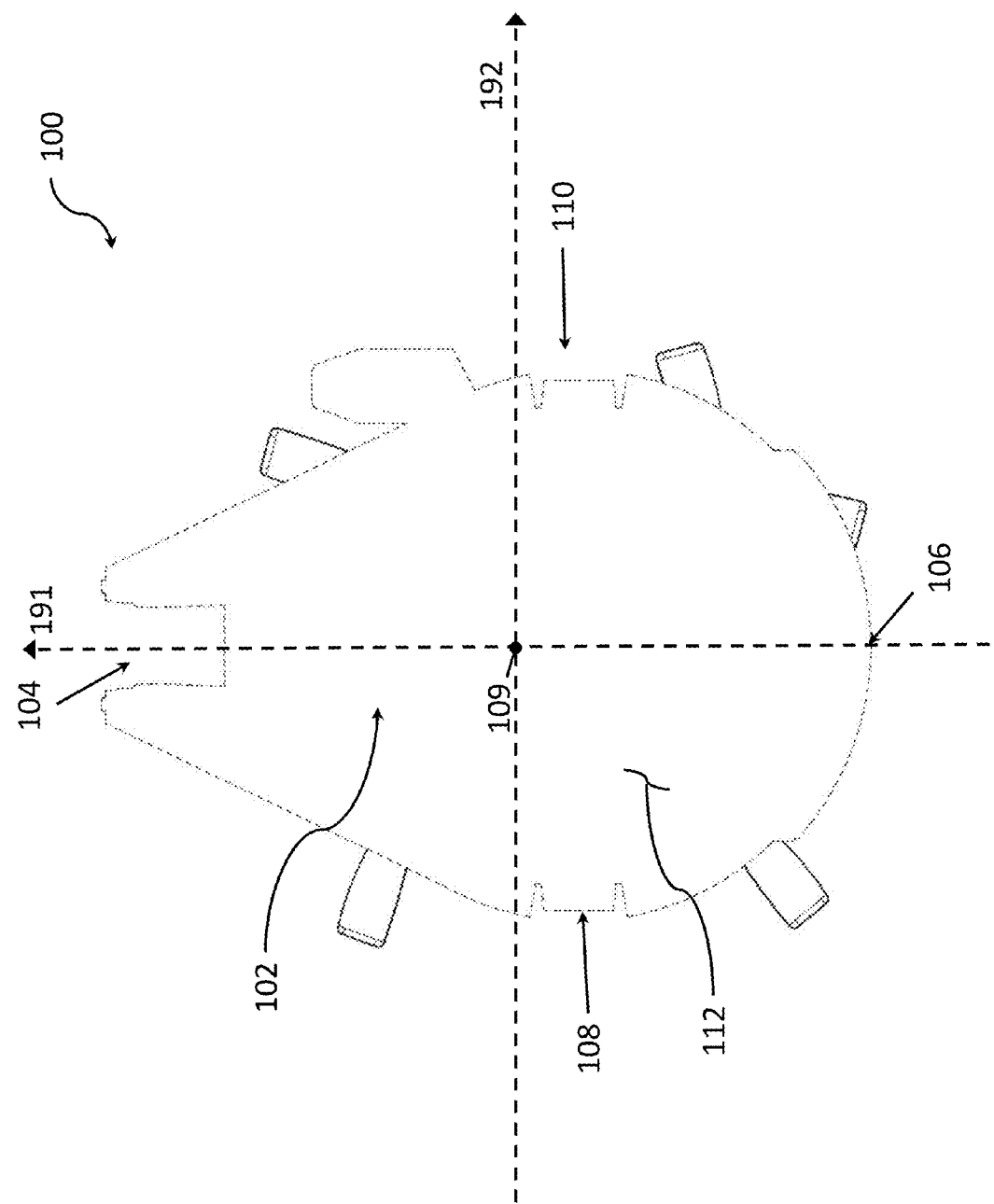
Figure 1C:
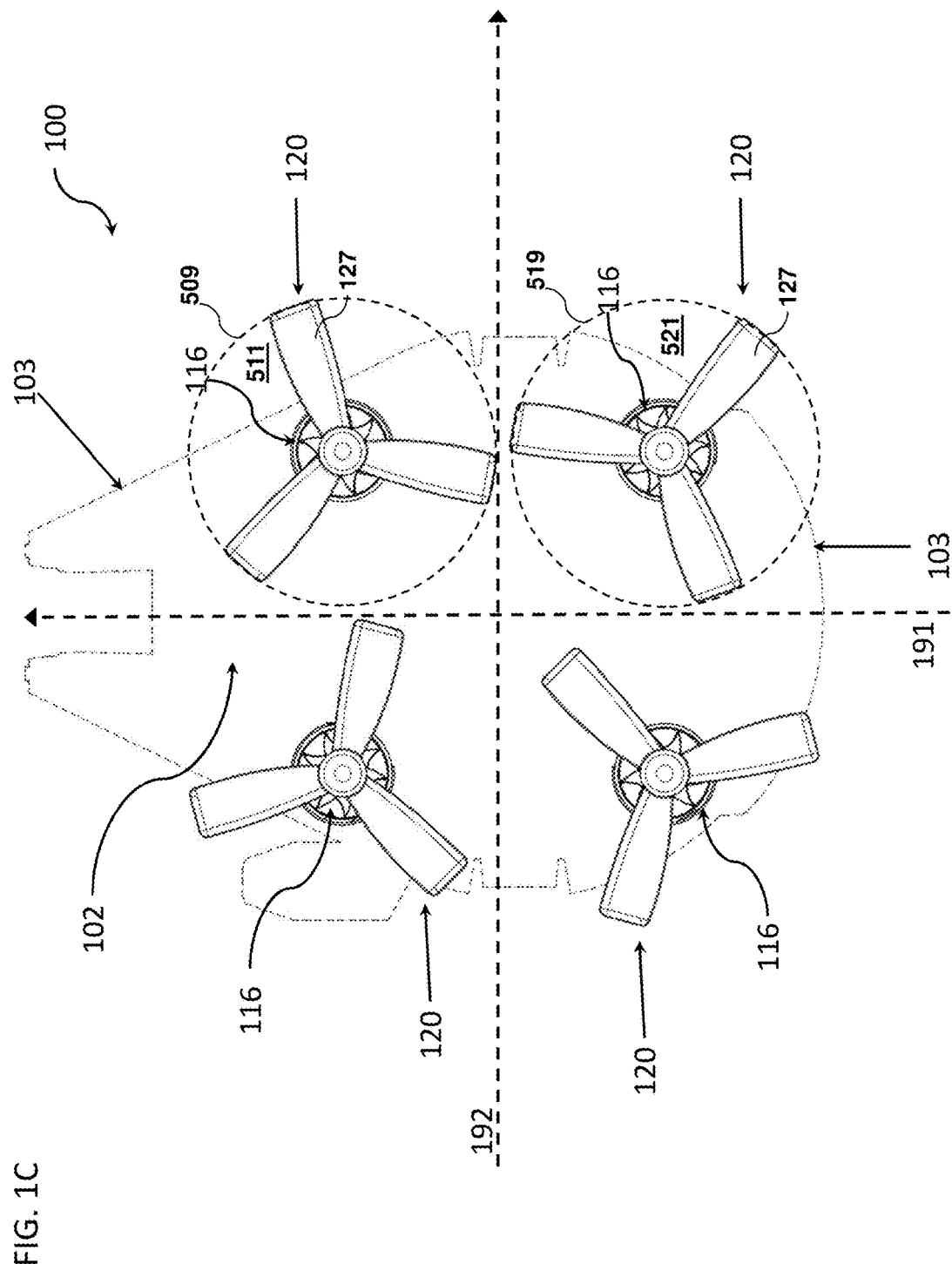

One way to make a flying device look more like a spaceship or other type of vehicle is to position the motors and rotors below the main body of the flying device instead of positioning them on arms extending radially or laterally outward from the main body. FIGS. 1A-1C, among other figures, illustrate such embodiments, as will be described in more detail below. One design difficulty with positioning propellers or rotors underneath an aircraft body is that the effect of air interacting with the portion of the body adjacent the rotors must be taken into account. For example, if the propellers are too close to the body, the aircraft may be unstable and or the propellers may be less efficient, thus leading to increased battery power usage. If the propellers or rotors are too far away from the body, this can also lead to stability issues (e.g., by being too far below the center of gravity of the device), and can also take away from the design intent which may be to mimic the spaceship or other design as closely as possible.

Another difficulty encountered in designing a drone having its propellers or propulsion units downward facing below a main body of the aircraft is determining how to land and take off and/or how to support the aircraft on the ground when the rotors are spinning. One option is to provide separate landing gear; however, adding additional structure to the device can take away from the decorative appearance of the drone, that is configured to look like or mimic a particular vehicle. Accordingly, some embodiments disclosed herein comprise features that enable the drone to land directly on the propellers, support the drone by the propellers when the drone is on the ground and the propellers are spinning, and/or take off from a grounded position where the propellers are in direct contact with the ground. For example, the propellers may comprise a landing pad or surface at a distal point of the propeller hub that is configured to contact the ground and raise the propeller blades sufficiently from the ground such that they do not contact the ground and such that there is sufficient airspace between the ground and propeller blades to generate lift. As another example, downward facing propulsion units may comprise one or more shock absorbing members, such as a spring that enables the propellers and/or motors to translate axially and absorb a landing impact.

Another benefit of some embodiments disclosed herein is that positioning propulsion units beneath a main body portion can help to protect the propellers from contacting other objects in a collision. With a typical drone, the rotors are located above and laterally outward from the main body. One problem with such a design is that these rotors can readily break (or cause damage) if the drone flies into an object located above or beside the flying device, and the rotors are not otherwise protected. Example embodiments disclosed herein solve this problem and other problems by providing a flying device with a rotary assembly that is located beneath a body of the flying device and does not extend laterally beyond the drone's main body (or extends laterally beyond the drone's main body by only a certain amount). In such embodiments, the main body of the flying device can help to protects or shield the blades from hitting objects while the flying device is in flight.

The present disclosure further discloses various embodiments of mock battling systems that enable multiple drones and remote control units to conduct mock aerial battles using optical "weapons." In some embodiments, the drones are configured to utilize light generators that generate one or more of infrared light, laser light, visible light, invisible light, and/or the like, that can be detected by a second drone. The second drone can detect such light and determine that the second drone has been hit by the optical weapon, and cause one or more actions to occur as a result of the hit. For example, in some embodiments, a predetermined flight sequence can be caused to occur in the hit drone as a result of the hit.

In some embodiments, a mock battling system as disclosed herein comprises one or more channels of wireless communication in addition to the transmission of wireless data from a remote control unit to the drone that remote control unit is presently controlling. For example, in some embodiments, the wireless communication channel or link between a remote control unit and the drone it is controlling is a bidirectional communication channel. In such a case, not only can the remote control unit send operating instructions to the drone, but the drone can also report back to the remote control unit various information. In some embodiments, multiple drones are configured to wirelessly communicate with each other, multiple remote control units are configured to wirelessly communicate with each other, drones are configured to wirelessly communicate with at least one additional remote control unit that is not currently controlling the flight of that drone, remote control units are configured to communicate with mobile computing devices such as smart phones, any of these devices are configured to communicate with a central server, and/or the like. Any of these additional communication channels or links may be beneficial in conducting a mock battle using optical weapons, such as to allow operators to receive real-time updates of hits achieved by that operator's drone, hits sustained by that operator's drone, current status information of that operator's drone or other drones, and/or the like.

The terms "drone" or "flying device" are used herein to refer to an unmanned flying device, whether the device is remotely controlled and/or comprises at least some self-guidance, self-stabilization, and/or autonomous flight technology. In some embodiments, the term flying device may be used to refer to what is commonly known as a quadcopter that comprises four propellers and a computer or microcontroller configured to individually vary the speed of each of those propellers to enable the quadcopter to fly in a desired manner. The techniques disclosed herein may, however, be used with various types of flying devices or unmanned flying devices in addition to quadcopters. For example, a flying device that uses the technologies disclosed herein may be, for example, a tricopter, a hexacopter, a pentacopter, an octocopter, a helicopter, an airplane, and/or the like. Further, the techniques disclosed herein may be utilized with flying devices that are fully self-guided or autonomous, meaning no external user input is required in real time during flight, and/or may be used with flying devices that require at least some external user input during flight.

Reverse Propulsion

In some embodiments, positioning motors and/or rotors below a body of a flying device, such as by positioning the motors at the end of a column or other feature that protrudes downward from the body, may be referred to as a reverse propulsion system. This is because a typical flying device comprises propellers that are positioned above motors, laterally outward from a main body, and configured to lift the flying device into the air by pulling the flying device upward. A reverse propulsion system may comprise, for example, propellers that are mounted directly or partially under a solid structure (e.g., the main body) and spinning in an orientation that pushes air downward away from the main body and/or motors versus pulling air downward toward the main body and/or motors to create lift. In some embodiment, a reverse propulsion system, such as disclosed herein, may be described as a system where the rotors or propellers are designed to push the aircraft up into the sky instead of pulling the aircraft up into the sky.

One challenge in implementing such a reverse propulsion system is that a typical drone comprises propellers that have a relatively unobstructed space above and below the propellers. For example, with reference to FIG. 5, a typical drone comprises a centrally located main body 501 and four propulsion units 505 positioned laterally outward from the main body 501 by a plurality of arms 503. The propulsion units 505 each comprise a propeller 507 configured to rotate such that the outermost tips of the propeller blades form an operating diameter 509 that defines a circular shaped operating envelope 511. As can be seen in FIG. 5, with a typical drone, the operating diameter 509 and/or operating envelope 511 of the propellers 507 is positioned laterally completely beyond the main body 501. There is no overlap between the main body 501 and the propeller operating diameter 509 and/or operating envelope 511, when viewed from directly above or below the drone. Although the arms 503 may vary in thickness, this still results in a relatively unobstructed space above and below the propellers 507. However, as mentioned above, such a design, while being relatively efficient, leads to a utilitarian appearance that may not be desirable when designing a drone that is intended to mimic a particular fictional flying device, such as a spaceship, or is intended to be decorative, or is otherwise not intended to look like a typical drone.

Some embodiments disclosed herein incorporate a design wherein one or more or all of the propulsion units of a drone are positioned beneath a main body of the drone and positioned such that at least a portion of the operating diameter and/or envelope of the propellers is positioned directly beneath the main body of the drone. In various embodiments, the operating diameter and/or envelope of the propeller may be positioned completely beneath a main body of the drone, or the operating diameter and/or envelope of the propeller may be positioned partially beneath the main body of the drone. For example, in some embodiments, at least 50% of the operating diameter and/or envelope is positioned directly beneath a main body of the drone. In some embodiments, this percentage may be more or less. For example, this percentage may in some embodiments be at least 10%, 20%, 30%, 40%, 60%, 70%, 80%, or 90%. Specific examples of such embodiments are described in greater detail below, with reference to, for example, FIGS. 1C, 2B, 3C, and 4A. In these embodiments, the propeller operating diameters are illustrated for the two propulsion units shown on the right side of the views, but the configurations are similar or identical for the other two propulsion units at the other side of the drone.

Figure 1D:
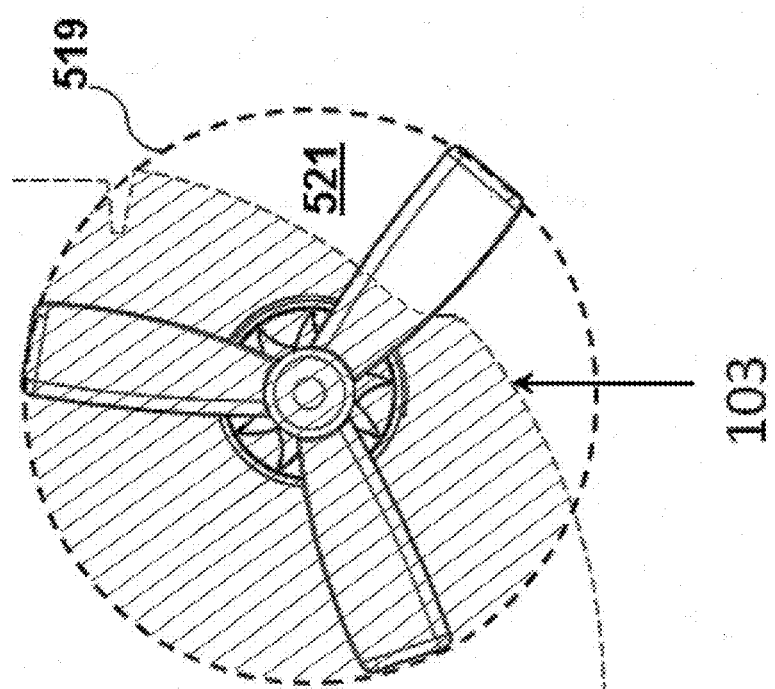
Figure 2B:
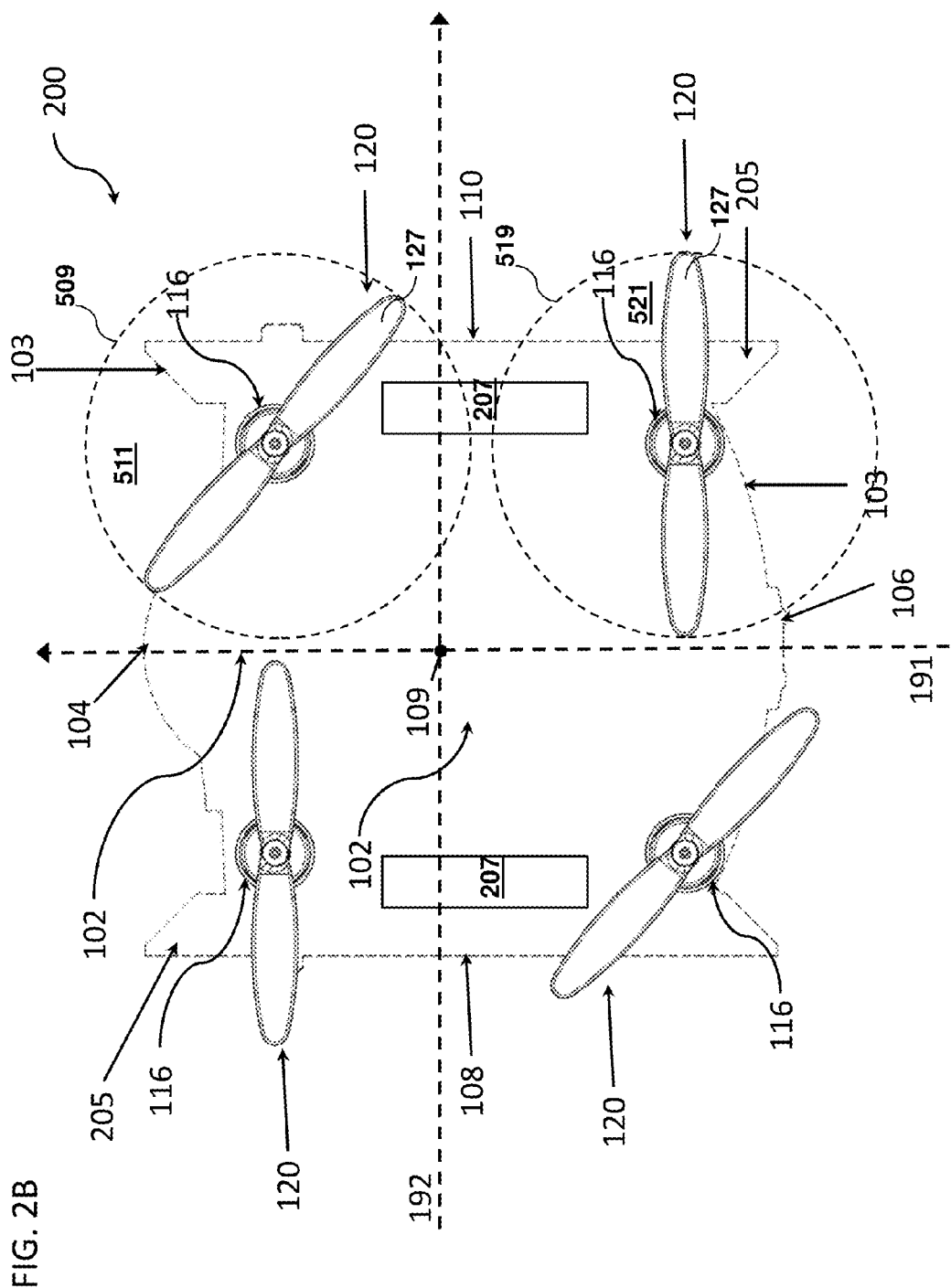
Figure 3A:
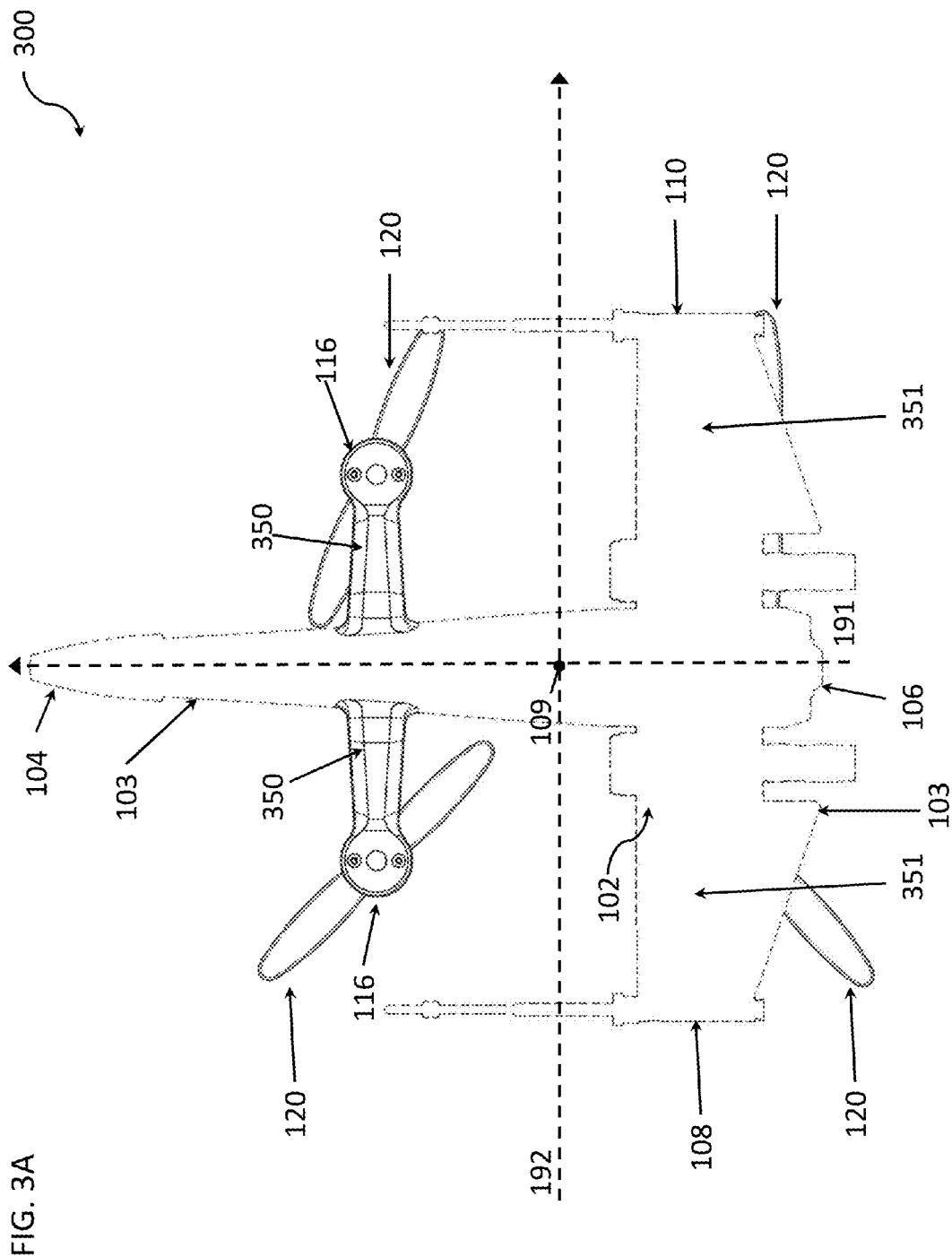
FIGS. 3A-3C illustrate another embodiment of an unmanned flying device comprising a reverse propulsion system.

For example, FIGS. 1C and 2B illustrate embodiments where all four propulsion units are positioned such that the main body of the drone is positioned directly above greater than 50% of the propeller operating diameters 509, 519 and/or operating envelopes 511, 521. As another example, FIG. 3C illustrates an embodiment where the main body of the drone is positioned directly above approximately 50% of the propeller operating diameter 519 and/or operating envelope 521 for the two rear propulsion units, but the two front propulsion units have little if any of the main body of the drone positioned above their propeller operating diameters 509 and/or operating envelopes 511. As another example, FIG. 4A illustrates an embodiment where relatively little of the main body of the drone is positioned above any of the propeller operating diameters 509, 519 and/or operating envelopes 511, 521. In some embodiments, the portion of the main body that is positioned directly above the propeller operating diameter and/or envelope, if projected onto the horizontal plane, comprises a solid shape bounded in part by the propeller operating diameter 509 or 519 and in part by the outer envelope 103 of the profile of the main body. FIG. 1D illustrates an example of this shape, shown by the shaded area of FIG. 1D. The area of that solid shape, projected onto the horizontal plane, defines the percentage of the main body that is positioned directly above the propeller operating diameter. In some embodiments, this portion of the main body may comprise one or more openings, such as the openings 207 illustrated in FIG. 2B. In such an embodiment, the area of the opening is not included in the calculation of the percentage of the main body that is positioned directly above the propeller operating diameter.

When propulsion units are positioned substantially beneath a body of a drone, as discussed above, one aspect that may become important for stable and/or efficient flight is the amount and/or quality of airflow available above the propellers, for the propellers to generate lift. This is because the portion of the body positioned over the propellers, and potentially also nearby portions of the body, can have an effect on the airflow to the propellers. One way to control this effect in the disclosed embodiments is by controlling a distance between the body or belly of the craft (e.g., a solid part, such as the hull) and the propellers. This distance and structure can enable the drone to utilize reverse propulsion to fly in a stable and efficient manner. This distance can have a length that is sufficient to accommodate airflow from underneath the body of the drone as the air circulates, but that is not too long that stable control of the drone is difficult. By way of example, in some embodiments, this length, as shown in FIG. 1B as 130, ranges from about 10 millimeters to 36 millimeters. In some embodiments, this distance, 130, is measured from the top of a propeller blade to the bottom of the hull or body of the drone or other portion, such as a wing. In some embodiments, the distance 130 is measured as a vertical distance between an uppermost portion of a propeller blade and a lowermost portion of the body that is within the propeller's operating diameter or envelope. In some embodiments, the distance 130 is measured as a vertical distance between an uppermost portion of a propeller blade and a lowermost portion of the body that is within an annular shaped envelope defined at an outer edge by the outer tip of the propeller and at an inner edge by an outer diameter of a propulsion unit column. In some embodiments, variation in the shape of the underside of the main body that is positioned above the propeller can make it more desirable to express the vertical distance 130 as an average distance from the uppermost edge of the propeller blades to the point of the main body that is positioned directly above the propeller, averaged across the entire portion of the main body that is directly above the propeller or within the propellers operating envelope. In some embodiments, the vertical distance 130 may be defined as a vertical distance from the uppermost edge of the propeller blades to the center of gravity of the flying device. In some embodiments, it may be desired to have the front portion of the drone body appear to be pointing upwards away from the ground or downwards towards the ground. To achieve this, the dimension 130 as measured from the bottom of the drone body to the top of the propeller blades on the rear portion of the drone may be greater than the dimension 130 of the front portion of the drone. The drone would then appear to be pointing forwards towards the front end of the drone. As the difference between the rear dimension and the front dimension increases, flight stability may be impacted. In some cases, at least some variation in the front versus rear distances that causes the main body of the drone to point somewhat upward or downward may be desirable to increase the aerodynamic stability of the drone's main body as it flies forward through the air. In some cases, however, as the difference in the distance between the rear and front dimensions is further increased, aerodynamic stability may decrease.

Any of the dimensions or ratios given in this description with respect to dimension 130 or similar dimensions (such as dimension 330) may apply to any of these methods of defining dimension or distance 130. In some embodiments, it is desirable for the dimension 130 or 330 to be less than an outer diameter or operating diameter of the propeller. In some embodiments, it is desirable for the dimension 130 or 330 to be significantly less than an outer diameter or operating diameter of the propeller, such as, for example, equal to or less than 70%, 60%, 50%, 40%, 30%, 25%, or 20% of the outer diameter or operating diameter of the propeller. Decreasing this dimension can be desirable for both aesthetic purposes and to bring the propellers closer to the center of gravity, potentially increasing stability of flight. On the other hand, making dimension 130 or 330 too small relative to the operating diameter of the propeller can also negatively impact flight of the flying device, such as by restricting or limiting airflow to the propeller by having the main body of the flying device positioned too closely to the propeller. Accordingly, in some embodiments, it is desirable to have the dimension 130 or 330 be equal to or greater than 30% of the operating diameter of the propeller. In other embodiments, this ratio may vary, and the dimension 130 or 330 is equal to or greater than, for example, 20%, 25%, 40%, 50%, or 60% of the operating diameter of the propeller. In some embodiments, it is desirable for the dimension 130 or 330 to be within a range of 25% to 50% of the operating diameter of the propeller. In some embodiments, it is desirable for the dimension 130 or 330 to be within a range of 30% to 40% of the operating diameter of the propeller. As two examples of this, FIGS. 1B and 2A illustrate embodiments where dimension 130 is approximately 30% of the operating diameter of the propeller, and lies within ranges of 25% to 50% or 30% to 40%.

In some embodiments, it may be desirable to increase circulation or airflow to the propeller by other methods, such as including one or more holes or vents in the portion of the body that is positioned directly over the propeller operating envelope. Such holes or vents can allow additional air to circulate and pass through the body, and/or can increase the efficiency of the propellers. By way of example, wings may include holes or open areas. These open areas enable air to pass through the body of the drone so lift can be generated from the blades that are spinning beneath the body of the drone during normal drone operation. In this manner, air circulates around the drone and/or through its body and assists in the reverse propulsion system.

As illustrated in FIG. 1B, and various other figures, a drone as disclosed herein may comprise a plurality of propellers or rotors 120 each having a central hub 125, the hub 125 having a plurality of blades 127 extending radially therefrom. In some embodiments, the hub 125 comprises a lower central tips or landing pad 121 that protrudes or extends downward. The landing pads 121 desirably extend downward beyond a lowermost portion of the outer blades 127 of the rotors to enable the central tips or landing pads 121 to act as landing gear and/or to hold the blades of the rotors 120 above the ground prior to takeoff. The landing pads 121 are desirably at least a sufficient length to prevent the blades 127 from coming into contact with the surface the flying device is resting on. Additionally, it may be desirable for the landing pads 121 to be longer than that, to provide the flying device additional space below the blades 127 that allows them to more efficiently achieve lift when close to or resting on the ground. When a propeller is close to the ground, a ground effect can occur that thrust produced by the propeller harder to control and/or less stable. In some embodiments, by increasing the vertical length 230 of the landing pads 121, this ground effect can be reduced. In some embodiments the central tips or landing pads 121 desirably have a vertical length 230, measured from a lowermost portion of the landing pads 121 to a lowermost portion of the blades 127, greater than 1 millimeter. In some embodiments, a desired range of the vertical length 230 of the central tips or landing pads 121 can be between 3 millimeters and 5 millimeters. In other embodiments, it may be desirable to have a vertical length 230 greater than 5 millimeters based at least in part on the design of the drone body or the propellers. In other embodiments, the length can be less than or equal to 1 millimeter.

In some embodiments, another technique for increasing the efficiency of the rotors or propellers when a portion of the main body is positioned directly above the propeller is to position a turbine above the propeller. The turbine may, for example, comprise a cylindrical shape with a plurality of curved blades configured to increase air-flow to the blades (or propeller system) which, in turn, allows less propeller drag and increases propeller efficiency. Additionally, the turbine desirably allows the blades or propellers to be mounted more closely to solid structures yet still function effectively. Examples of such turbines can be seen in FIGS. 1B and 6, described in more detail below.

Turbines can, in some embodiments, enable the propellers and propeller based propulsion systems to work more efficiently in areas where air-flow is blocked or limited. For example a propeller system mounted directly under a physical structure like the bottom of a wing (or other drone body structure) may be subjected to reduced air-flow as compared to a normal drone, due to the nature of the tight space. The fluid dynamics of such a tight space could cause drag or "air-bouncing" between the surface and the prop, ultimately creating resistance on the propeller, preventing it from performing efficiently enough to create lift and perform correctly (or at least reducing the propeller's efficiency, decreasing stability, and/or the like). Addition of a turbine may help to reduce the turbulent effects of such a tight space. In some embodiments, a turbine is a structure that is either mounted on or molded into, or fused to the outer structure of a spinning motor case like an out-runner motor or directly mounted to the rotor shaft of in-runner type motor.

In some embodiments, a turbine includes a series of blades positioned in a slightly vertical and downwardly facing position that when spinning creates a vortex of downward air-flow on top of the propeller by pulling air from all sides and directing the air downward onto the propeller, thus feeding the propeller with additional air-flow, allowing the propeller to function normally or even enhance the efficiency of the propeller system. Although turbines can be beneficial in some situations (particularly such as when a propeller is closer to the drone's body and/or a greater percentage of the propeller's operating envelope is covered by the drone's body), turbines are not necessarily required, as will be seen in several of the embodiments disclosed herein that operate efficiently without a turbine. Further, any embodiments disclosed herein that include a turbine may have alternative embodiments that do not include the turbine. In some cases, such an alternative embodiment may operate less efficiently, but still within acceptable levels.

A main body of a drone described herein can be formed of a rigid body, a pliable, flexible body, and/or a combination of both. For example, the main body of embodiments disclosed herein may be formed of one or more of a polymer, silicone, plastic, rubber, metal, or another material. In some embodiments, the main body is formed of a pliable or flexible material that can absorb shock. In another example embodiment, the housing is formed of a rigid, lightweight plastic. In some embodiments, the main body comprises a less rigid decorative outer body coupled to an internal frame that is more rigid than the outer body.

One of ordinary skill the art will appreciate that drones can have various configurations with different shapes and sizes. The figures show various example recreational drones, but example embodiments can be utilized with both commercial and recreational drones of different sizes and shapes. The concepts disclosed herein, including the concepts relating to reverse propulsion systems, mock battling systems, and the like, can be used with any flying vehicles capable of implemented these concepts.

Example Drone Embodiments

One example embodiment of a recreational flying device, or drone, is radio-controlled with a controller. The drone has a lightweight plastic body and a plurality of rotor assemblies that extend outwardly and away from the body or a wing. The rotor assemblies are located under or below the body or wing to provide lift via reverse propulsion. The one or more rotor assemblies are located beneath a mass of the body, such as beneath a center of gravity of the body or equally spaced about the center of gravity.

Each rotor assembly includes one or more of a motor, an elongated shaft, and a plurality of blades or propellers that connect to the shaft. The rotor assembly can include a housing or no housing. Further, each rotor assembly can include a separate motor that drives its propellers, or a single motor can drive the propellers of multiple rotor assemblies.

The motor can have various configurations or types, such as an electric motor, a gas powered motor, a brush-less motor, a coreless motor, a rechargeable motor, or other type of motor used in recreational drones.

In some embodiments, the drone is configured to land on the rotor assemblies. In particular, the drone lands on landing pads that are located on one end of the shaft (which is also known as the rotor mast or hub). The landing pads can have various shapes including, but not limited to, a dome shape, a square shape, a rounded shape, a pointed shape, a leg shape, or other shape. In one example embodiment, the landing pads have a dome shape with a flat end or a pointed end.

In one example embodiment, the landing pads have a vertical length sufficient to raise the blades above the ground when the drone is landed. In this manner, the blades will not contact the ground during landing and takeoff of the drone due to the gap from the ground or landing area to the blades.

FIGS. 1-4, and others, illustrate various embodiments of unmanned flying devices or drones. The unmanned flying devices are described herein with reference to a coordinate system wherein a longitudinal axis 191 extends from a forward end to a rearward end of the flying devices. A vertical, central plane generally bisects the flying devices and contains the vertical axis 190 and longitudinal axis 191. A lateral axis 192 extends normal to the longitudinal axis 191 and lies within a horizontal plane. In addition, relative heights are generally expressed as elevations relative to a horizontal surface on which the flying devices are supported in an upright position. The above-described coordinate system is provided for the convenience of describing the flying devices illustrated in many of the accompanying figures. In addition, certain features and components of the flying devices may be described in terms of relative positions or directions within the particular positions and orientations reflected in the drawings, which is merely for convenience.

FIGS. 1A-1C illustrate various views of an embodiment of an unmanned flying device 100 comprising a reverse propulsion system. FIG. 1A is a top view, FIG. 1B is a right side view, and FIG. 1C is a bottom view. The flying device 100 comprises a main body 102 and four propulsion units, columns, assemblies, or motor columns 116 extending or protruding downward therefrom. In this and some of the other embodiments illustrated herein, the main body 102 is depicted by a dashed line showing the outline or profile of the main body. The decorative appearance of the outer surface of the main body is not illustrated in some embodiments. In some embodiments, the term main body is intended to refer to a portion of the body of a drone that encompasses all portions of the body of the drone except for any protruding or extending features that primarily function to couple a motor or propeller unit to the rest of the body. For example, referring to the top view of FIG. 1A, the entire area outlined by the dashed line is considered part of the main body. Similarly, with reference to the top view shown in FIG. 2C, described below, the entire outer profile shown in dashed lines of that drone 200 is considered to encompass the main body. With reference to FIG. 3A, FIG. 3A illustrates a top view of another embodiment of a drone 300. In this view, the portions of the drone that are outlined in dashed lines form part of the main body. However, the protruding arms 350, which are included primarily to position the propulsion units 116 with respect to the rest of the body, are not considered to be part of the main body.

Similarly, the embodiment of a drone 400 illustrated in FIG. 4A includes a main body outlined in dashed lines, with four laterally extending arms 350 not being included or considered as part of the main body.

Returning to the embodiment of FIGS. 1A-1C, the propulsion assemblies 116 may also be referred to as motor units, motor columns, and/or the like. In this embodiment, the propulsion assemblies 116 comprise a motor housing 118 having a motor positioned therein, and a rotor or propeller 120 coupled to the output shaft 119 of the motor. In a typical quad copter or flying device, as mentioned above, the motors and/or propellers are positioned radially outward away from the main body and at an upper portion of the device, such as above a center of gravity of the flying device. In a typical flying device design, it can be desirable to position the blades or rotors above the center of gravity, because this will help to stabilize the aircraft in flight. Positioning the blades or rotors 120 below the body 102 and below the center of gravity of the flying device can make the device more difficult to stabilize (which may be compensated for through sophisticated software controls), but it can also be more aesthetically pleasing when the flying device is intended to mimic the appearance of something else, such as a spaceship from a series of movies.

The exact center of gravity of the flying device 100 is not shown in these drawings or in other drawings herein, however, it is clear in these designs that the rotors 120 are below the center of gravity, because the rotors 120 are the lowermost feature of the flying device 100. An approximate center of gravity 109 is depicted, however, in various figures. For reference when discussing orientations of the flying device, FIGS. 1A and 1B illustrate the front 104, back 106, left 108, right 110, top 112, and bottom 114 portions or directions of the flying device 100.

As illustrated in FIG. 1B, the lowermost central tips or landing pads 121 of the hubs 125 of the rotors 120 protrude or extend downward beyond the outer blades 127 of the rotors to enable the central tips or landing pads 121 to act as landing gear and/or to hold the blades 127 of the rotors 120 above the ground prior to takeoff. The landing pads 121 are desirably of a sufficient vertical length 230 as to prevent the blades 127 of the rotors 120 from coming into contact with the surface the flying device is resting on. Additionally, the landing pads 121 are desirably also of a sufficient length to provide the flying device sufficient space below the rotors 120 to efficiently achieve stable lift. In some embodiments the central tips 121 desirably have a vertical length 230 greater than 1 millimeter. For example, a desired range of the vertical length 230 of the central tips or landing pads 121 can be between 3 millimeters and 5 millimeters. In other embodiments, it may be desirable to have a vertical length 230 greater than 5 millimeters based at least in part on the design of the drone body or the propellers. In other embodiments, the length can be less than or equal to 1 millimeter.

As discussed above, variations in the distance by which the rotors or propellers extend below the main body of the aircraft may affect the flying device's stability during flight. With reference to FIG. 1B, this distance is shown as dimension 130. It can be desirable to keep dimension 130 within a certain range that enables the rotors to not be too close to the main body 102 that the rotors 120 do not operate effectively or efficiently, but not too far from the body 102 that the appearance is awkward and/or the stability of flight is adversely affected. For example, as the rotors 120 are moved closer to the body 102, thus reducing dimension 130, the efficiency of the rotors 120 may diminish. On the other hand, as dimension 130 is increased, the stability and/or ease of piloting may be reduced as the rotors 120 move further below the center of gravity of the aircraft. The optimal range for the dimension 130 may vary based on factors such as mass of the material used, quantity of material used, aerodynamics of the main body 100 design, maximum thrust available based on the propeller 120 design, or other related design or build factors. By way of example, in some embodiments, this length (shown in FIG. 1B as 130) ranges from about 10 millimeters to 36 millimeters. Dimension 130 is further described herein.

With reference to FIG. 1C, which is a bottom view of the flying device 100, it can be seen that the motor columns 116 are positioned such that they protrude directly downward from the main body 102 and do not extend radially outside of an outer radial envelope or profile 103 of the main body 102. Such a placement and/or configuration of the motor columns 116 can vastly improve the aesthetic appearance of the flying device over a typical flying device that comprises radially extending arms to position the motors outside of a radial outer envelope of the central body (e.g., as shown in FIG. 5).

Referring still to FIG. 1C, although in this embodiment the rotors or propellers 120 are positioned such that their blades 127 can extend radially beyond the outer envelope 103 of the main body 102, in some embodiments, they may be positioned differently and may not extend beyond an outer envelope 103 of the main body 102. However, even when the propellers do extend beyond the outer envelope 103 of the main body 102, the rotational speed of the propellers can cause the propellers to not be visible to the human eye as the craft is flying. Accordingly, when the flying device 100 is in flight, a pilot or other observer may only see the main body 102 and the motor columns 116 or motor housings 118 protruding downward therefrom. In some embodiments, the rotors or propellers 120 are made of a clear or substantially clear or transparent material, such as a transparent polymer, that further aids in making the rotors 120 less visible to the human eye, even when not rotating.

Figure 3B:
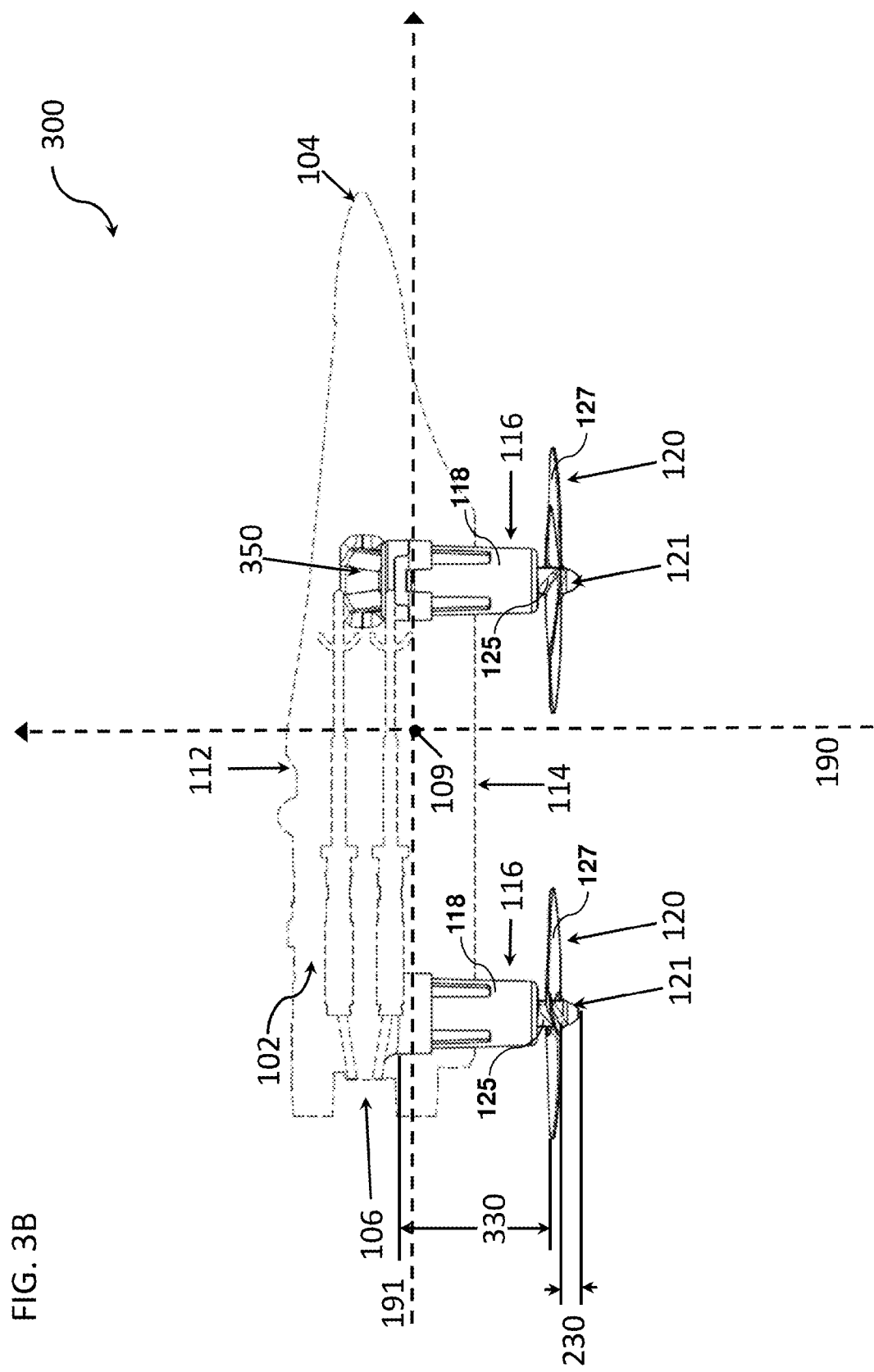
Figure 3C:
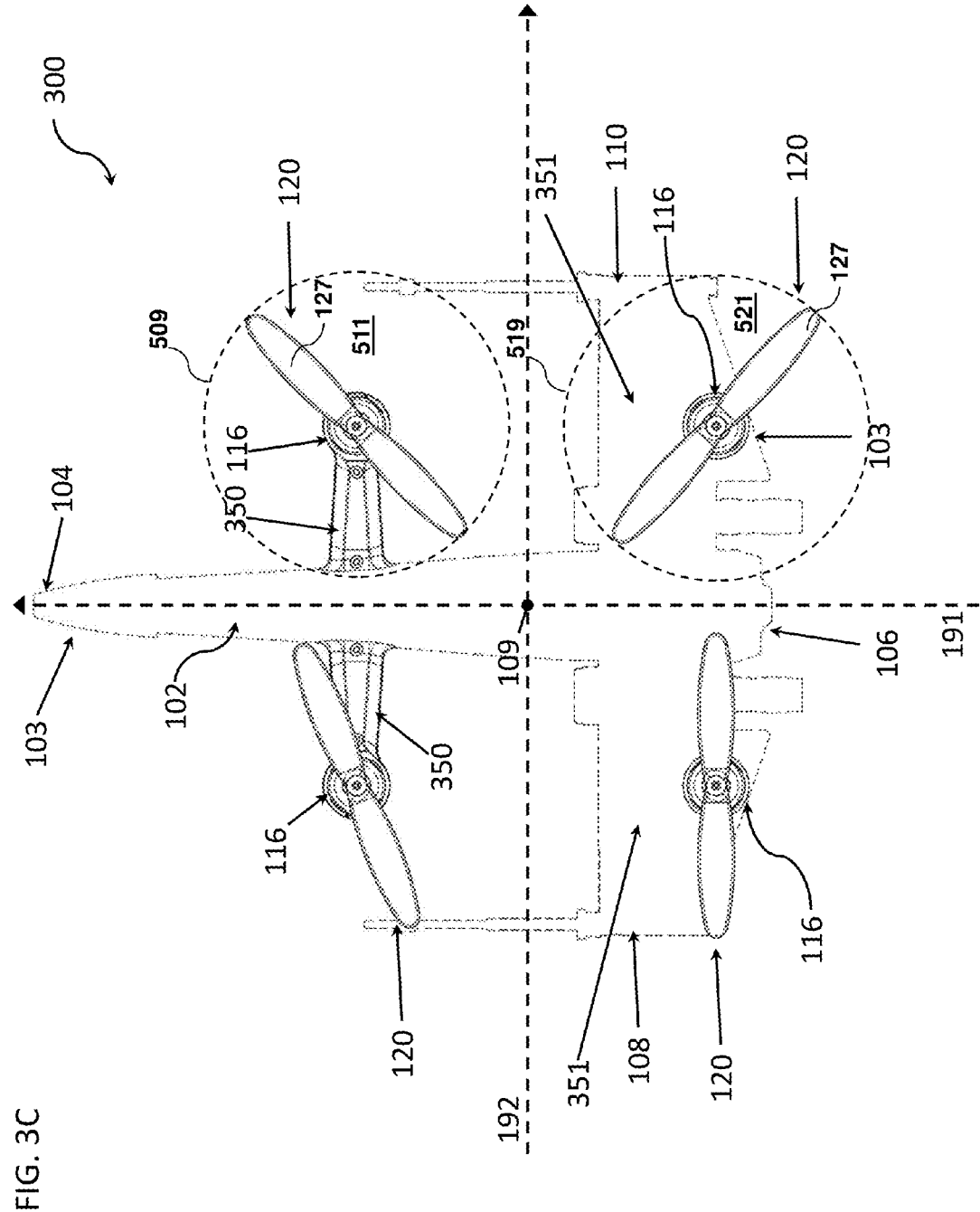
Figure 4A:
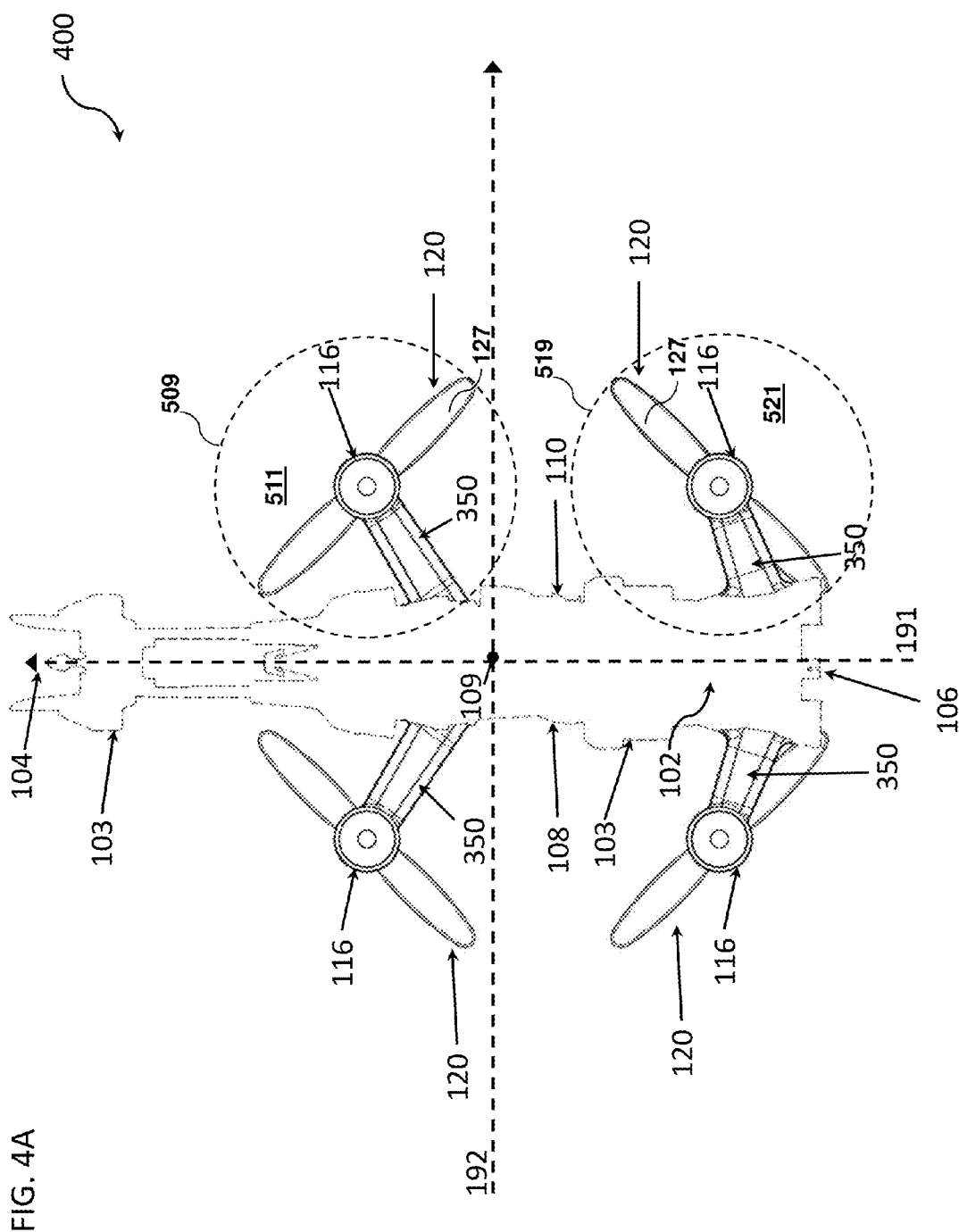
FIGS. 4A-4B illustrate another embodiment of an unmanned flying device comprising a reverse propulsion system.
Figure 4B:
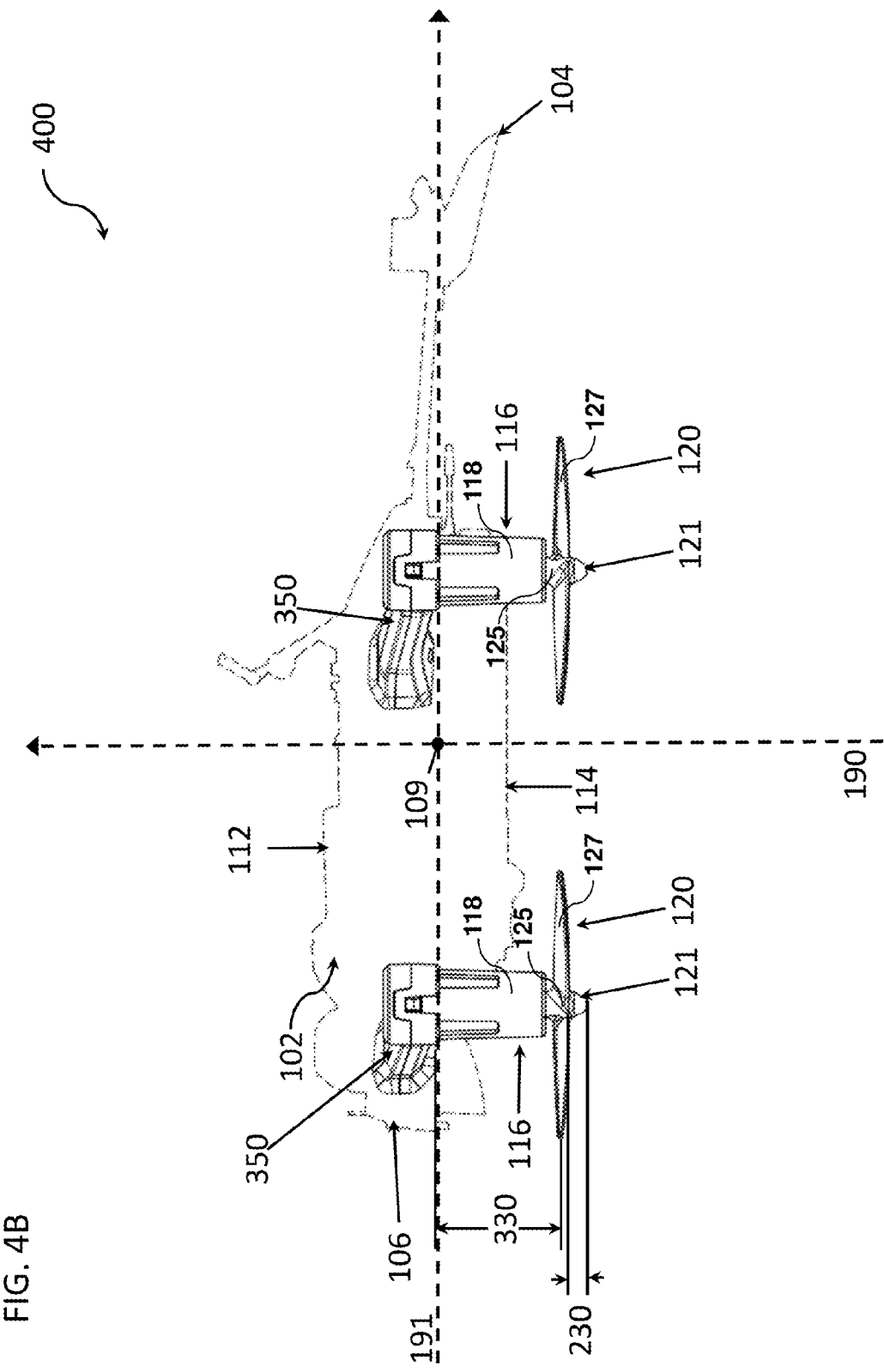

FIGS. 2A-2C, 3A-3C, and 4A-4B illustrate other embodiments of reverse propulsion flying devices that comprise similar features or concepts as the flying device 100 of FIGS. 1A-1C, but that are designed to mimic a different object. For example, flying device 200 is intended to appear as a different spaceship from a series of movies, flying device 300 is intended to appear as yet a different spaceship from a series of movies, and flying device 400 is intended to appear as a hovering scooter-type device from a series of movies. Similar reference numbers are used to indicate similar features as to the features described above with reference to flying device 100. FIGS. 2A, 2B, and 2C illustrate front, bottom, and top views, respectively, of a drone 200. FIGS. 3A, 3B, and 3C illustrate top, right side, and bottom views, respectively, of a drone 300. FIGS. 4A and 4B illustrate top and right side views, respectively, of a drone 400.

With reference to FIGS. 2A-2C, the flying device 200 is similar in many respects to the flying device 100. For example, with reference to FIG. 2B, which is a bottom view of the flying device 200, the motor columns 116 are all positioned within a radial outer envelope 103 of the main body 102. As discussed above, because this can cause the main body 102 to affect airflow to the propellers 120, with reference to FIG. 2A, the motor columns 116 are desirably designed to comprise a sufficient length to sufficiently position the propellers or rotors 120 far enough away from the main body 102 to enable efficient flight, but not too far to be aesthetically displeasing or to cause more unstable flight. The approximate center of gravity 109 is also depicted.

The flying device 300 illustrated in FIGS. 3A-3C is also somewhat similar to the flying devices 100 and 200 described above. However, the flying device 300 is intended to mimic or look like a spaceship having a significantly narrower body (and lighter weight body) than the flying devices 100, 200. As can be seen in FIG. 3B, which is a side view of the flying device 300, the motor columns 116 may be shorter than with flying devices 100 and 200, meaning dimension 330 (defined similarly to dimension 130) can be shorter than dimension 130 of FIG. 1B, because the airflow caused by the rotors may be less affected by the main body 102. Another difference with the flying device 300 is that the front two propulsion assemblies 116 are attached to arms or extensions 350 that extend sideways and somewhat downward from the main body 102. This is different than the rear propulsion assemblies 116, and all of the propulsion assemblies 116 of flying devices 100 and 200, which extend directly downward from the main body 102. In some embodiments, the arms 350 can be relatively small in size, such as to be less noticeable and limit the effect they may have on the intent of the main body 102 to mimic the design of a spaceship from a series of movies. The approximate center of gravity 109 is also depicted.

In some embodiments, such as the flying device 300, the efficiency of the various propulsion assemblies 116 or rotors 120 may vary relative to one another. For example, the forward most rotors 120, which do not have much of the body 102 positioned over them, may be more efficient than the rear rotors 120 which are positioned substantially underneath a portion of the main body 102, namely wings that extend to the left and right from a central portion of the main body 102. Accordingly, the control system of the flying device 300 may be configured to take these differences in efficiency into account when operating the individual motors in flight.

Flying device 400 illustrated in FIGS. 4A-4B is somewhat similar to flying device 300 discussed above. For example, flying device 400 comprises a relatively narrow body 102 that can enable the rotors 120 to be positioned closer to the body 102 than with flying devices 100 and 200. Unlike flying device 300, in flying device 400, as can be seen in FIG. 4A, all four propulsion assemblies 116 are positioned laterally away from the main body 102 by arms 350. The approximate center of gravity 109 is also depicted. In some embodiments, the flying device 400 may further comprise a character (not shown) that is intended to mimic a person riding a flying device. In some embodiments, the character can be configured to be removable from the seat, allowing the seat (which may comprise a battery) to be removed for recharging. FIG. 12, discussed below, illustrates an example of such a removable battery in more detail.

Reverse Propulsion Landing Pads

Some embodiments disclosed herein comprise a recreational flying device that is radio-controlled with a controller. In some embodiments, the flying device has a lightweight plastic body and a plurality of rotor assemblies that extend outwardly and away from the body or a wing (and/or downwardly and away from the body or the wing). The rotor assemblies are located under or below the body or wing to provide lift via reverse propulsion. In some embodiments, the one or more rotor assemblies are located beneath a mass of the body, such as beneath a center of gravity of the body or equally spaced about the center of gravity.

In various embodiments disclosed herein, such as those shown in the figures and referred to as drones 100, 200, 300, and 400, the flying device is configured to land on the propulsion assemblies 116. In particular, the flying device, such as flying device 100, lands on landing pads 121 that are located on one end of the housing or shaft 118 (which is also known as the rotor mast). The landing pads 121 can have various shapes including, but not limited to, a dome shape, a square shape, a rounded shape, a pointed shape, a leg shape, or other shape. In some embodiments, the landing pads have a dome shape with a flat end or a pointed end. The length of the landing pad is shown in FIGS. 1B, 2A, 3B, and 4B as dimension 230.

In some embodiments, the landing pads 121 have a length (e.g., dimension 230) sufficient to raise the blades above the ground when the flying device is landed. In this manner, the blades will not contact the ground during landing and takeoff of the flying device due to the gap from the ground or landing area to the blades. For example, a desired range of the vertical length 230 of the central tips or landing pads 121 can be between 3 millimeters and 5 millimeters. In other embodiments, it may be desirable to have a vertical length 230 greater than 5 millimeters based at least in part on the design of the drone body or the propellers. The vertical length 230 of the landing pads 121 may alternatively be defined as a ratio of the operating diameter of the propeller. For example, in some embodiments, it may be desirable for the vertical length 230 to comprise a distance that is at least 4% of an operating diameter of the propeller. In some embodiments, this percentage may desirably be different, such as, for example, equal to or greater than 5%, 6%, 7%, 8%, 9%, 10%, 11%, 12%, 13%, 14%, 15%, 20%, or 25%. In some embodiments, it may be desirable to make the vertical length 230 longer, to decrease ground effects when the flying device is taking off or landing, but it may also be desirable to make the vertical length 230 shorter, at least for aesthetic purposes. Accordingly, in some embodiments, it may be desirable for the vertical length 230 to be within a range of 4% to 10%. In some embodiments, it may be desirable for the vertical length 230 to be within a range of 4% to 20%.

Figure 7A:
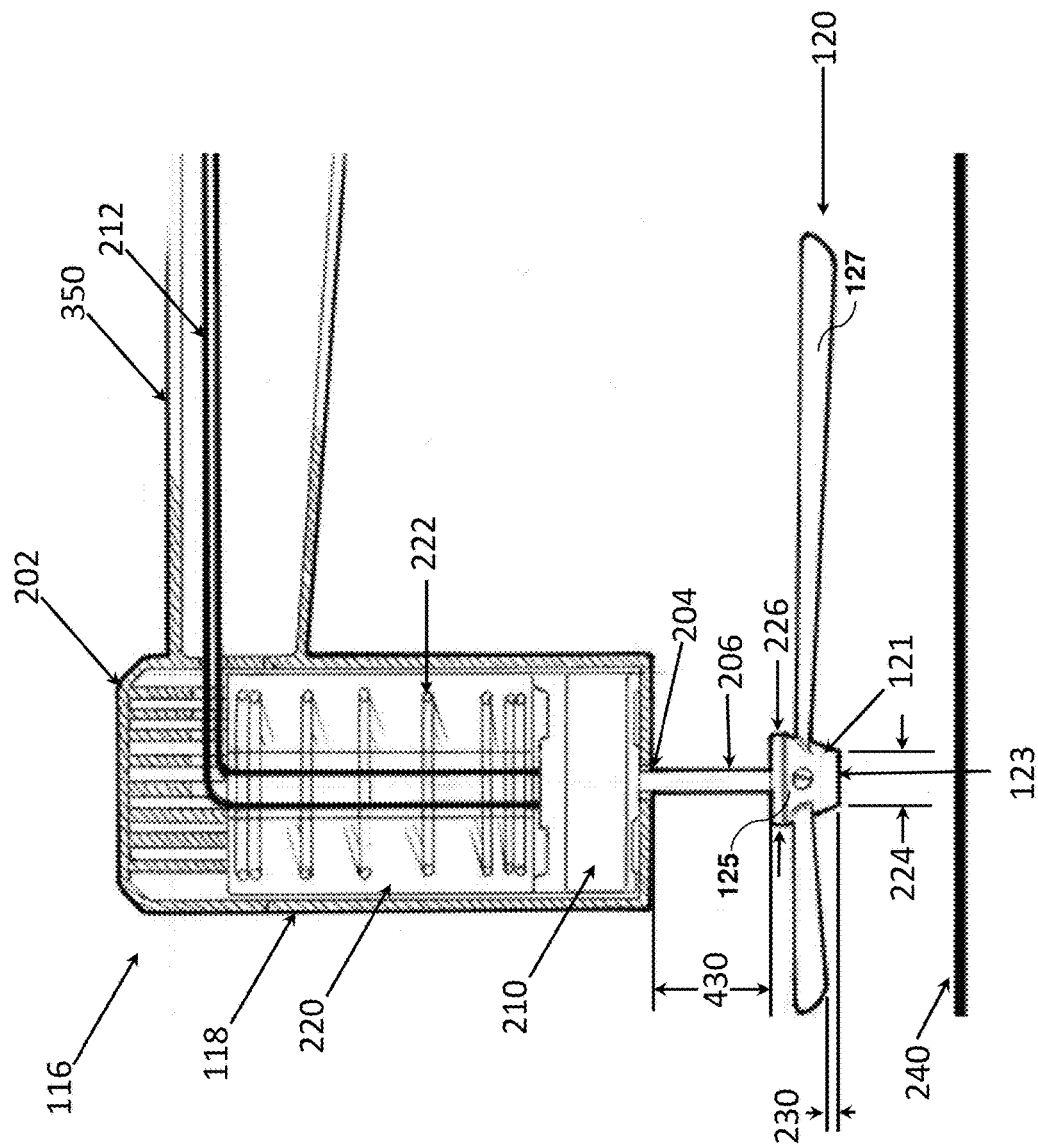
FIG. 7A illustrates an embodiment of a shock absorber system in an uncompressed state.

As shown in FIGS. 1-4, the flying devices can land on the propulsion assemblies 116. In particular, the flying devices land on the landing pads 121 that are located on one end of the hub 125 of the propeller 120. The landing pads 121 can have various shapes including, but not limited to, a dome shape, a square shape, a rounded shape, a pointed shape, a leg shape, or other shape. In some embodiments, the landing pads comprise a flat surface at a distal end, for example as depicted in FIG. 7A as flat surface or flat end 123. FIG. 7A illustrates the flat surface 123 having an outer diameter 224, and the hub 125 having an outer diameter 226. In some embodiments, it is desirable for the flat tip's diameter 224 to be greater than 33% but less than 60% of the hub's diameter 226. In other embodiments, it may be desirable for the flat tip to be larger, such as having diameter 224 be between 60% and 100% of the hub's diameter 226. In other embodiments, the tip may be smaller, or even come to a point (either sharp or rounded), and the diameter 224 may be between 0% and 33% of the hub's diameter 226. There can be trade-offs involved in setting the size of the flat tip. For example, a larger tip may distribute landing impact loads better than a smaller tip. On the other hand, a larger tip may also tend to cause the drone to slide across the ground while the propellers are spinning and the craft has not yet taken flight more than if the tip or smaller. Accordingly, it can be desirable in some embodiments to have a tip diameter 224 that is greater than 10% but less than 50% of the diameter of the hub 226. In some embodiments, the diameter 224 is desirably at least 10%, 20%, 25%, 30%, 40%, or 50% of the hub diameter 226.

The embodiment of landing pads 121 illustrated in FIG. 7A may be used with any of the other embodiments disclosed herein. With reference to the embodiment of FIG. 7A, the lowermost central tips or landing pads 121 of the rotors or blades 120 protrude or extend downward beyond the outer blades 127 of the rotors to enable the central tips or landing pads 121 to act as landing gear and/or to hold the blades of the rotors 120 above the ground prior to takeoff. The landing pads 121 are desirably of a sufficient length as to prevent the blades 127 from coming into contact with the surface 240 the flying device is resting on (or flying directly above). Additionally, the landing pads 121 may also be a sufficient length to provide the flying device sufficient space below the blades 127 to achieve efficient lift that reduces any ground effects in the airflow. The length of the landing pad is shown in FIGS. 1B, 2A, 3B, and 4B as dimension 230. In some embodiments, the central tips 121 desirably have a length, 230, greater than 1 millimeter. In other embodiments, the length, 230, can be less than or equal to 1 millimeter.

As noted, the propulsion units 116 can have an elongated length that positions the propellers 120 below and away from the main body of the flying device, to accommodate airflow from underneath the body of the flying device as the air circulates. By way of example, this length (shown in FIG. 1 as length 130) may in some embodiments range from about 10 mm to 36 mm. This distance, 130, can be measured from the top of a propeller or blade to the bottom of the hull or body of the flying device, or as otherwise described herein. As described in greater detail below, in some embodiments, such as the embodiment shown in FIGS. 7A-7B, the length 130 or 430 can vary based on the spring compressibility and may vary between a certain range depending on how hard of an impact the flying device experiences when landing on a hard surface 240.

Increasing Airflow to the Propellers

As discussed above, various embodiments disclosed herein comprise a configuration wherein the main body of the drone is positioned directly above at least a portion of the operating diameter or operating envelope of the propellers of the propulsion units. Accordingly, the portion of the main body positioned over the propellers may in some embodiments cause a reduction in airflow to the propellers and/or an increased resistance to airflow that may be experienced as a reduction in efficiency of the propellers. One way to address that potential problem, in addition to the various other methods addressed herein, is to include one or more holes in the main body that allow air to flow therethrough. In other words, in order to increase circulation of airflow around the flying device, the one or more portions of the body 102 may include holes or vents that allow air to circulate and pass through the body.

For example, with reference to FIGS. 2A-2C, the main body 102 may in some embodiments include holes, vents, or open areas 207. These open areas 207 enable air to pass through the body of the flying device, to increase the efficiency of the propellers. In this manner, air circulates both around the flying device and through its body, assisting in the efficient operation of the reverse propulsion system. However, in some embodiments, including the embodiment of FIGS. 2A-2C, such holes or open areas 207 may not be required if there is sufficient air circulation around the propellers, for example, as result of the length 130 or general main body 102 design. Additionally, such holes 207 may not be required in reverse propulsion systems as described herein (and may not even be desirable in some embodiments) due to the creation of air pressure beneath the main body 102 of the flying device to create lift. The location of the holes or open areas 207, may be placed in any portion of the main body 102, and not just the locations depicted in FIGS. 2A-2C. Further, there may be any number and configuration of holes.

In some embodiments, it is desirable to minimize the size of the holes or the number of holes in the main body 102 of the flying device such that the relative size of a hole would be smaller than the diameter of the propeller blades 120. The holes may also be any shape such as a circle, square, rectangle, triangle, or the like so that air may pass through. In some embodiments, for example, flying devices 300 or 400 as depicted in at least in FIGS. 3A-3C and 4A-4B, respectively, the main body 102 is designed such that it may be less desirably to have such holes, due to the compact and slim main body 102 which allows air to pass more efficiently around the outer radial envelope 103. In other embodiments, such as flying device 100 or 200, as depicted in at least FIGS. 1A-1C and 2A-2C, respectively, the outer radial envelope 103 is relatively large relative to the propellers 120 (and/or covers a larger proportion of the propellers 120) under the main body 102. Holes through the body may be more desirable in such a design.

In some embodiments, the holes, vents, or openings 207 are sized and positioned such that they are relatively small, such as to not take away from the decorative appearance of the main body 102, but are large enough and/or positioned appropriately to have a significant functional benefit to the propeller or propellers positioned adjacent the openings 207. For example, with reference to the example embodiment illustrated in FIG. 2B, each of the two vent holes 207 is positioned such that at least a portion of the opening 207 is directly above the operating envelope 511 of the propellers. In this embodiment, the opening 207 is positioned such that it provides an opening area directly above the propeller 120 that encompasses less than 10% of the propeller's operating envelope 511. However, even such a relatively small open area can have a significant benefit on the efficiency of the propeller. In other embodiments, the openings 207 are shaped and/or positioned such that the portion of the opening that is directly above and within the operating envelope of the propellers 511 comprises no more than 5%, 15%, 20%, or 25% of the operating envelope 511. In some embodiments, as shown in the embodiment of FIG. 2B, a single opening 207 is positioned above more than one propeller's operating envelope 511. In other embodiments, however, a single opening may be positioned directly above a single propeller operating envelope, or may be positioned above more than two propeller operating envelopes. Further, in some embodiments, more than one opening may be positioned above the same propeller, and their combined area that is directly above the propeller's operating envelope may be no more than 5%, 10%, 15%, 20%, or 25%.

FIG. 2A shows the rotor assemblies 116 with a housing 118 forming a downward extending column. The housing 118 includes an elongated cylindrical shape having one end that connects to an underside of the body 102 of the flying device 200 and an oppositely disposed end with a hole through which the rotating shaft (i.e. the motor output shaft) extends. The shaft connects to and drives the blades 120. In this embodiment, the motor output shaft is not visible from the outside of the drone, The motor and the shaft are housed or enclosed inside the housing 118.

The housing can be formed of a rigid body or a pliable, flexible body. For example, the housing is formed of one or more of a polymer, silicone, plastic, rubber, metal, or another material. In some embodiments, the housing is formed of a pliable or flexible material that can absorb shock. In another example embodiment, the housing is formed of a rigid, lightweight plastic.

Figure 6:
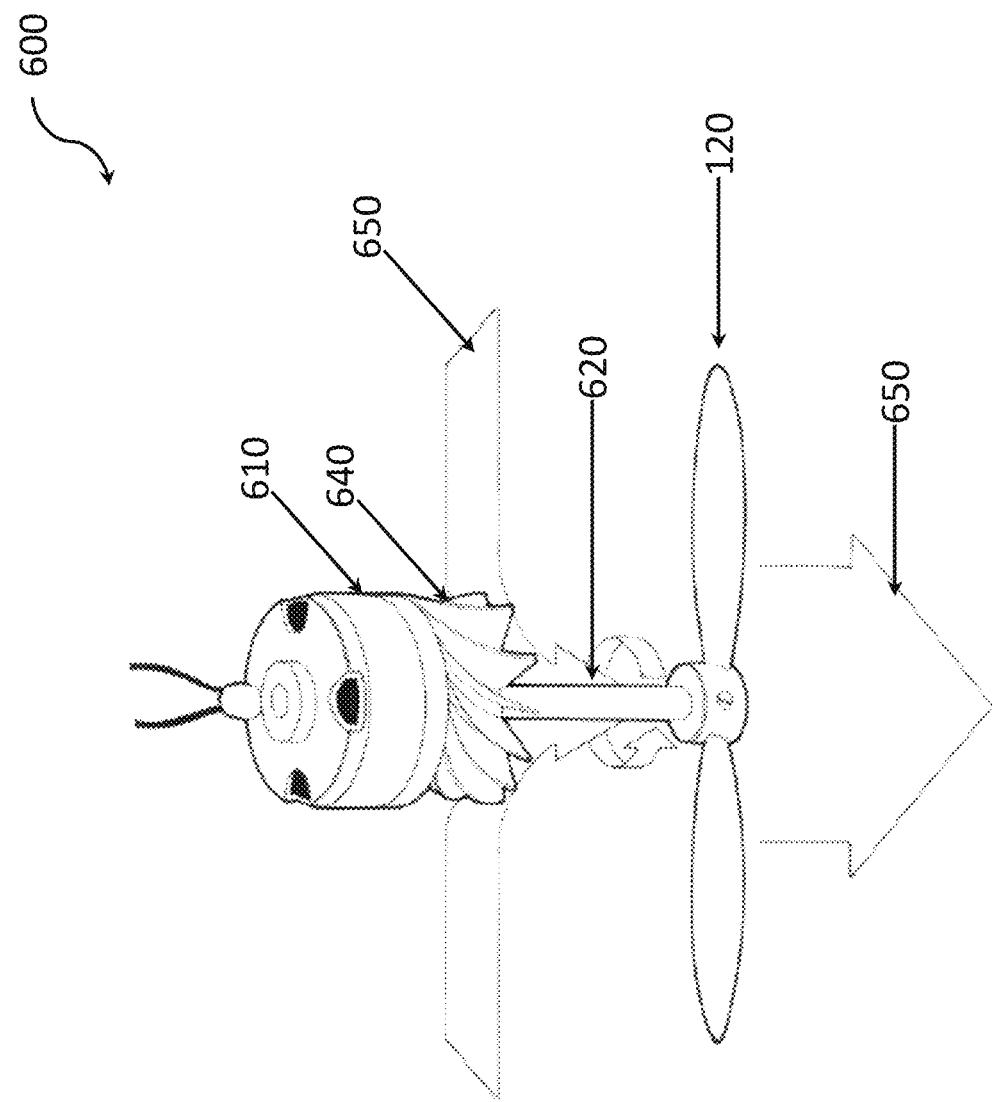
FIG. 6 illustrates an example embodiment of a rotary system of an unmanned flying device comprising an elongated shaft and turbine.

Another example of a way to increase airflow to the propellers, and/or to increase the propeller efficiency, is to add a turbine above the propeller. FIG. 6 shows an example of a rotary system 600. This system includes a motor 610, an elongated shaft 620, a plurality of blades or rotors 120 that connect to the shaft, and a turbine 640. The turbine has a cylindrical shape with a plurality of curved blades as shown. The turbine increases air-flow 650 to the blades 120 (or propeller system) which, in turn, can allow less propeller drag and increases propeller efficiency. Additionally, the turbine can allow the blades or propellers to be mounted more closely to solid structures yet still function effectively. It should be appreciated that a turbine is not required to achieve lift in some embodiments, but that it may be beneficial in some embodiments. The embodiment shown in FIGS. 1A-1C shows an example implementation of such a turbine 640.

In some embodiments, as shown in FIG. 6, the turbine 640 includes a series of blades or vanes positioned in a slightly vertical and down facing position that when spinning creates a vortex of downward air-flow 650 on top of the propeller by pulling air from all sides and directing downward on the propeller, thus feeding the propeller with additional air-flow, allowing the propeller to function normally or even enhance the efficiency of the propeller system.

In some embodiments, a turbine enables the propellers and propeller based propulsion systems to work more effectively in areas where air-flow is blocked or limited. For example, a propeller system that would be mounted directly under a physical structure like the bottom of a wing or other portion of a drone body where air-flow would normally be restricted due to the nature of the tight space and cause drag or "air-bouncing" between the surface and the prop ultimately creating resistance on the propeller, preventing it from performing efficiently enough to create lift and perform correctly. This turbine type device is of a mechanical nature, such as a structure that is either mounted on or molded into, or fused to the outer structure of a spinning motor case like an out-runner motor or directly mounted to the rotor shaft of in-runner type motor.

Absorption of Landing Impact Loads

Recreational radio-controlled flying devices typically have one or more rotors attached to a main body. These rotors are located above the body and force air downwardly as the blades of the rotors spin. One problem is that these rotors or the drone itself can readily break if the drone lands too hard, falls, or hits an object. Example embodiments solve this problem and other problems by providing a drone with a shock absorber system located on or with the rotor assembly.

One reason typical drones are designed with the propellers at the top or at an upper side of a motor is that the propellers can be fragile devices, and a user typically does not want propellers to contact anything, because they may break and/or harm other objects. If the propellers contact the ground or other objects, they may break and/or cause damage to the object they contact. In a reverse propulsion design, where the propellers are below the body of the flying device, and wherein the propellers may be the lowermost or one of the lowermost objects of the flying device, it can be desirable to include features that limit the possibility of breakage or damage when landing or taking off, and/or that strive to not take away from the mimicked design of the, for example, spaceship.

One way to limit damage with a reverse propulsion design is to include landing gear, such as one or more protruding legs that protrude beyond the propellers and contact the ground to keep the propellers raised above the ground. Such a design can be undesirable in some embodiments, particularly in embodiments where the flying device design is attempting to mimic a fictional spaceship or other object, because the landing gear can cause the flying device to look less like the object it is trying to mimic. Accordingly, it can be desirable in some embodiments to enable downward protruding motor columns comprising rotors or propellers at their distal ends to be the only features that extend downward from the main body of the aircraft.

One way to enable the motor columns and rotors to be the only features that extend downward from the aircraft body is to design them in a way that enables the propellers themselves to act as landing gear. For example, some embodiments disclosed herein comprise propellers having a rounded or conically shaped tip (or otherwise shaped tip) in the middle which protrudes downward further than the blades of the propeller. Examples of this can be seen in, for example, FIGS. 1-4, with reference to portions 121 of the propellers 120. In some embodiments, the middle or tip portion of the rotor or propeller is shaped similarly to a spinning top. By including a protruding tip configured to spin on a surface, the tips of the four rotors or propellers can act as landing gear and can keep the propeller blades raised above the ground or surface during landing and liftoff. In some embodiments, the propeller's tip may be able to remain stationary relative to the propeller, such that while the tip is in contact with the ground, for example, the propellers can spin to create the necessary lift for the flying device to achieve flight. In some embodiments, the propeller's tip may be more conically shaped such that, even if the tip spins with the corresponding propellers, friction with the surface, for example the ground, is minimized and the flying device can still achieve flight.

One potential disadvantage of using the propellers themselves as landing gear is that shock or impact forces can be imparted into the propellers, motors, motor shafts, and/or the like upon landing. Accordingly, in some embodiments, the motor columns, motor, and/or rotor are designed to enable at least some impact or shock loads to be absorbed. For example, a silicone or other compliant material gasket or washer may be included that enables the rotor and/or motor to move or compress upward toward the main body of the device at least partially when an impact force is applied to the central tip of the propeller. In some embodiments, a spring may be used to enable at least some compression of the motor columns. The spring may comprise a silicone, rubber, metal, and/or the like. In some embodiments, the spring and/or a separate component may comprise at least some damping properties to enable damping of the impact force upon landing. Damping may be desirable, for example, so that the flying device does not bounce unnecessarily upon landing.

A spring and/or damper system or component may be included at one or more locations of the flying device to enable absorbing of landing impacts. For example, a spring and/or damper component may be positioned between the propeller and the output shaft of the motor, between the output shaft of the motor and the nonrotating portion of the motor, between the motor and the motor column within which the motor is mounted, between the motor column and the main body of the flying device, between slidably coupled portions of a collapsible column, and/or the like. In some embodiments, more than one shock absorbing mechanism is used. For example, there may be some compliance between the propeller and the output shaft of the motor, and there may also be some compliance built into the motor column. In some embodiments, the central portion or protruding tip of the propeller may comprise shock absorbing properties. For example, a protruding tip portion of the propeller or rotor may comprise rubber, silicone, and/or the like.

Figure 7B:
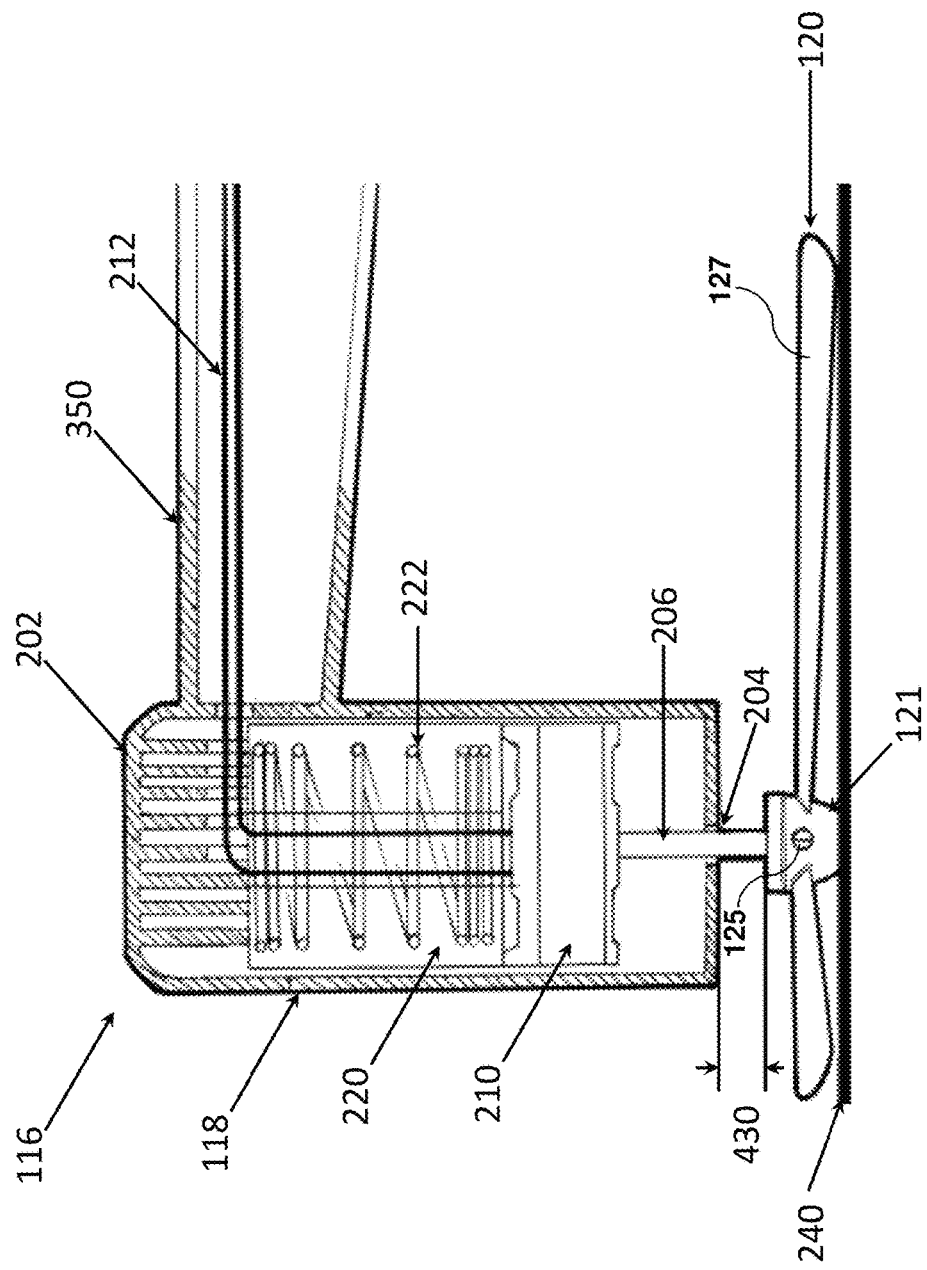
FIG. 7B illustrates the shock absorber system of FIG. 7A in a compressed state.

FIGS. 7A and 7B illustrate one example of a motor housing or propulsion unit comprising a shock absorbing assembly. Although this embodiment is showing a propulsion unit 116 attached to a laterally extending arm 350, similar to some of the propulsion units of drones 300 and 400, similar concepts may be applied to propulsion units that extend directly downward from the drone's main body, such as the propulsion units of drones 100 and 200. Looking to FIGS. 7A and 7B, each propulsion assembly 116 includes a housing, column, or shaft 118, a motor 210, a shock absorber system 220, and a propeller 120 comprising a plurality of blades 127. By way of example, the housing or shaft 118 includes an elongated cylindrical shape having one end with a closed cap or end 202 and an oppositely disposed end with a hole 204 through which a rotating shaft 206 extends. The shaft 206 connects to and drives the propeller 120. The motor 210 and the shock absorber system 220 are housed or enclosed inside the housing 118.

The arm or extension 350 connects to the housing or shaft 118 and includes a plurality of electrical connections or wires 212 for powering the motor 210. These electrical connections 212 (such as wires) can pass through or around the shock absorber system 220.

The housing or shaft 118 can be formed of a rigid body or a pliable, flexible body. For example, the housing is formed of one or more of a polymer, silicone, plastic, rubber, metal, or another material. In some embodiments, the housing or shaft 118 is formed of a pliable or flexible material that can absorb shock. In another example embodiment, the housing is formed of a rigid, lightweight plastic.

The motor 210 can have various configurations or types, such as an electric motor, a gas powered motor, a brush-less motor, a coreless motor, a rechargeable motor, or other type of motor used in recreational flying devices.

The shock absorber system 220 includes one or more shock absorbers 222 that absorbs or dampens shock impulses, such as when the flying device lands or impacts an object. By way of example, the shock absorbers include, but are not limited to, one or more of a spring, a hydraulic shock absorber, foam, an elastic material, rubber (including an O-ring), a torsion bar, or other material or device that can absorb and dampen shock.

As shown in FIGS. 7A and 7B, the motor 210 and shock absorber system 220 are moveable inside the internal cavity of the housing, column, or shaft 118, which is a part of the propulsion assembly 116. In this manner, the motor 210 moves from a first position (shown in FIG. 7A) to a second position (shown in FIG. 7B). In the first position, the shock absorber 222 is in an uncompressed or relaxed state; and in the second position, the shock absorber 222 is in a compressed state.

The shock absorber system 220 moves the motor 210 within the housing or shaft 118 in order to protect the motor and other components from being damaged when the flying device lands, falls, or otherwise experiences an impact to the landing gear or body.

In one embodiment, one end of the motor 210 connects to one end of the shaft 206. A second end of the shaft 206 connects to the propeller 120. When the flying device lands on the ground 240, or hits another object (not shown), the shock absorber system 220 absorbs at least a portion of the shock or impact of the landing. The motor 210 moves upwardly inside the cavity of the housing or shaft 118 as the shock absorber 222 compresses (shown in FIG. 7A). After the flying device takes flight, or the load of the impact is removed, the motor 210 moves downwardly (due to the force or bias from the shock absorber 222) inside the cavity of the housing toward the ground 240. The motor is thus able to move or float inside the housing during landing and takeoff of the flying device. In some embodiments, the motor 210 may move a distance of 0% to 33.3% of the length of the propulsion unit 116. The length may be measured from the top, exterior end of the propulsion unit 116 at the location of the closed cap or end 202, to the bottom exterior portion of the propulsion unit 116 at the location of the hole 204 through which a rotating shaft 206 extends. The movement is based on the length of the shaft 206, the force of the impact with the ground 240, and/or the stiffness of the shock absorbers 222. In other embodiments, it could be possible to increase the movement to a range of 0% to 45%.

One of ordinary skill in the art will appreciate that drones can have various configurations with different shapes and sizes. The figures show an example recreational drone, but example embodiments can be utilized with both commercial and recreational drones of different sizes and shapes.

Figure 7C:
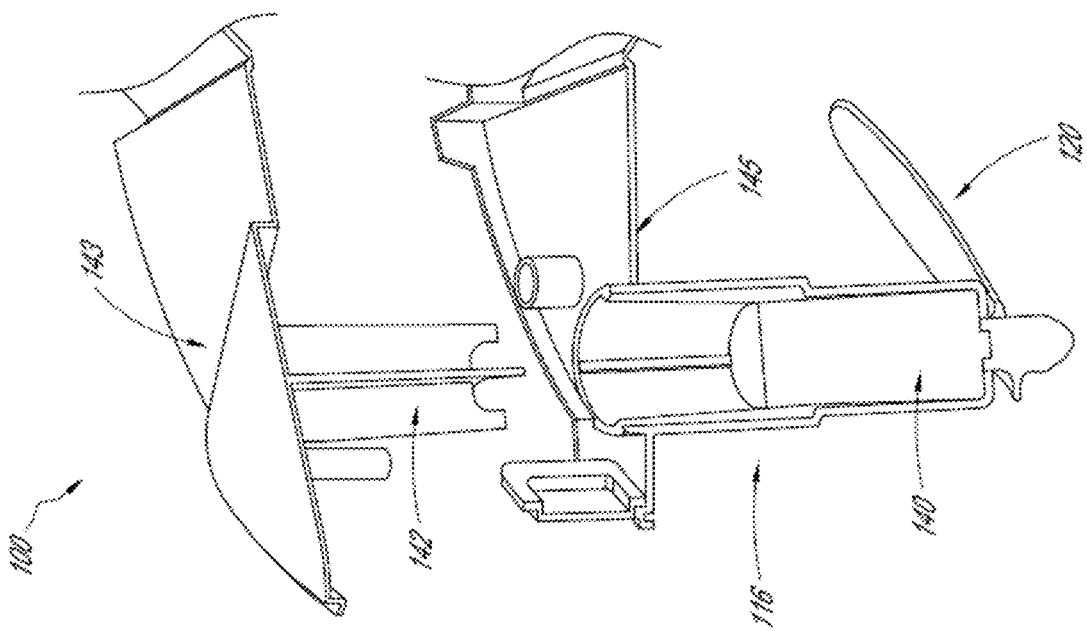
FIGS. 7C and 7D illustrate an alternative embodiment of a motor unit that does not comprise a shock absorber system.
Figure 7D:
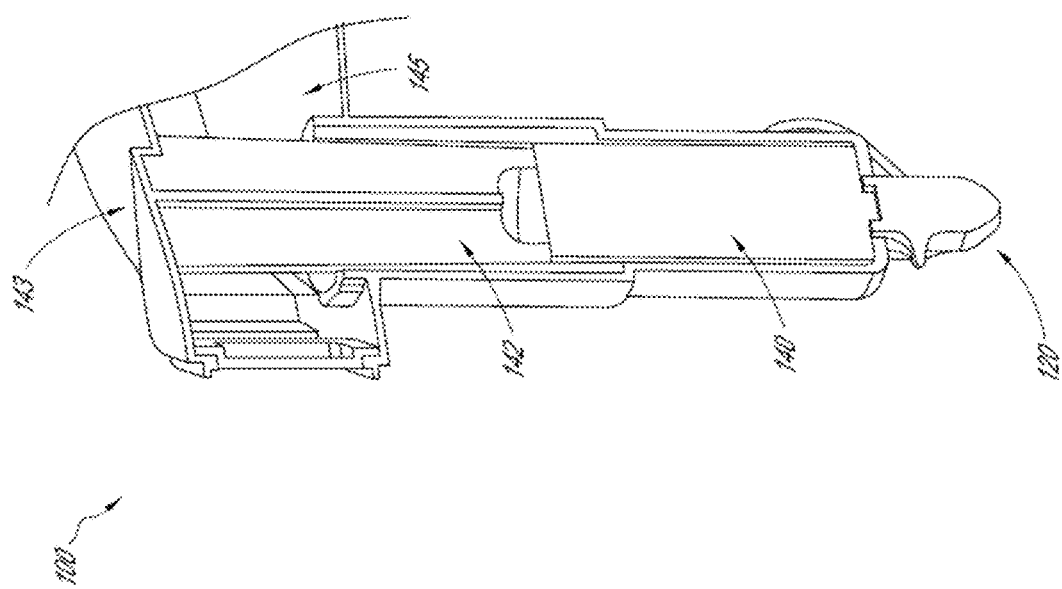

FIG. 7C illustrates a cross-sectional exploded view of an alternative embodiment of a propulsion unit 116. In this embodiment, a top half 143 of the main body 102 is shown separated from a bottom half 145 of the main body 102. The motor columns 116 comprise a motor 140 positioned therein and a downward protruding column 142, which protrudes downward from the top half 143 of the main body, and engages a rear or top end of the motor 140 to help retain the motor 140 in place. In some embodiments, one or more spring and/or damper and/or impact absorbing components may be positioned at various locations in or around the motor columns 116 to enable absorbing the impact of landing. For example, an impact absorbing mechanism, such as a rubber or silicone gasket or washer may be positioned between the rotor 120 and motor 140, motor 140 and column 142, and/or the like. FIG. 7D illustrates a similar cross-sectional view as in FIG. 7C, except the top half 143 and bottom half 145 have been assembled together, and the column 142 has engaged the top or rear end of the motor 140. In this case, no impact absorbing component is included, and protruding column 142 directly contacts the motor 140.

Mock Drone Battling—Laser/IR Generating and Sensing and Wireless Communication

Some of the embodiments described herein relate to apparatus and methods that provide for flying devices with one or more optical light generators and one or more light sensors and the method of operating the same in simulated recreational optical shooting games. In various embodiments disclosed herein, light generators may generate laser light, infrared light, invisible light, visible light, and/or the like. Any references to laser light generators may be replaced with infrared light generators, and vice versa. For efficiency, in some embodiments, generators are referred to simply as light generators or optical light generators. Such generators may product laser light, infrared light, visible light, invisible light, any combination of these, and/or the like. Such generated light may also be referred to as a light beam. However, it should be noted that generated light in some embodiments may have a narrow field of dispersion and generated light in other embodiments may have a wider field of dispersion, which may not necessarily be referred to as a beam.

FIGS. 8A and 8B show a flying device 200 with two optical light generators 801 generating a laser light beam. The device may also comprise one or more light sensors (not shown) sensing a laser light from another drone. When the sensed laser light is sensed by the light sensor, a signal is generated and transferred to a controller of the flying device, and the controller then reacts with predetermined responses. FIGS. 9, 10, and 11 show additional flying devices with light generators 801. In this and any of the other embodiments, the one or more light generators may be positioned anywhere on the flying device that enable the light generator to project light from the flying device that may be detected by another flying device, such as to simulate weapons. Further, the light generated is not limited to laser light, and may comprise other types of light, such as infrared light. Further, in this and any of the other embodiments, one or more light sensors may be positioned anywhere on the flying device that enables detection of light generated by a light generator of another flying device. In some embodiments, it may be desirable to position a light sensor at a particular location or area of the flying device, such as to enable detection of a simulated weapon hit at that particular area of the flying device. For example, a light sensor may be positioned at or near a bottom of a flying device, and such light sensor may be configured to detect a simulated weapon hit to a bottom portion of the flying device. In other embodiments, a light sensor may be positioned at any other area of the flying device, and such light sensor may be configured to detect a simulated weapon hit at that area.

By way of example, the sensed laser light is generated by another flying device and the sensed laser light has the same wavelength as that of the generated laser light. In some embodiments, the laser light may be a Class II laser light.

In some embodiments, when the sensed laser light is sensed by the light sensor, a signal is generated and the flying device reacts with predetermined responses. The predetermined responses of the controller and the flying device may include vibration, sound, or visual alarm.

In some embodiments, the controller and/or the flying device may have one or more speakers and/or one or more LEDs that produce a sound or light when the flying device generates or senses a laser.

In some embodiments, the flying device has more than one, or multiple, light sensors, which are located at different positions on the flying device, such as a cockpit, an engine or a wing. The light sensors may generate different signals when a laser light is sensed by different sensors. In response to such different signals, the controller and/or flying device may then reacts with different predetermined responses, such as different sounds and/or different LED colors.

In some embodiments, the laser light generator and the light sensor are connected with a power supply or a battery, which can be the one of the flying device or a separate one.

FIGS. 8B, 9B, 10B, and 11B illustrate one or more light generators 801 that are positioned in the laser cannons of the associated flying device of FIGS. 8A, 9A, 10A, and 11A. In some embodiments, the light sensors can protrude out of the main body of the device without any portion of the main body 102 covering the sensor(s). In other embodiments, the light sensor(s) may be recessed within a portion of the main body 102.

FIGS. 8A, 9A, 10A, and 11A are used as example embodiments to describe the operating method in war games (i.e. mock battling). For example, the light generator 801 is controllable by the user (such as via a remote control unit), such that when two or more flying devices according to the above-described embodiments are being operated in the same vicinity and activating their respective laser light (or infrared light, and/or other type of light) onto each other, the generated light of a first flying device hits the light sensor of a second flying device. In response to a detected light signal, the sensor of the second flying device detects the laser light and creates a signal to a controller of the second flying device to notify the second flying device that it has been hit. The controller then initiates a predetermined, or preprogrammed, response(s). In some embodiments, only one flying device is needed and laser light generated from another device (whether flying or not) can interact with the flying device.

In some embodiments, a user activates the generation of the laser light (or other type of light), which may be performed by a controller. The controller may also limit the light generation by a certain time so that the laser is only generated a maximum of once per a specified period of time, for example the signal may be limited to being generated a maximum of once per second. In other embodiments there may be no limit imposed on the user to control the frequency of signal generations.

In some embodiments, several types of light may be generated by the flying device. For example, the flying device may have a light generator and sensor (either separate components or the same component that can perform both functions). The flying device may also have an infrared (IR) transmitter and receiver. Having both options available allow a user to simulate the firing of different weapons, such that the laser generated light is one weapon and the IR light is another weapon. In some embodiments, the laser and/or the IR light generation may be limited by software.

In some embodiments, only one system for light generation may be active at one time. If the laser generation components are activated then one or more of the IR components would be deactivated. For example, the sensor may remain turned on to detect another device's IR generated signal, but the IR transmitter may be turned off to prevent the generation of IR light while the light generator is activated. In some embodiments, only flying devices set on IR mode (where the laser transmitter and receiver are turned off) may interact with other flying devices set on the same IR mode.

One difference between IR light and laser light is that the IR light can bounce off walls or other physical objects before hitting another devices sensor. In some embodiments, the flying device that generates the IR signal may also be able to recognize its own generated signal once it is detected by the sensor.

In some embodiments, when the sensed laser light (or other type of light) is sensed by the light sensor, a signal is generated and the flying device reacts with predetermined response(s). The predetermined response(s) of the controller and the flying device may include vibration, sound, or visual indicators. Alternatively, in some embodiments, the flying device can perform a predetermined flight sequence, for example landing to indicate that it has been destroyed in the simulated game, or alternatively, for example, deactivating its light generators 801, or other features of the flying device, such as flight speed, or the like. In some embodiments, there may be a series of lights on the remote controller and/or flying device such that each successive hit either turns on or off a light to indicate the health or status of the flying device. For example, when beginning a game two or more LED lights may be turned on and after each successive hit, or each time a sensor detects light (either IR or laser, or both depending on the mode it was set on) one or more LED lights may turn off. In some embodiments, when the flying device has been hit a sufficient number of times, the light generator may be turned off to keep the flying device out of the game. In some embodiments, the flying device may initiate a predetermined flight sequence. This flight sequence may include a landing sequence such that the flying device can stop responding to some or all user input from a controller and automatically land on a nearby surface. In some embodiments, the flight path may involve a spiral downwards. In some embodiments control of the flying device may be limited to a certain amount of time such that a user may regain control of the flying device and continue playing in the game or flying. For example, a user may not have the ability to control throttle of the flying device for 10 seconds.

In some embodiments, the flying device has more than one light sensor. When the laser light of the first flying device is sensed by different light sensors located on the different positions of the second flying device, such as a cockpit, an engine, or a wing, different signals are generated. In response to such different signals, the controller/flying device then reacts with different predetermined responses associated with each different signal, such as different sounds and/or different LED colors.

One of ordinary skill the art will appreciate that the flying device itself can have various geometric shapes and sizes, and light generators and sensors can be positioned anywhere on the body that allows them to project light away from the body or detect light project toward the body. By way of example, some devices may have a configuration as shown in FIGS. 8A, 9A, 10A, and 11A. The light generator is positioned at the laser cannon(s) of such configurations as shown in FIGS. 8B, 9B, 10B, and 11B, respectively.

Mock Battling System

Figure 18:
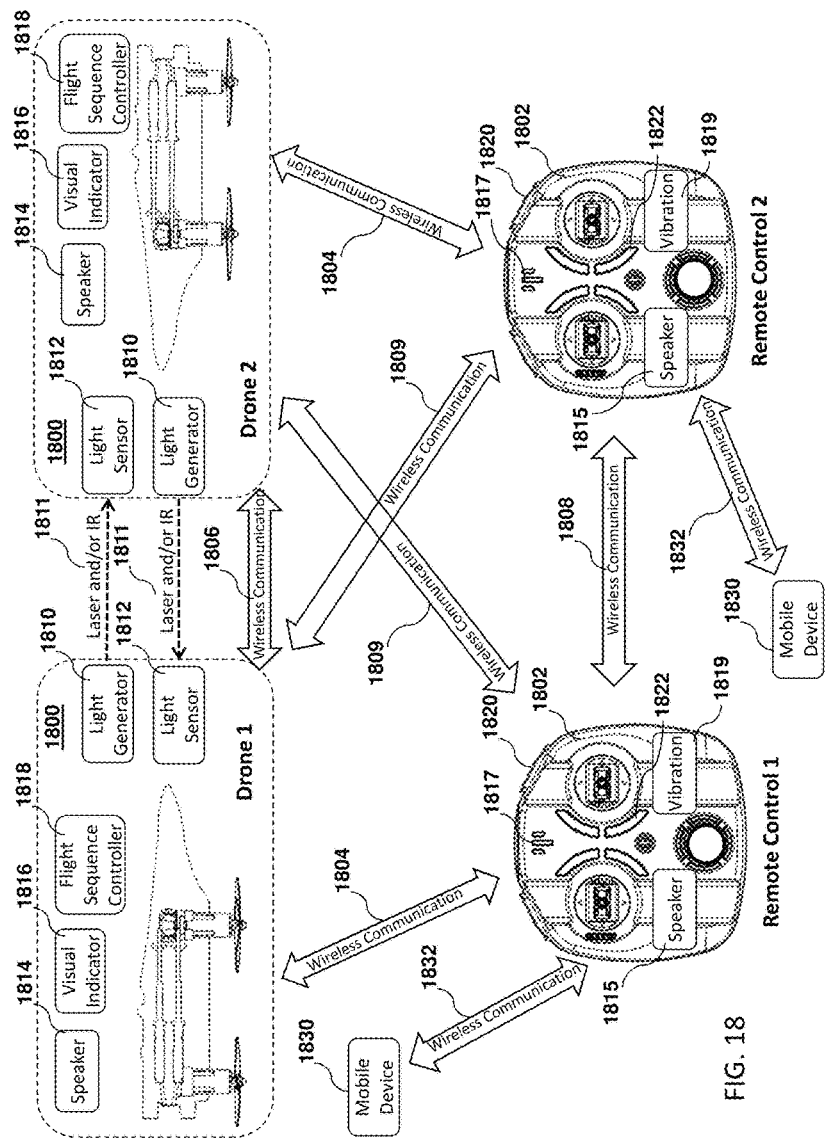
FIG. 18 illustrates an example embodiment of a system diagram of two drones participating in a mock battle.

FIG. 18 illustrates an embodiment of a system diagram comprising two drones 1800 and two wireless remote controllers 1802 configured to conduct mock battling or games using optical weapons, such as infrared or laser generators. Although this embodiment comprises two drones 1800 and two remote control units 1802, similar concepts may be used to conduct mock drone battles or optical weapon gaming using any number of drones and remote control units. Further, although the drones 1800 illustrated in FIG. 18 are similar to the drone 300 illustrated in FIGS. 3A-3C and comprise reverse propulsion technology as disclosed herein, the concepts illustrated in FIG. 18 and described with reference to FIG. 18 may be used with various other flying devices that may not comprise reverse propulsion technology.

In the system block diagram illustrated in FIG. 18, each of the remote control units 1802 communicates wirelessly with its corresponding drone 1800 using a wireless communication link 1804. For example, remote-control one is configured to wirelessly communicate with and control the flight of drone one, and remote control two is configured to wirelessly communicate with and control the flight of drone two. The wireless communication links 1804 may utilize any frequency and/or protocol having a sufficient bandwidth and/or range to enable the remote control units 1802 to control the flight of the drones 1800. For example, in some embodiments, the wireless communication links 1804 comprise a 2.4 GHz wireless connection. In some embodiments, the wireless communication links 1804 are bidirectional, meaning data can be transmitted back from the drones 1800 to the controllers 1802, in addition to data being transmitted from the controllers 1802 to the drones 1800.

In some embodiments, it can be desirable to have additional wireless communication links between the controllers and drones, such as to enable functionality that makes a mock battle or optical weapon battling game more enjoyable. For example, the drones 1800 may comprise a wireless communication link 1806, the remote control units 1802 may comprise a wireless communication link 1808, and/or the remote control units 1802 may comprise a wireless communication link 1809 with a drone 1800 other than the drone 1800 that is currently being operated by that remote control unit 1802. These additional wireless communication links 1806, 1808, and 1809 may comprise the same protocol as wireless communication links 1804 or may utilize a different protocol. For example, in some embodiments, a shorter range Bluetooth or other protocol may be used for the wireless communication link 1808 between the two remote control unit 1802, and a longer-range wireless protocol may be used for the various wireless communication links between the drones 1800, and the drones 1800 and controllers 1802. This may be desirable in some embodiments, because the users or pilots of the drones, which are operating the remote control units 1802, may be in relatively close proximity, while the drones 1800 may be relatively far away from each other and/or the remote control units during flight.

Although FIG. 18 illustrates a plurality of wireless communication links, some embodiments may not include all of these wireless communication links, and/or some of these wireless communication links may be intermittent and not utilized throughout an entire flight operation or mock battle.

In some embodiments, the remote control units and the drones may comprise more than one wireless transmitter, receiver, and/or transceiver. In some embodiments, the various communications occurring in real time via the more than one wireless transmitters, receivers, and/or transceivers is coordinated by a single CPU or processor of the remote control unit. In some embodiments, this coordination is implemented by more than one CPU or processor of the remote control unit. For example, in order to more efficiently simultaneously utilize various wireless communication channels, such as, for example, wireless communication links 1804, 1806, 1808, 1809, and 1832, it may be desirable for one or more of the devices to comprise more than one radio that allows simultaneous or substantially simultaneous communications using different protocols, different frequencies, and/or the like. For example, the remote control units 1802 may comprise in some embodiments two separate radio transceivers configured to operate using a 2.4 GHz wireless communication link, and a third radio transceiver that is configured to operate using a Bluetooth communication link. For example, remote-control one may comprise a first 2.4 GHz radio that is utilized to communicate with drone one via wireless communication link 1804. Remote-control one may further comprise a second 2.4 GHz radio that is utilized to communicate with remote control two via wireless communication link 1808. Remote-control one may further comprise a Bluetooth radio that is configured to communicate with a mobile device 1830 via wireless communication link 1832. Although this example gives a specific example configuration using two 2.4 GHz radios and one Bluetooth radio, various other configurations may be utilized that comprise fewer radios, a greater number of radios, radios all using the same frequency or protocol, radios each using a different frequency of protocol, some radios using a same or similar frequency or protocol and others using different frequencies or protocols, and or the like. Further, one or more of the wireless communication links disclosed herein may operate using something other than radio communication. For example, wireless communication link 1806 between the drones may in some embodiments utilize light to transmit data instead of radio waves. As an example, laser and/or infrared light may be used for drones to communicate with each other, as described elsewhere herein with respect to the light generators 1810 and light sensors 1812, and/or as a supplement to the light generators 1810 and light sensors 1812. In some embodiments, Li-Fi may be used to transmit data between drones and/or between other components of the system.

In some embodiments, at least some information or data may be relayed from one device to another in a gaming or mock battling system as illustrated in FIG. 18. For example, when conducting a mock battle or game using optical weapons, the drones 1800 may pass various pieces of information between each other using light and/or radio communication methods. This information may comprise, for example, an identifier associated with a drone, and identifier associated with a user, an identifier associated with a remote control unit, a type of weapon being fired, an amount of damage inflicted, a health level of a drone, and/or the like. In some embodiments, such information may then be relayed from the receiving drone to, for example, the remote control unit that is currently controlling the receiving drone. In some embodiments, the protocol or method of transmission changes in this relay. For example, drone two may transmit data to drone one using an optical communication method (e.g., via communication links 1806 or 1811), and drone one may then relay some or all of that data to remote-control one using a radio transmission method (e.g., via communication link 1804).

In optical battling or gaming systems disclosed herein, the systems can be configured to have any number of drones participating at any particular time. For example, in some embodiments, a system may be configured to allow for the simultaneous battling of two, five, 10, 12, 15, 24, or more drones. Particularly in instances where greater numbers of drones are simultaneously participating in a game or battle, one technical challenge to overcome is potential interference, considering the number of wireless communication links being utilized. Further, as more players are added to such a game, the various remote control units and/or drones may be connected together in a network or group configuration, potentially creating even more communication links. For example, it may be desirable for the various drones and/or remote control units to be kept aware of or informed as to what is occurring in the current game or battle. For example, after one drone achieves a hit on another drone with an optical weapon, the system may be configured to transmit data over the network created by the various wireless communication links among the participants in the game to inform the various participants (and/or their associated drones 1800, remote control units 1802, and/or mobile devices 1830) that the hit has occurred. In some embodiments, the data is also sent to an external system, such as a cloud-based or Internet-based system, such as via an Internet connection of the user's mobile device. In some embodiments, it may be desirable to transmit game status data to an external system so that, for example, the players can review the information at a later time, people not participating in the game can monitor a status of the game through their computing devices, and/or the like. In some embodiments, all remote control units that are participating in a particular game are organized into a group, and each remote control unit in that group receives real-time status updates of the progress of the game, such as drones that are hit, health levels of drones, player rankings, and/or the like.

In a case where multiple players are simultaneously participating in a game or battle using optical weapons, one way to avoid or reduce interference among the various wireless communication links is to have each wireless communication link utilize a different communication protocol or frequency. For example, if standard 2.4 GHz communication is being used, there are 14 designated channels. Accordingly, at least 14 different wireless communication links could be simultaneously utilized without interfering with one another. This number could be increased by, for example, utilizing additional frequencies, such as in the 5 GHz range, utilizing light-based communications in combination with radio communications, and/or the like. Another option, however, is to allow more than one wireless communication link in an optical battling or gaming system as disclosed herein to utilize the same radio frequency or optical frequency, but to coordinate or synchronize their communications. For example, a plurality of remote control units may communicate with each other in a wireless network that utilizes a plurality of 2.4 GHz radio communication links between the various remote control units. At least some of these communication links may be configured to utilize the same 2.4 GHz channel, but to transmit at different times so as to not interfere with one another. In some embodiments, one or more of the remote control units is configured to coordinate these timings. In some embodiments, the coordination of the timings is preconfigured, is determined upon initializing one or more wireless communication links, and/or is updated in real time as the game progresses.

In some embodiments, the system is configured to coordinate the timing or modulation of different wireless communication links using predetermined rhythms, beats, or cadences. For example, two wireless communication links may be configured to use the same frequency, such as a particular 2.4 GHz channel, but the two wireless communication links may be configured to transmit at different predetermined intervals or at a different modulation. The particular timing intervals that any specific wireless communication link is configured to operate at may be referred to as, for example, a rhythm, beat, or cadence.

In some embodiments, the system comprises a plurality of types of communication that each serve a different purpose, and that each may be configured to use a different timing, rhythm, beat, or cadence. For example, the system illustrated in FIG. 18 comprises a plurality of types of communications including, for example, flight control communications from the remote controls 1802 to the drones 1800, data received back from the drones 1800 at the remote control units 1802, communications from the remote control units 1802 to mobile devices 1830, such as to transmit video or other data, data transmissions from one remote control unit 1802 to another to update the various remote control units on a current status of the game, optical weapon and/or data communications between the various drones 1800, and/or the like. In some embodiments, each of these types of communications may be configured to operate using a different timing, rhythm, beat, or cadence, to reduce or avoid interference. In some embodiments, the same data may be relayed by a device using a different timing, rhythm, beat, or cadence. For example, data may be received by drone one from drone two via a communication link having a first cadence (e.g., via communication path 1806 or 1811), and drone one may relay some or all of that data to remote-control one via a communication link having a different cadence (e.g., via communication path 1804).

In some embodiments, the system is configured to utilize both radio communication links and optical communication links, and at least some of the radio and optical communication links are configured to utilize a same or similar protocol. For example, some wireless communication links may utilize Wi-Fi, and others may utilize his Li-Fi. Because these two protocols are similar, it can be relatively efficient for a device participating in the game, such as a drone or remote control unit, to translate between the two types of communication. For example, a drone may be configured to relay information received via Li-Fi from another drone to a remote control unit via a Wi-Fi or similar communication link.

Various embodiments of gaming systems or mock battling systems as disclosed herein may enable a plurality of players to participate in various games. For example, various players may each utilize a separate remote control unit and a drone, such as remote control unit 1802 and drone 1800, to play multiplayer real-time optical drone battling games, such as capture the flag, last man standing, laser tag, and/or the like. During such games, it can be desirable for the players to be able to know a status of the game, which may involve knowing information about each of the other players in the game, such as a number of hits, a health level, whether a particular player has won or lost, a ranking of players, and/or the like. In order for the various players to be able to know such information during the game, the various wireless communication links, such as wireless communication links 1804, 1806, 1808, 1809, 1811, and/or 1832 may be used to relay and/or distribute such information in real time. In some embodiments, each remote control unit 1802 is configured to communicate with a user's mobile device 1830 via wireless communication link 1832 to transmit such status information for display to the player via a video display of the mobile device 1830. In some embodiments, at least some of this status information may be transmitted in a broadcast fashion, meaning a remote control unit or drone that has an updated piece of information may transmit that information in a way that it simultaneously goes to all of the other devices in the game, or at least a plurality of devices in the game. In some embodiments, at least some of this status information may be transmitted in a daisy chained fashion, meaning, for example, one remote control unit or drone may pass the information to another remote control unit or drone, the receiving remote control unit or drone may then pass it on to one or more other remote control units or drones, and so on. In some embodiments, as discussed below, at least one central server is used to maintain such status information. In some embodiments, the central server is a cloud-based server, meaning accessible via an Internet connection. In some embodiments, the central server is a separate server located at or near the site of the game or battle. In some embodiments, the central server is incorporated into at least one of the remote control units or drones. Although various embodiments disclosed herein describe drones configured to participate in a real battles, the technologies disclosed herein may be used in various other gaming environments. For example, the techniques disclosed herein may be used in aerial battling of other types of aircraft, such as helicopters or airplanes, ground-based battling of remote control vehicles, water-based battling of remote-control boats, and/or the like.

Still referring still to FIG. 18, each of the drones 1800 may comprise at least one light generator 1810, light sensor 1812, speaker 1814, visual indicator 1816, and flight sequence controller 1818. The light generators 1810 may comprise infrared LEDs, lasers, and/or any other type of device suitable for transmitting light from the drone 1800. In some embodiments, the drone 1800 comprises only infrared light generators 1810, in some embodiments, the drone 1800 comprises only laser light generators 1810, and in some embodiments, the drone 1800 comprises at least one infrared light generator 1810 and at least one laser light generator 1810. In some embodiments, a laser light generator 1810 is configured to generate class II or above laser light. The light sensors 1812 may be configured to detect the type of light transmitted by the one or more light generators 1810. In various embodiments, the light sensors 1812 can be different depending on the type of light generators 1810 used. For example, a light sensor 1812 may comprise a receiving diode configured to detect laser light generated by a laser light generator 1810, such as class II laser light. As another example, a light sensor 1812 may comprise a receiving diode configured to detect infrared light generated by an infrared light generator 1810. In some embodiments, the light generators 1810 are configured to generate light differently based on information that that light is intended to transmit. For example, the light generators 1810 may operate differently, and/or different light generators 1810 may be used, to indicate what type of "weapon" is being used, an identity of the drone firing the weapon, an identity of the user operating the drone firing the weapon, and/or the like. In some embodiments, this information or data may be configured to be transmitted by the light generators 1810 by the light generators 1810 transmitting different frequencies of light, through pulse width modulation, through infrared data transmission protocols similar to or identical to as used in television remote controls, and/or the like. For example, the data may be transmitted using IrDA protocols, free-space optics protocols, Li-Fi, and/or the like. In some embodiments, a light generator 1810 is configured to transmit data using a class II or above laser and pulsing the laser to transmit information. In some embodiments, the laser may be pulsed at different baud rates or frequencies. In some embodiments, a light generator 1810 is configured to transmit encoded data via laser at a particular frequency or baud rate, and a light sensor 1812 of another drone (e.g., comprising a receiving diode) is configured or tuned to that frequency or baud rate to enable the light sensor 1812 to receive the data transmitted by the light generator 1810.

As one example of how it could be desirable to have a light generator 1810 that transmits data, drone one may comprise more than one fictional weapon, such as a laser cannon and a missile. Depending on which weapon the user wants to use, the light generator 1810 may be configured to transmit different data, such that when drone two receives this data via its light sensor 1812, drone two can determine what type of weapon it was hit with. This can be beneficial, for example, because it may be desirable for drone two to respond in a different manner depending on what type of "weapon" hit it.

Figure 20:
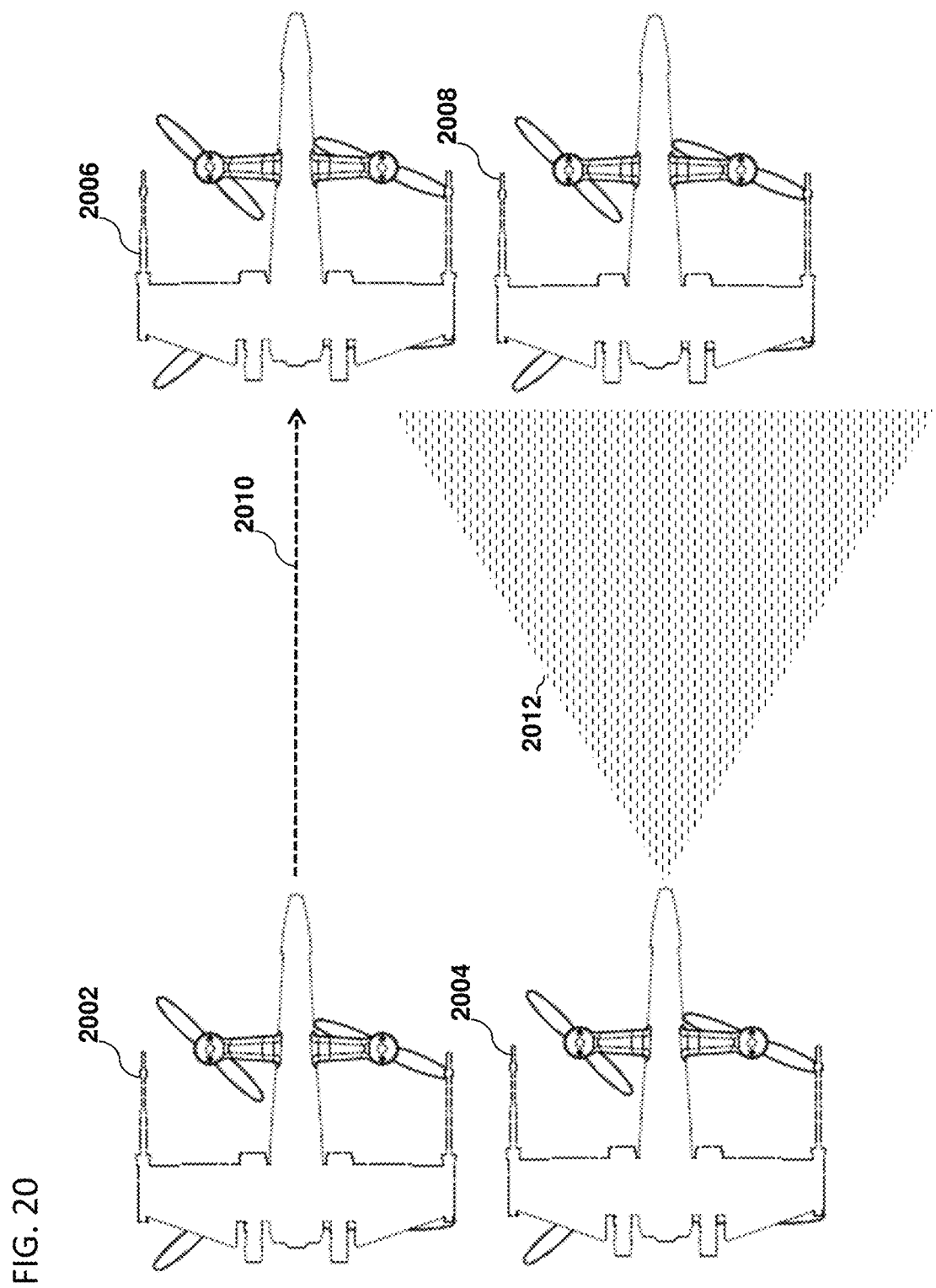
FIG. 20 illustrates an example embodiment of firing laser-based and infrared-based optical weapons.

In some embodiments, one or more light generators 1810 are configured to transmit infrared light, and one or more light generators 1810 are configured to transmit laser light. There can be benefits to each type of light. For example, infrared light can cover a broader range or field of view and thus make it easier for players to hit another drone. Laser light, on the other hand, tends to be more focused than infrared light, and thus may make it more difficult for a player to hit another drone with it. FIG. 20 illustrates an example of this concept. With reference to FIG. 20, two drones 2002 and 2004 are shown firing their optical weapons at two other drones 2006 and 2008. The drone 2002 is firing a laser, which generates a laser beam 2010 having a relatively narrow field. Accordingly, the laser 2010 will likely be detected as a hit at drone 2006, but not as a hit at drone 2008. The drone 2004 is firing an infrared light generator, which generates infrared light 2012 have any much wider field of dispersion than the laser lights 2010. In this case, the infrared light 2012 may be detected as a hit on both drones 2006 and 2008.

Infrared light may be more desirable to use in, for example, beginner situations where the operator is not able to as precisely control the drone as a more experienced operator would be. As another example, infrared light, which may be easier to hit another drone with, may be associated with a less powerful fictional weapon, and laser light, which may be harder to hit the other drone with, may be associated with a more powerful fictional weapon. For example, the system may be configured to monitor an amount of damage a particular drone has incurred, and caused that drone to operate differently depending on its level of damage. For example, in a case where infrared light is intended to simulate a lower powered weapon, the system may be configured to allow a drone to be hit with infrared light a higher number of times before indicating maximum damage to the drone than if the drone were hit by laser light, which may indicate a more powerful weapon.

In some embodiments, the system may be configured to use a combination of infrared light and laser light in conducting a mock battle. In some embodiments, the system may be configured to utilize infrared light, which is invisible to the human eye, to fire weapons at another drone and detect hits at the other drone. However, in some embodiments, the system may simultaneously use laser light that is visible to the human eye so that the operator of the drone can see the direction the weapon is firing in. In some embodiments, the laser light is not intended to be detected by the drone the user is firing upon, but is merely used like a "tracer" for the operator to be able to see the general direction in which his invisible infrared light is being projected.

Returning to FIG. 18, in various embodiments, each drone 1800 may comprise any number or combination of light generators 1810 and light sensors 1812. Further, the drones 1800 may be controllable, such as by the remote control unit 1802, to enable a user to select which light generator 1810 to use and/or what type of light to generate.

The light sensors 1812 may be any type of device capable of sensing the type of light transmitted by the light generators 1810. For example, a light sensor 1812 may comprise an infrared light receiver, a laser light receiver, and/or the like. In some embodiments, one or more light sensors 1812 is shielded at least partially by a portion of the body of the drone 1800 so that the light sensor 1812 detects light from only a specific direction or range of angles. For example, one light sensor 1812 may be positioned and oriented on the drone 1800 such that it detects light being transmitted toward a rear of the drone, a front of the drone, a left side of the drone, a right side of the drone, a top of the drone, and/or a bottom of the drone. Similarly, light generators 1810 may be positioned and/or configured to transmit light in a particular direction. For example, one or more light generators 1810 may be configured to transmit light in a forward direction, rearward direction, left side direction, right side direction, top direction, bottom direction, and/or any other direction.

With further reference to FIG. 18, the drones 1800 can be configured to react in various ways when their light sensor 1812 detects a hit (e.g., the light sensor 1812 detects a light signal transmitted by the light generator 1810 of another drone). For example, one or more speakers 1814 may be configured to play a sound, and/or one or more visual indicators 1816 may be configured to visually indicate that the drone has been hit. For example, the visual indicators 1816 may comprise LED lights or the like that light up to show the drone has been hit. In some embodiments, the drone 1800 comprises a flight sequence controller 1818 that is configured to cause the drone 1800 to perform a predetermined flight sequence as a result of a hit from a light generator 1810. The flight sequence controller 1818 may be implemented in software code running on the main controller of the drone, and/or the flight sequence controller 1818 may be a separate hardware component. For example, the flight sequence controller 1818 may be configured to, as a result of detecting a hit from another drone, cause the propulsion units or propellers to operate in a way that causes the drone 1800 to vibrate, tilt from side to side, perform a loop, automatically land, reduce a velocity of the drone, and/or the like. In some embodiments, a progression of flight sequences occurs based on a number of hits, amount of damage, and/or the like. For example, a first hit on the drone may result in a minor flight sequence, such as a temporary slowdown of the drone and/or the drone rocking back and forth or tilting back and forth. Additional hits may, however, result in a more significant flight sequence, such as automatic landing, spiraling to the ground, cutting power to the motors, and/or the like.

In some embodiments, it can be desirable to enable a user to override a flight sequence that is occurring as a result of a hit from another drone. For example, particularly with more significant flight sequences, such as automatic landing, spiraling to the ground, cutting power to the motors, and/or the like, it may be desirable to let the pilot of that drone override the flight sequence in a case that the drone is falling toward an unsafe area. For example, in a case where the drone is automatically landing, there may be a situation where the drone is heading toward a person and could potentially harm that person if it hit the person while landing. In that case, the system may be configured to enable the user or pilot to operate the remote control 1802 in a way that overrides the current flight sequence and gives back at least some or potentially all flight control to the user. The remote control unit 1802 may be configured to allow the user to indicate the user wishes to perform such override by enabling the user to press a button, control a lever, and/or the like. In some embodiments, the system is configured to return all flight controls to the user upon such override, enabling the user to fly the drone 1800 as if the drone had not been hit. In some embodiments, however, the system is configured to return only a portion of flight control, or a limited version of flight control, to the user, just to allow the user to avoid the potential safety issue. For example, in some embodiments, the system may be configured to return thrust or vertical control to the user, allowing the user to cause the drone to gain altitude. The system may give the user limited control of other features, however. In some embodiments, the system may be configured to return all or substantially all controls to the user, but at a reduced sensitivity level, maximum speed level, power level, and/or the like. In some embodiments, the system is configured to disable the light generators 1810 during an override of a flight sequence.

With further reference to FIG. 18, each of the remote control units 1802 comprises a speaker 1815, a visual indicator 1817, a vibration generator 1819, a trigger or button 1820, and a weapon mode select button 1822. The remote control unit 1802 may further comprise any number and configuration of flight control inputs, such as joysticks, buttons, switches, and/or the like configured to be user operable to control a flight trajectory of the drone 1800. The speaker 1815 can be configured to provide audio feedback when, for example, the drone 1800 being controlled by that controller 1802 sustains a hit from another drone, achieves a hit on another drone, and/or the like. The audio feedback may comprise, for example, a sound effect, a song, spoken voice, and/or the like. Similarly, the visual indicator 1817 may be configured to display visually when the drone 1800 sustains a hit, attains a hit on another drone, and/or the like. For example, the visual indicator 1817 may light up, flash, turnoff, and/or the like.

In some embodiments, such as the embodiment illustrated in FIG. 18, the visual indicator 1817 comprises three lights. In some embodiments, these three lights are configured to indicate an amount of damage that has been sustained by the drone 1800 being controlled by that controller 1802. The visual indicator 1817 may be, for example, a virtual health meter, damage meter, and/or the like. In some embodiments, all lights or bars of the visual indicator 1817 begin as lit up when a battle begins. As the drone 1800 sustains hits from another drone, the visual indicator 1817 can be configured to provide feedback on these hits or virtual damage to the drone by, for example, reducing the number of lights or bars that are lit up. In one example, once all of the lights or bars are no longer lit up, this can be an indication that the drone 1800 has sustained the maximum amount of damage, and the drone's flight sequence controller 1818 may be configured to, for example, cause the drone 1800 to automatically land, reduce power, and/or the like. Various other forms of visual indicators 1817 may be used in other embodiments. For example, a similar light up system may be used, but the system may start with no lights being on and increase the number of lights being on based on a number of hits incurred by the drone. Further, some embodiments of visual indicators 1817 may indicate to a user how many hits that user has inflicted on other drones.

The vibration generators 1819 of the remote control units 1802 may be configured to, for example, cause the remote control unit 1802 to vibrate as a result of certain conditions. For example, when the drone being controlled by the controller 1802 sustains a hit from another drone, the vibration generator 1819 may be caused to vibrate the remote control 1802, to simulate the hit. The vibration generator 1819 may be used in other situations, too. For example, the vibration generator 1819 may operate when the user fires a weapon, to simulate a shaking of the drone as a result of a weapon being fired.

One or more triggers 1820 or buttons 1820 of the remote control unit 1802 may be configured to cause the drone 1800 being operated by that controller to fire its weapons. In some embodiments, different triggers or buttons 1820 may be associated with a different type of weapon or light generator 1810. In some embodiments, the remote control unit 1802 comprises a weapon mode select button 1822 which allows a user to select different weapons or light generators 1810 that may be controlled by, for example, the same trigger or button 1820. In some embodiments, instead of selecting a different light generator 1810 for a different weapon, the system is configured to utilize the same light generator 1810, but to have that light generator 1810 transmit different data indicative of a different weapon, transmit light having a different frequency, transmit a different color of light, transmit light at a different speed, and/or the like.

As mentioned above, the various functionalities in the remote control unit 1802 and drones 1800 that enable an interactive dynamic battle using optical weapons can be enhanced by cross-communication and/or bidirectional communication between the various controllers and/or drones. For example, a wireless communication link 1808 between the remote control units 1802 can be useful to, for example, allow the remote control units to indicate to each other that their associated drone has been hit, that their associated drone has hit the other controllers associated drone, a current health level of the drone associated with that controller, a weapons capability of the drone associated with that controller, and/or the like. Similar information may be transmitted between a remote control unit and another drone, such as by using wireless communication links 1809, and/or between the drones themselves, such as by using wireless communication link 1806. In some embodiments, similar information may be transmitted between the drones 1800 using the wireless communication link 1806 and/or the optical links between the light generators 1810 and light sensors 1812. It can be desirable, however, for at least some information to be transmitted using a less directional wireless protocol, such as the wireless communication link 1806. Such a configuration can help the drones to pass information back and forth from each other even when there light generators and light sensors are not necessarily oriented in a position that allows them to transmit data.

In some embodiments, one or more databases may be provided that are used to track various information relating to a mock battle. For example, a database may store data related to identifiers of drones participating in a battle, identifiers of the remote control units participating in a battle, an amount of damage sustained by each drone, an amount of life left in each drone, the weapons capabilities of each drone, and/or the like. In some embodiments, such databases are distributed across various devices. For example, one or more databases may be located in the drones 1800, remote control units 1802, and/or a separate central server system that is in communication with the drones and/or remote control units. In some cases, particularly in larger scale mock battles that may comprise a plurality of drones simultaneously battling, it may be beneficial to have a central server that communicates with each of the drones and/or each of the remote control units to coordinate the battle. In some embodiments, the central server is part of one of the remote control units or one of the drones. In some embodiments, the central server is a separate computer device separate from the remote control units and drones that are participating in the mock battle.

In some embodiments, the mock battling system illustrated in FIG. 18 further comprises one or more mobile devices 1830 configured to communicate with the remote control units 1802. The mobile devices 1830 may comprise, for example, a tablet computer, a smart phone, a laptop computer, and/or various other portable electronic devices. The mobile devices 1830 may communicate with the remote control unit 1802 via wireless communication links 1832. The wireless communication links 1832 may comprise, for example, Bluetooth, Wi-Fi, NFC, and/or any other type of wireless communication link capable of transmitting data between the mobile device 1830 and remote control unit 1802. In some embodiments, instead of or in addition to having a wireless communication links, the mobile device 1830 may have a physical communication link with the remote control unit 1802. For example, the remote control unit 1802 may comprise a dock that a user can dock the mobile device 1830 into. For example, the dock may comprise an electrical connector that physically couples to the mobile device 1830.

In embodiments that comprise a mobile device 1830 in communication with a remote control unit 1802, the system may utilize the mobile device 1830 to perform various functions. For example, the mobile device 1830 may operate as a visual indicator, play audio sounds, cause vibrations, and/or the like as described above with respect to speaker 1815, visual indicator 1817, and vibration generator 1819. Further, in some embodiments, the mobile device 1830 may be configured to receive inputs from a user, such as inputs that select weapon modes, change configurations of the system, cause a weapon to fire, and/or the like. In some embodiments, the mobile device 1830 is configured to display real-time video received from the drone 1800, similar to as described below with reference to FIGS. 17A-17C.

Mock Battling Process

Figure 19:
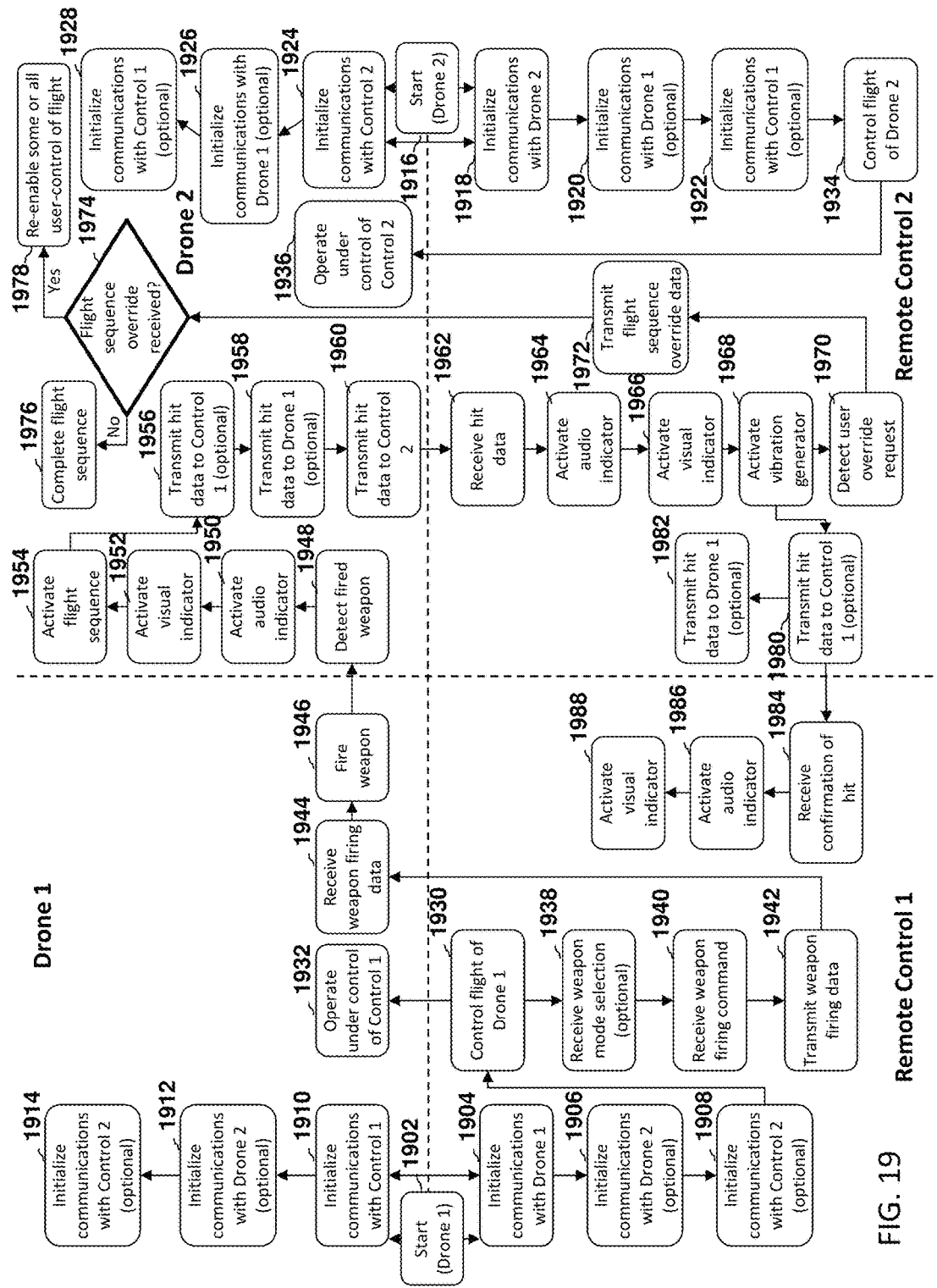
FIG. 19 illustrates an embodiment of a process flow diagram showing an example mock battling process.

FIG. 19 illustrates an example embodiment of a process flow diagram that may be implemented by various drones and remote control units as disclosed herein. For example, the process flow illustrated in FIG. 19 may be implemented by the example embodiments of drones 1800 and remote control units 1802 illustrated in FIG. 18, described above. The process flow depicted in FIG. 19 illustrates one example of a process flow that may occur when two drones are conducting a mock battle, such as battling using optical weapons as described elsewhere herein.

The process flow for drone one begins at block 1902. At block 1904, remote control one initializes communications with drone one. For example, remote control 1802 may initialize communications with drone 1800 through wireless communication link 1804. To enable additional features of such optical battling, remote control one may further initialize communications with one or more other devices. For example, at block 1906, remote control one may initialize communications with drone two, referring to the drone that drone one is conducting a mock battle with. At block 1908, the remote control one may initialize communications with remote control two, meaning the remote control that is controlling the flight of drone number two.

At block 1910, drone one initializes communications with remote control one. Similarly to the additional communication paths that may be initialized by the remote control, drone one may further initialize communications with one or more other devices. For example, at block 1912, drone one may initialize communications with drone two, such as through wireless communication link 1806. Drone one may also initialize communications with remote control two, such as through wireless communication link 1809.

Starting at block 1916, drone two and remote control two go through their communication initialization processes. At block 1918, remote control two initializes communications with drone two, such as through wireless communication link 1804. At block 1920, remote control two may initialize communications with drone one, such as through wireless communication link 1809. At block 1922, remote control two initializes communications optionally with remote control one, such as through wireless communication link 1808. At block 1924, drone two initializes communications with remote control two, such as through wireless communication link 1804. At block 1926, drone two may initialize communications with drone one, such as through wireless communication link 1806. At block 1928, drone two may initialize communications with remote control one, such as through wireless communication link 1809.

As indicated in FIG. 19, some of these communication links are optional and may not be needed in particular situations. Further, some of the communication links may be unidirectional, and some may be bidirectional, or all links may be bidirectional, or all links may be unidirectional. For example, to enable functionality of notifying remote control one that drone one has successfully hit drone two with an optical weapon, various communication links may be used. For example, communication link 1806 between the two drones may be used to report the hit to drone one, and drone one may then report the hit back to remote control one through wireless communication link 1804. As another example, drone two may report the hit to its associated remote control two through wireless communication link 1804, and remote control two may report that hit back to remote control one via wireless communication link 1808. As another example, drone two may directly report the hit back to remote control one, such as through wireless communication link 1809. In some embodiments, only a minimum number of wireless communication links that are needed to implement the features of such a system are initialized. In some embodiments, however, additional wireless communication links may be initialized, such as for redundancy purposes. For example, there may be some instances where the two remote control units are not close enough together to implement wireless communication link 1808. In that case, other wireless communication links, such as wireless communication links 1806 or 1809 may be utilized to pass information. However, in some embodiments, when the remote control units come close enough together to have a stable wireless communication link 1808, information that may have previously been passed through wireless communication links 1806 or 1809 may begin to pass through wireless communication link 1808.

Although the various blocks of FIG. 19 illustrate the various communication links being initialized sequentially at the beginning of the process, some embodiments do not require a particular order to the initializations, and some of the wireless communication links may be initialized on demand at a later point when that communication link is needed.

Returning to the left half of FIG. 19, once communications have been initialized between remote control one and drone one, remote control one can control the flight of drone one at block 1930. At block 1932, drone one operates under the control of remote control one, such as by receiving flight control data from remote control one via wireless communication channel 1804. Similarly, remote control two can operate the flight of drone two at blocks 1934 and 1936.

In this example, drone one is going to fire a weapon at drone two, and drone two will detect a hit based on that weapon firing. At block 1938, remote control one can optionally receive a weapon mode selection. For example, button 1822 may be pressed by a user to indicate a desired weapon for drone one to use. In some embodiments, drone one only has a single weapon, and thus no weapon selection is required. In some embodiments, drone one may have multiple weapons, but a default weapon may be set, thus not requiring a weapon mode selection if the user wishes to use the default weapon. Examples of different types of weapons that may be chosen from may be, for example, and infrared light based weapon, a laser light based weapon, an infrared or laser light based weapon that transmits different data or transmits data using a different frequency than a different weapon, and/or the like.

At block 1940, remote control one receives a weapon firing command. For example, remote control one may detect that trigger 1820 has been activated by the operator of remote control one. At block 1942, remote control one transmits weapon firing data to drone one, such as through wireless communication link 1804. This data may comprise, for example, data instructing drone one to fire a weapon, the type of weapon to fire, a duration of firing the weapon, and/or the like. At block 1946, drone one fires the weapon as requested by remote control one. For example, drone one may activate its light generator 1810 as shown in FIG. 18.

At block 1948, drone two detects the fired weapon from drone one. For example, drone two may utilize its light sensor 1812, as shown in FIG. 18, to detect laser or infrared light emitted from the light generator 1810 of drone one. In some embodiments, detecting the fired weapon further comprises analyzing data transmitted by the laser or infrared light received from drone one. For example, the light received from drone one may comprise an encoded signal that indicates one or more pieces of information, such as, for example, an identifier of the drone firing the weapon, a type of weapon being fired, a power level of the weapon being fired, an identifier of the remote control unit associated with the drone firing the weapon, and/or the like. In some embodiments, it may be desirable to include one or more identifiers in the encoded light transmitted from a firing drone, such as to identify the drone that has fire the weapon, or the remote control unit associated with that drone. This may be desirable in some embodiments, such as to allow the drone that was hit to report to its remote control unit the identity of the drone that fired the weapon and/or its associated remote controller, to allow the remote control unit of the hit drone to then communicate with the remote controller of the firing drone to report the hit. Further, in some embodiments, it may be desirable for the drone that has been hit to receive an identifier of the remote control unit associated with the firing drone so that the drone receiving the hit can report directly back to the remote control unit of the firing drone to report the hit.

After drone two has detected that it has been hit by an optical weapon of drone one, the process flow proceeds to block 1950. At block 1950, drone two may optionally activate an audio indicator. For example, drone two may utilize a speaker 1814 to play a sound effect indicative of drone to being hit. At block 1952, drone two may optionally activate a visual indicator, such as visual indicator 1816. For example, drone two may activate one or more LEDs that indicate it has been hit. At block 1954, drone two may optionally activate a flight sequence, such as by using flight sequence controller 1818. For example, in some embodiments, the drone that has been hit may be configured to conduct a predetermined flight sequence in response to the hit. For example, in some embodiments, such a predetermined flight sequence may comprise, among other things, rocking back and forth one or more times, performing a loop, performing an aerial stunt, performing an automatic landing sequence, performing a downward spiral ending in a landing, and/or the like. In some embodiments, the predetermined sequence implemented is based at least partially on a level of virtual damage the drone has sustained, a number of hits the drone has sustained, and/or the like. In some embodiments, the magnitude of the flight sequence is based at least partially on a level of virtual damage the drone has sustained, a number of hits the drone has sustained, and/or the like. For example, with the flight sequence that comprises rocking back and forth one or more times, the drone may be configured to rock back and forth further, with a greater magnitude, when more damage has been sustained and/or when additional hits have been incurred.

At blocks 1956 and 1958, drone two may optionally transmit hit data to remote control one or drone one. This data may, for example, indicate to drone one or remote control one that the weapon fired by drone one successfully hit drone two. At block 1960, drone two transmits hit data to remote control two, to inform remote control two that drone two has been hit. As with the weapon firing data, the hit data that is transmitted from drone two to one or more devices may comprise various pieces of information. For example, in one embodiment, the hit data may simply comprise data indicating that drone two has sustained a hit. In other embodiments, however, the hit data may comprise more information, such as, for example, an identifier of the drone that fired the weapon, an identifier of the remote control associated with the drone the fire the weapon, a type of weapon that was fired, an amount of damage that was sustained, an amount of virtual health remaining in the drone that was hit, the flight sequence that was activated and/or is being activated, and/or the like.

At block 1962, remote control two receives the hit data from drone two, such as through wireless communication link 1804. Similarly to the drone that sustained the hit, the remote control associated with that drone may perform one or more functions that indicate to the operator that the drone has been hit. For example, at block 1964, remote control two may activate an audio indicator, such as by playing a sound effect through speaker 1815. At block 1966, the remote control may activate a visual indicator, such as visual indicator 1817. At block 1968, the remote control may activate a vibration generator, such as the vibration generator 1819.

In some embodiments, it may be desirable to enable an operator of a drone that has been hit to override a flight sequence that is being performed as a result of the hit. For example, particularly with a flight sequence that takes place over a period of time, and/or that has an increased risk of making the drone fly near people or other objects, there may be an increased risk of harm to the drone, bystanders, and/or other objects. Accordingly, it may be desirable to enable the operator to override such flight sequence to cause of the drone to avoid hitting something. For example, in some embodiments, the remote control unit may be configured to detect that a user wishes to override a flight sequence that is occurring by receiving a user input from the operator, such as by the user pressing a button, tilting a control stick, and/or the like. At block 1970, the remote control unit detects such user override request.

At block 1972, the remote control unit transmits flight sequence override data to the drone that is currently conducting the predetermined flight sequence. In some embodiments, the flight sequence override data may simply instruct the drone to halt the predetermined flight sequence and return to normal user-controlled flight. In some embodiments, the flight sequence override data may instruct the drone to halt the flight sequence and transition to a stationary hover mode. In some embodiments, the flight sequence override data may instruct the drone to continue performing at least a portion of the flight sequence, but to enable the operator to control at least one or more flight parameters. For example, in some embodiments, such as when the flight sequence is an auto landing sequence, the flight sequence override data may instruct the drone to continue the auto landing sequence, but to enable the operator to control a direction the drone moves as it is descending. This may be beneficial, for example, when an auto-land sequence is causing the drone to go toward a person or object in its landing trajectory. In such a case, it may still be safe for the drone to continue to land, but in a different direction that causes the drone to land in a trajectory that goes away from the person or object.

At block 1974, the process flow varies depending on whether a user has requested the flight sequence be overridden, and flight sequence override data has been transmitted from the remote control two to drone two. If drone two has not received data from remote control two indicating that the flight sequence should be overridden, the process flow proceeds to block 1976, and the flight sequence is completed. If drone two does receive flight sequence override data, the process flow proceeds to block 1978, and the drone will halt the flight sequence and/or re-enable some or all user control of the flight.

Block 1980 illustrates one example of how remote control one may learn of the hit that drone one made on drone two. In this embodiment, at block 1980, remote control two optionally transmits hit data to remote control one. Similarly to the hit data transmitted at block 1960, the hit data transmitted at block 1980 may comprise, for example, an identifier associated with drone one, an identifier associated with drone two, an identifier associated with remote control two, a type of hit detected, an amount of damage sustained by drone two, an amount of life remaining in drone two, and/or the like. As discussed above, such data may also or alternatively be transmitted directly from drone two to remote control one, or from drone two to drone one, and then redirected from drone one to remote control one.

At block 1984, remote control one receives the hit data that confirms drone one has hit drone two with its optical weapon. Remote control one may then be configured to notify the operator of the hit in various ways. For example, at block 1986, remote control one may activate an audio indicator, such as by playing a sound effect through speaker 1815. At block 1988, remote control one may activate a visual indicator, such as visual indicator 1817 or another visual indicator. In some embodiments, the remote control one may also or alternatively activate the vibration generator 1819.

In various embodiments, the drones and/or remote control units may communicate with a central server at any point in the mock battling process. This may, for example, enable the central server to track the progression of the mock battle, track who has hit who and with what weapons, track remaining life of various drones, assign scores to individual operators, determine winners and losers, and/or the like.

Integrated Battery Pack Design

In some embodiments, particularly in embodiments as disclosed herein wherein a main body of a flying device is intended to mimic another device, such as a spaceship, it can be desirable to have the power source of the flying device, such as a battery, be integrated into a portion of the body of the flying device. For example, instead of a typical consumer product design where a door is opened and a raw battery or battery pack is pulled out through that opening, such as for replacement or recharging, embodiments as disclosed herein may be configured such that a component of the body, comprising a portion of the decorative outer surface of the body, is removed from the flying device and connected to a charger. For example, FIGS. 12A and 12B illustrate a schematic side view of the body of drone 300 of FIG. 3B. With reference to FIG. 12A, a removable portion 107 of the flying device may be removable and may comprise a battery (e.g., a battery may be embedded or enclosed within the removable portion 107). That portion that comprises a battery may then be connected to a charger for charging.

One advantage of incorporating a rechargeable battery into a removable portion of a flying device is that the assembly may be lighter. This is because there may not need to be extra material or hardware for, for example, an access door to access a battery. Another advantage is aesthetic, in that it can be more visually appealing to a user of the flying device to remove a component of the body which is mimicking some other device, such as a spaceship, and to charge that part of the body, instead of a raw battery or battery pack.

In some embodiments, the battery pack is placed inside the flying device and has one or more outer surfaces that functions as part of the housing of the main body (e.g., a decorative portion that is visible when the battery is installed) instead of a battery cover.

Recreational radio-controlled flying devices typically having a battery receptacle for receiving batteries to be used as a power source. This battery receptacle, however, includes a housing or separate cover that can be unsightly or add unwanted weight to the flying device. Example embodiments solve this problem and others by providing a battery receptacle that is integrally formed in the body of the flying device. Further, as explained in more detail herein, the battery itself includes a surface that matches the surface of the body of the flying device (e.g., the decorative outer surface). As such, a separate lid or cover for the battery receptacle is not required because a portion of the exterior of the battery serves this function.

FIGS. 12A and 12B show an example battery pack, or removable portion 107, that is used as a power source for a recreational radio-controlled flying device 300 with a controller (not shown). The removable portion 107 is removable and can be placed inside the flying device 300. The removable portion 107 has a top surface 806 showing a specific configuration which can function as a part of the housing of the main body 102. This surface 806 may also be referred to as an outer decorative surface. The removable portion or battery pack 107 comprises one or more battery cells 809 positioned within the removable portion and/or beneath the outer decorative surface 806.

In some embodiments, one or more surfaces of the battery emulate, imitate, or resemble the outer decorative surface of the flying device. For example, the battery has a shape, size, color, and/or external configuration that match a shape, size, color, and/or external configuration of the housing of the flying device. For instance, the surface of the battery is sized and shaped to complete or correspond to a geometric configuration of the design of the flying device.

FIG. 12A shows a side view of part of a flying device in which a top section of the spaceship (i.e. removable portion 107) has been removed from the main body 102. The external surface 806 of the battery is configured to complete the missing location of the outer surface of the flying device 300. In this manner, the external surface 806 of the battery is designed to look like the flying device's surface and even complete its structure when the battery is inserted into and connected to the body 102 of the flying device 300. The top layer of the flying device 300 is hollowed out and formed a battery-receiving chamber 807. FIG. 12B illustrates that the removable portion or battery pack 107 is placed inside the battery-receiving chamber 807 and a bottom surface 808 of the removable portion 107 is matched with an outline of the battery-receiving chamber 807. As shown in FIG. 12B, once the removable portion or battery pack 107 has been inserted into the receiving chamber 807, a completed decorative outer surface of the drone is formed.

One of ordinary skill the art will appreciate that the integrally connected battery pack can have various configurations on the top surface with different shapes and sizes and also can be rechargeable or non-rechargeable. The figures show an example battery pack, but some embodiments may be utilized with battery pack of different sizes and shapes.

Transparent Propeller Blades

Some embodiments described herein relate to an apparatus and methods that provide an unmanned aerial vehicle or flying device with transparent blades. Some embodiments are described herein that relate to a technique for development of a propeller that when in motion becomes invisible or near-invisible for the purpose of giving the illusion that there is no propulsion system causing a vehicle (such as a flying device) to move or fly. In some embodiments, an injection tool is made for a propeller and a surface of an injection cavity would undergo various ultra-fine polishing to create a glass like surface with no blemishes or variation. A clear resin or polymer material is then injected into the tool creating a blade that is ultra-clear with no surface scuffs or blemishes. When in motion the blades become invisible.

These propellers or rotors may, for example, be the rotors 120 illustrated in the figures described above. The rotors or propellers can comprise a substantially clear or transparent material that can help to hide the presence of the rotors when the device is in flight (or even when the device is not in flight). Further, the rotors or propellers comprise a protruding rounded or conical shape that can be used to hold the blades of the propellers above the ground when the flying device is landing or preparing for takeoff.

FIG. 3A shows an embodiment of a recreational flying device 300 that is radio-controlled with a controller (not shown). The flying device 300 has a body 102 with a plurality of wings 351, in which the wings 351 attach to a plurality of propulsion assemblies 116. The body 102 has arms or extensions 350 that attach to a plurality of propulsion assemblies 116. By way of example, the propulsion assemblies 116 can be located under or below the body 102 to provide lift via reverse propulsion. The propeller 120 attaches to an output shaft of the motor of the propulsion assembly. The blade 120 is desirably made of a clear and transparent material such that the blade 120 is substantially transparent. In some embodiments, the propellers 120 may appear substantially transparent while the propellers 120 are in motion.

By way of example, each propulsion assembly 116 may comprise a cylindrically shaped hub 125 and a plurality of blades 127 attached to the hub 125. In the example embodiment as shown in FIG. 3A, the propeller has two blades, but more blades may be used.

The surface of the propeller blade 127 can have various shapes as long as the propeller blade 127 can lift or control the flying device by making use of the air currents through which it moves. In some embodiments, the propeller blade 127 has a helicoidal surface. In some embodiments, the propeller blade 127 is made using an ultra-finely polished mold to create an ultra-smooth surface on the propeller blade 127. The ultra-smooth surface produces a clear and crystal see-through appearance to the propeller blade 127.

Figure 13:
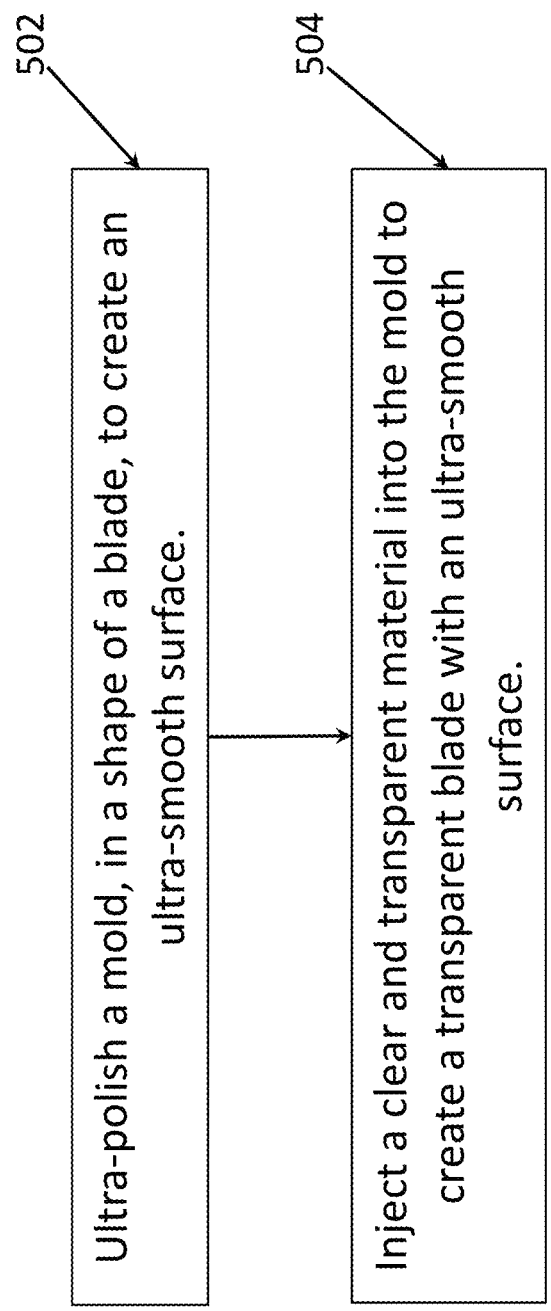
FIG. 13 shows an embodiment of a method of making a transparent blade of a propeller of an unmanned flying device.

FIG. 13 shows a method of making a blade of a propeller of a flying device. A mold, in a shape of a blade, is ultra-fine polished to create an ultra-smooth surface 502. A clear and transparent material is injected into the mold to create a transparent blade with an ultra-smooth surface 504. In another example embodiment, a polishing tool of a grade for polishing an ultra-smooth surface is used. In some embodiments, an injection tool made for the propeller is used.

In some embodiments, the clear and transparent material as described herein includes a clear polymer or a transparent polymer. By way of example, the transparent polymer includes polycarbonate. Other examples of the transparent polymer includes, but not limited to, poly(methyl methacrylate), cellulose acetate butyrate, and glycol modified polyethylene terephthalate. In another example embodiment, the transparent polymer includes transparent thermoplastics.

In another example embodiment, a polishing tool of a grade for polishing an ultra-smooth surface is used. In another example embodiment, an injection tool made for the propeller is used.

One of ordinary skill the art will appreciate that drones can have various configurations with different shapes and sizes. The figures show an example recreational drone, but example embodiments can be utilized with both commercial and recreational drones of different sizes and shapes.

Detachably Mounted Propeller

Recreational flying devices typically have non-detachable propellers. One problem is that when the flying devices are not in flight, the propellers are still attached to the flying devices, such flying devices are not flexible and occupy much more room for displaying the flying devices. Embodiments described herein solve this problem and other problems by providing a flying device with a detachable propeller mounted on a wing. Described embodiments relate to apparatus and methods that provide a wing and a propeller that can be detachably mounted on the wing of a flying device.

Figure 14:
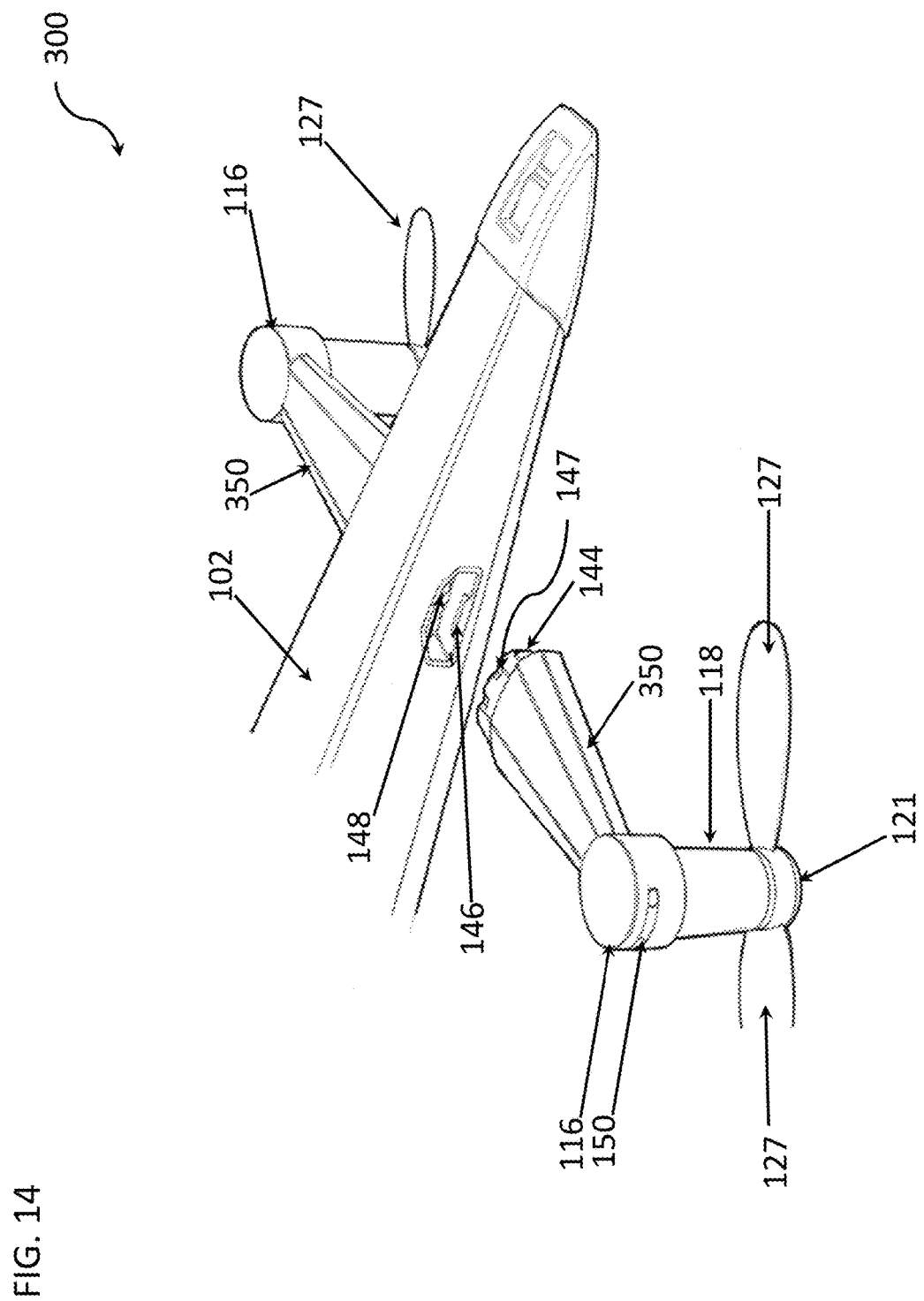
FIG. 14 illustrates an embodiment of a detachable arm and propulsion unit that is detached from a main body of an unmanned flying device.

FIG. 14 shows an example embodiment of a propulsion unit, column, assembly, or motor column 116 connected to an extension or arm 350, where the arm 350 is detached from a wing of a flying device (shown as flying device 300 of FIG. 3).

The propulsion assembly 116 has a housing 118, two or more blades 127, and a flight arm or extension 350. One end of the flight arm 350 connects to the housing 118, and the other end of the flight arm 350 includes a protrusion 144. The main body 102 has a socket 146 that can detachably connect to the protrusion 144. The socket 146 has an electronic element (not shown) that detects if the protrusion 144 is aligned with the socket 146. A light 150 (such as a LED light) may also be mounted on the shaft 118. The light 150 can indicate if the protrusion 144 is aligned properly with the socket 146. By way of example, when the protrusion matches to the socket properly, the light flashes a green light; and when the protrusion is inserted into the socket in misalignment, the light flashes a red light to warn a user to re-adjust the arrangement of the protrusion and the socket. A sound and/or vibration can also be used to indicate alignment or misalignment. A sound and/or vibration and/or light notification may also be sent to the controller to indicate alignment or misalignment.

The socket 146 also includes one or more electrical contacts 148 that electrically connect or couple with mating electrical contacts 147 on the distal end of the flight arm 130. These contacts provide electrical contact to the motor located inside the shaft 110 of the propulsion assembly 116. In some embodiments, the arm 350 physically and electronically connects with the socket.

Figure 15:
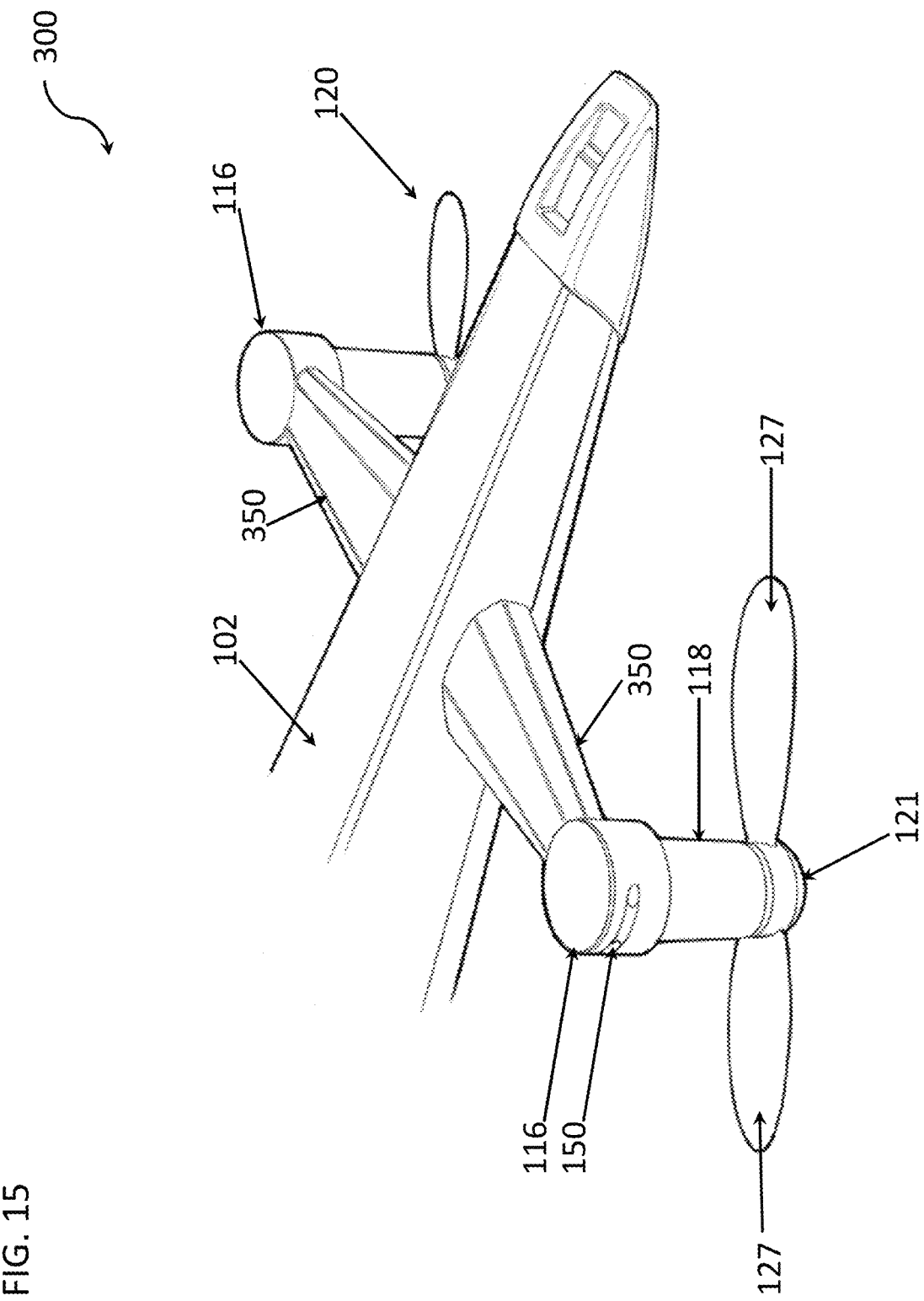
FIG. 15 illustrates the detachable arm of FIG. 14 assembled into the main body of the unmanned flying device.

FIG. 15 shows an example detachable propeller that is assembled into the main body 102 of a flying device (shown as flying device 300 in FIG. 3). The propulsion assembly 116 includes a flight arm 350 that can be removably mounted on or to the main body 102. As shown in FIG. 14, two propellers are mounted on the main body 102 as shown in the image, however one or more may be connected to the main body 102 as well (not shown). In some embodiments, one of the two propulsion assemblies 116 are mounted on one side of the main body 102, and the other propulsion assembly 116 is mounted on the opposite side of the main body 102. In some embodiments, the flight arm 350 of the detachable propeller mechanically and electronically connects with the corresponding socket of the main body (not shown).

By way of example, when the flying device is controlled to fly, the propellers will function to provide aerodynamic lift to the flying device. When the propellers are detached from the wing, the flying device will look even more similar to a real model of a real object it is mimicking, for example for aesthetic or display purposes.

One of ordinary skill the art will appreciate that flying devices, main bodies and the propellers of flying devices can have various configurations with different shapes and sizes. FIGS. 14, 15, and others show an example flying device, wing and propeller, but example embodiments can be utilized with both commercial and recreational flying devices and wings and propellers of flying devices of different sizes and shapes.

Internal Support Subframe

Some embodiments described herein relate to apparatus and methods that provide an unmanned aerial vehicle or flying device that includes a rigid internal frame disposed within a flexible housing (or an internal frame that is more rigid than the housing or shell within which it is disposed). Flying devices may carry internal flying device components or flying device elements that include, but are not limited to, one or more of a printed circuit board (PCB), motors, circuits, electronic components, wireless transmitter/receiver, controller, memory with software, and specialized hardware for different applications. One problem is that the flying device or flying device elements can readily break, or the flying device elements can be readily displaced if the flying device lands too hard, falls, or hits an object. Example embodiments solve this problem and other problems by providing a flying device with a rigid internal frame disposed within a flexible housing that secures flying device elements and increases shock absorption with low overall weight. Another benefit of such a design is that the external housing or shell can comprise a decorative design (e.g., designed to mimic a spacecraft or other vehicle) that may include areas that create stress risers, thin cross-sections, and the like, that may reduce the structural integrity of the exterior housing or shell. By having a more rigid internal subframe, such a decorative exterior shell can be used, while the internal subframe negates some or all of the potential negative structural effects of such a decorative outer design.

In some embodiments, a flying device may comprise a structural (e.g., load-bearing) subframe and a non-structural (e.g., non-load bearing or less load bearing) body, housing, or shell positioned over or around the subframe. For example, the subframe may act essentially as a skeleton of the flying device and be made of a relatively light but strong material, such as aluminum, magnesium, titanium, high-strength polymer, composite, and/or the like. The body may, for example, be made of a lightweight material such as plastic, silicone, and/or the like. One advantage of such a design is that the flying device can be more structurally sound than a typical flying device, while also being lighter. Further, such a design can enable more intricate designs to be designed into a body, if the body does not have to be a structural component of the flying device. For example, as illustrated in various figures herein, when a flying device is intending to mimic another flying device, such as a fictional spaceship from a series of movies, the body is desirably relatively intricate in design. Due to that intricate design, however, if the body were loadbearing or substantially loadbearing, many of the features of the body may cause undesirable stress risers that would lead to eventual failure of the device and/or lead to the requirement to design relatively heavy stiffening features into various parts of the body.

Another advantage of a subframe and body design is that the PCB or PCB's and/or other internal components of the flying device may be mounted to the subframe and potentially isolated at least partially from the body. Accordingly, if a crash or other impact occurs on the body, the PCB and/or other internal components may be more isolated from that impact than if they were mounted to the body itself. In some embodiments, the PCB and/or other internal components may be formed as part of the subframe.

Figure 16:
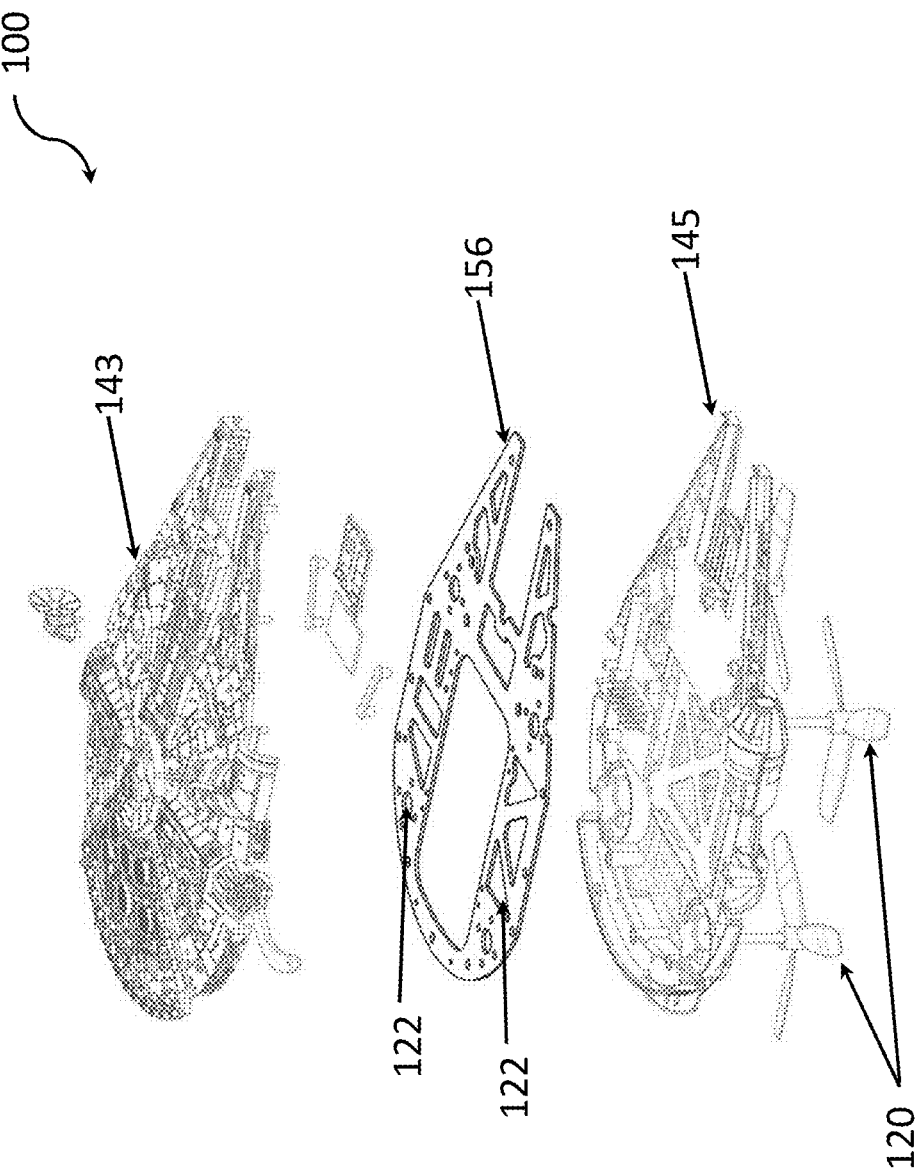
FIG. 16 illustrates an embodiment of an unmanned flying device with a top external decorative portion, an internal frame, and a bottom external decorative portion.

FIG. 16 shows an example flying device 100 that is radio-controlled with a controller (not shown). The flying device 100 has a housing including a top external frame, housing, or shell 143 and a bottom external frame, housing, or shell 145 that connect together to form an internal cavity or an enclosure. An internal frame or subframe 156 is disposed between the top external frame 143 and the bottom external frame 145. The space between internal sides of the housing and the internal frame 156 traps air to create air pocket that absorb or dampen shock impulses, such as when the flying device lands or impacts an object.

In some embodiments, the internal frame 156 engages with the top external frame 143 and the bottom external frame 145. By way of example, such engagement includes frictional engagement, snap-fit connections, screws, threads, posts, sockets, or other attachment mechanisms. The bottom external frame 145 further includes a plurality of propulsion assemblies 116 that attach to a plurality of propellers 120. These arms function as rotating shafts that drive the propeller blades 120 that provide lift to the flying device. The internal frame 156 has a number of recesses 122 to hold the flying device elements. By way of example, these flying device elements can be permanently or removably attached to the internal frame, such as being soldered to the internal frame.

In some embodiments, the internal frame 156 is a PCB that includes the flying device elements or electronic components to operate the flying device. In another example embodiment, the internal frame 156 holds one or more PCBs, such as holding a PCB in one of the recesses 122.

The internal frame 156 can have various shapes and sizes. These shapes and sizes can emulate or resemble a shape and a size of the housing of the flying device. By way of example, the top 143 and bottom external frames 145 have a horseshoe shape, and the internal frame 156 also has a horseshoe shape.

The housing can be formed of a lightweight, soft body with thin wall. For example, the housing is formed of or includes one or more of a polymer, silicone, plastic, rubber, metal, or another material. In one example, the housing can be formed of a pliable or flexible material that can absorb shock. In another example embodiment, the housing is formed of polypropylene.

The internal frame 156 can be formed of a lightweight, rigid body. For example, the internal frame 156 is formed of or includes one or more of a polymer, silicone, plastic, rubber, metal, or another material. In some embodiments, the internal frame 156 is formed of polycarbonate.

In another example, the internal frame 156 has a rigid body that connects to the propulsion assemblies 116. During operation of the flying device 100, torque from the propulsion assemblies 116, and in particular the rotating shafts 118, transmits to and is absorbed by the internal frame 156. In this example, torque transfers to the internal frame 156 as opposed to transferring to the housing (illustrated as three separate pieces in FIG. 16 when the top external frame 143, the internal frame 156, and the bottom external frame 145 are connected together). An example of the flying device 100 with the top external frame 143, the internal frame 156, and the bottom external frame 145 connected together is shown in FIG. 1. In yet another example, tension transfers to the internal frame 156 as opposed to transferring to the housing allows the housing to be made of soft, lightweight and ultra-thin materials.

In some embodiments, the space between the housing and the internal frame 156 can be disposed with shock absorbers including, but are not limited to, one or more of a spring, a hydraulic shock absorber, foam, an elastic material, rubber (including an O-ring), a torsion bar, or other material or device that can absorb and dampen shock.

In one embodiment, a magnet is hidden by being imbedded in the outer wall of a movable structure (not shown). The movable structure is removably attached on the housing or being part of the housing. In another embodiment, part of the movable structure is permanently attached on the housing. A second magnet is embedded within the housing.

One of ordinary skill the art will appreciate that flying devices can have various configurations with different shapes and sizes.

First-Person View

In some embodiments, it may be desirable to enable a pilot of the unmanned flying device to have a first-person view of the environment around the flying device. For example, in some embodiments, flying devices as disclosed herein may be designed to be operated in competitions, such as flying races (which may or may not incorporate mock battling features, as disclosed elsewhere herein). In some embodiments, the flying devices may be designed to operate in competitions where flying devices battle one another, such as by firing simulated weapons at each other, such as weapons that are based on laser technology, infrared technology, and/or the like, as described herein. In such a competition, it may be desirable to enable a pilot to simultaneously view the environment around the flying device from more than one perspective.

Accordingly, in some embodiments, a flying device may comprise more than one camera, such as a front facing camera and a rear facing camera. The flying device may also be configured to dynamically combine footage from the more than one camera in real time and stream that footage wirelessly to the pilot. For example, in some embodiments, the flying device may be configured to stitch together forward facing and rearward facing camera views into a single screen in screen or picture-in-picture video stream and stream that single video stream to a device of the pilot's, such as a smart phone, a virtual reality headset, a computer, a wireless controller, and/or the like. In some embodiments, the video feed is streamed to a remote control unit, and then forwarded from the remote control unit to a user's mobile computing device, such as a smartphone, virtual reality headset, or the like. For example, in some embodiments, the system may be configured to stream a video stream that comprises the front facing view taking up the majority of the screen (e.g., 80%), but with a smaller version of the rear facing view taking up a portion of the screen (e.g., 20%). In some embodiments, the rear facing view may be shown in a side-by-side or over and under fashion along with the forward facing view, and/or the rear facing view may be shown in a picture-in-picture or screen in screen configuration where the rear facing view is overlaid on top of a portion of the front facing view. In some embodiments, the images from multiple cameras may be overlaid onto a simulated planar surface representing the surrounding of the flying device, with portions of the simulated planar surface displaying streams of the one or more camera systems such that one video stream may be transmitted overlaying the various camera video onto the planar surface. Additionally, in some embodiments, the simulated planar surface may display a flying device (either generic, or to mimic the look of the transmitting device) in the center of said simulated planar surface and/or lines to distinguish which camera is providing which image overlaid on the simulated planar surface.

In some embodiments, instead of the flying device stitching together the video streams from the front facing and rear facing cameras, the flying device can be configured to transmit both video streams individually to a device of the pilot's, and the pilot's device may be configured to stitch the streams together into, for example, a picture-in-picture feed. It may be desirable in some embodiments for the flying device to stitch together the video and/or perform some video compression, to reduce wireless bandwidth usage. Further, although embodiments are described herein as utilizing a front facing and a rear facing camera, some embodiments may use a different combination of cameras, and/or some embodiments may use more than two cameras, such as front, rear, left, and right.

Figure 17A:
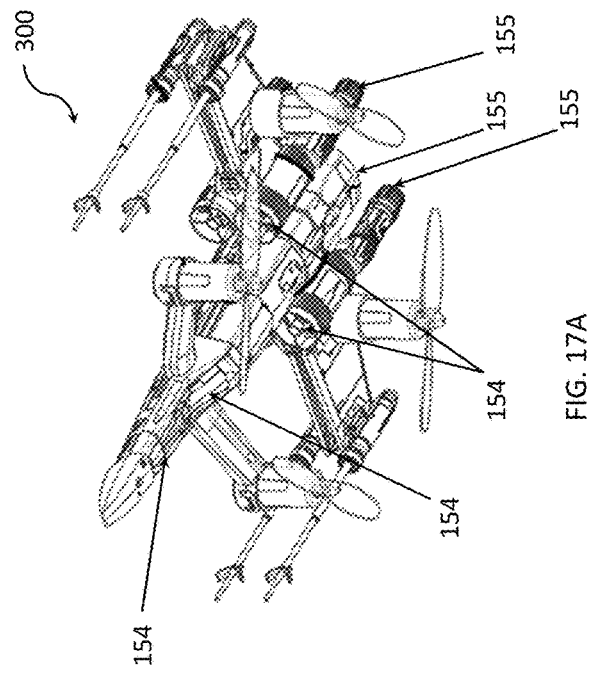
FIG. 17A illustrates an embodiment of a flying device with various potential camera locations.
Figure 17B:
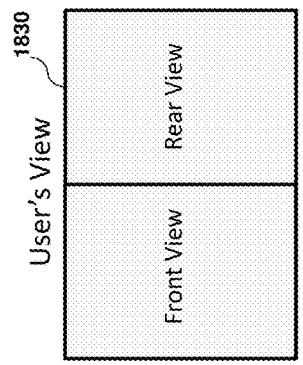
FIGS. 17B and 17C illustrate embodiments of user views of the simultaneous output from a front-facing camera and a rear-facing camera of the flying device of FIG. 17A.
Figure 17C:
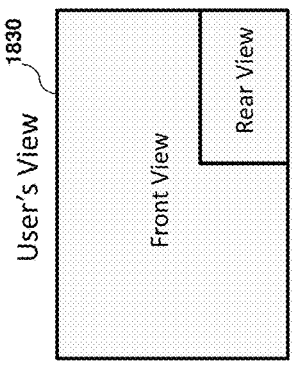

FIG. 17A illustrates an embodiment of a flying device 300 with examples of potential camera locations. Potential schematic outputs of these cameras as it appears on another device with a screen are shown in FIGS. 17B and 17C. For example, in flying device 300 there may be several locations that one or more front-facing camera(s) 154 and/or one or more rear-facing camera(s) 155 (or any other direction-facing camera(s)) can be installed.

FIGS. 17B and 17C illustrate possible user views of the output from a front-facing camera and/or a rear-facing camera, as depicted on FIG. 17A. In FIG. 17B the Front View appears on the left side of a user's viewing screen which depicts the output from a front-facing camera 154 as shown in FIG. 17A. The Rear View appears on the right side of a user's viewing screen which depicts the output from a rear-facing camera 155 as shown in FIG. 17A.

In FIG. 17C the Front View appear on the user's entire viewing screen which depicts the output from a front-facing camera 154 as shown in FIG. 17A. The Rear View appears on the bottom-right side of a user's viewing screen (e.g. a picture-in-picture configuration) which depicts the output from a rear-facing camera 155 as shown in FIG. 17A.

It should be appreciated that the rear-view section can occupy any portion of the screen, such that the portion may be in any corner of the user's viewing screen. The Rear View portion may also be offset from the edges or corner of the viewing screen such that the Rear View Portion is not in contact with any of the viewing screen edges. In some embodiments, the Rear View and Front View can be swapped such that the Front View appear on the right side and the Rear View appears on the left side in FIG. 17B. In other embodiments, the Rear View may take the larger portion of the screen and the Front view may take a smaller portion of a screen (e/g/ picture-in-picture) in FIG. 17C.

Although FIGS. 17B and 17C illustrate a front view and a rear view, various embodiments may simultaneously stitch together and/or display more than just two views, and/or views from directions other than frontward or rearward. For example, one or more cameras may be positioned to obtain a left side view, a right side view, a top view, a bottom view, and/or the like. Further, in some embodiments, a camera may be configured to be actively rotatable, allowing the user to change the orientation of a camera.

Flying Device Embodiments

Figure 21:
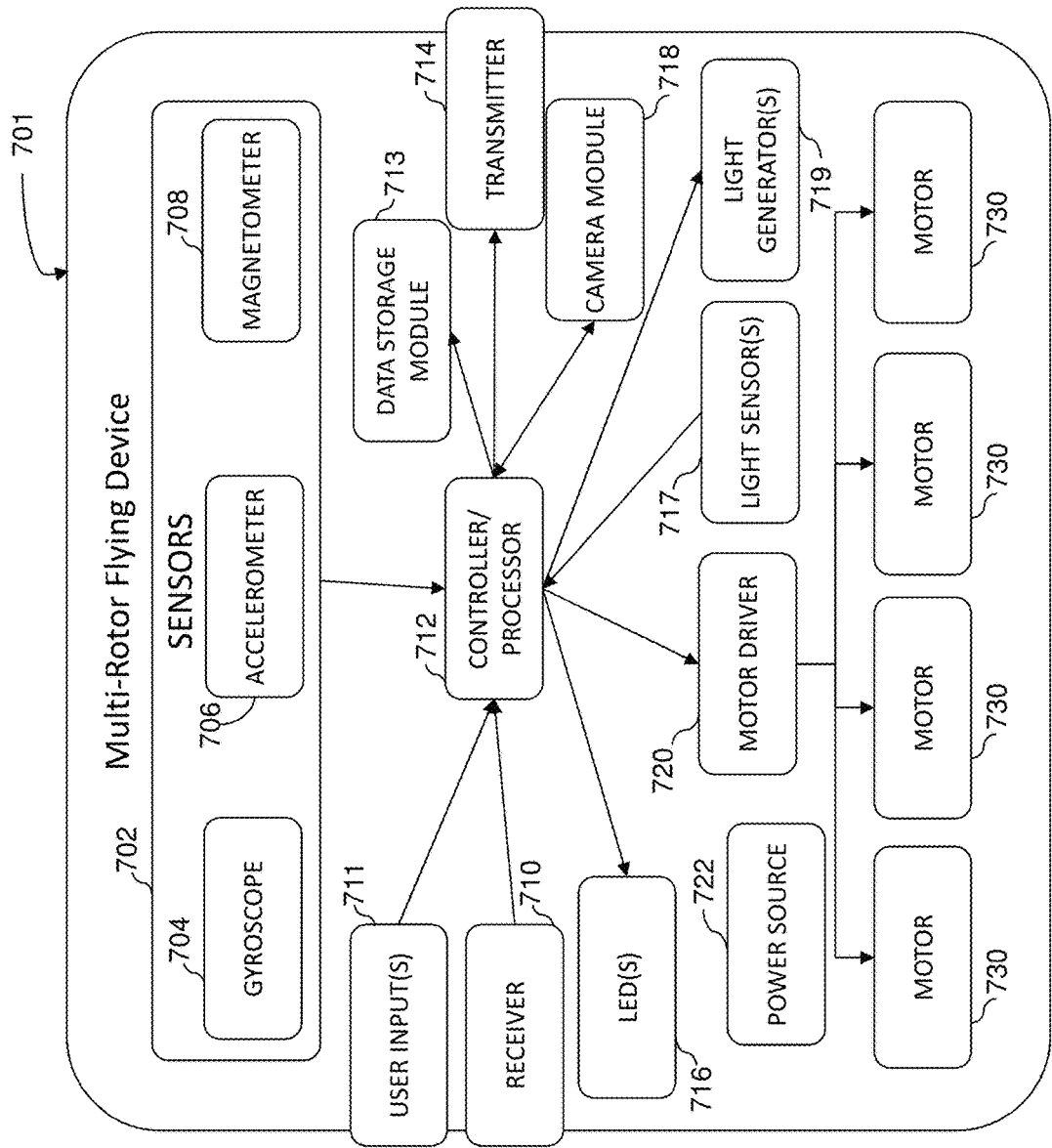
FIG. 21 illustrates an embodiment of a block diagram of a flying device.

FIG. 21 illustrates an embodiment of a block diagram of a multi-rotor flying device, in this embodiment a quadcopter, which may be used with the techniques disclosed herein. Although this figure presents one embodiment of a flying device that can be used with the techniques disclosed herein, other embodiments of flying devices known in the art (for example, drones, helicopters, airplanes, and the like), and/or their associated remote control units, may be adapted to be used with the techniques disclosed herein. The multi-rotor flying device 701 (which may also be flying devices 100, 200, and/or 300 as described herein and shown in at least FIGS. 1, 2, and 3, respectively, for example) comprises the following components: sensors 702; receiver 710; controller or processor 712; data storage module 713; transmitter 714; LED(s) 716; camera module 718; light sensor(s) 717; light generator(s) 719; motor driver(s) 720; power source 722; and motor(s) 730. In other embodiments, a flying device may comprise fewer, greater, and/or different components. Also, in some embodiments, the flying device may allow for calibration of one or more of its sensors by setting the device on a flat surface and pressing a button on the controller or on the flying device itself, for example. For example, in some embodiments, the flying device may be configured to receive data from a remote control unit that indicates the user wishes to recalibrate the gyroscope and/or other sensor of the flying device. This may be, for example, responsive to a user pressing a button on the remote control unit or the like. One way such calibration may be implemented is, for example, the user may place the flying device on a flat or substantially flat surface that is oriented parallel or substantially parallel to a horizontal ground plane. Responsive to the user requesting that the flying device calibrate the gyroscope and/or other sensors, the flying device may be configured to recalibrate the gyroscope and/or other sensors based on an assumption that the current resting position of the flying device is parallel to the ground plane. Such functionality may be desirable in some embodiments, because a gyroscope and/or other sensors may tend to go out of calibration over time and/or due to impacts on the flying device, and/or the like.

The sensors 702 in the quadcopter 701 may comprise at least one or more of a gyroscope 704, accelerometer 706, magnetometer 708, and/or other sensors, such as GPS, thermometer, barometer, altimeter, camera (infrared, visual, and/or otherwise), and/or the like. The gyroscope sensor 704 allows for the calculation and measurement of orientation and rotation of the quadcopter 701. The accelerometer 706 allows for the calculation and measurement in acceleration of the quadcopter 701. The magnetometer 708 allows for the calculation and measurement of magnetic fields and enables the quadcopter 701 to orient itself in relation to various North, South, East, West directions. The quadcopter may use one or more of the described sensors to be functional and maintain flight. The acceleration and angular velocity, and other data, measured can be used by the quadcopter 701 to assist an operator in flight or record data that may be used for future flights and analysis, or the like. Other sensors may be implemented into the quadcopter 701 to measure and/or record additional statistics such as flight speed, battery level, servo motor position, or other data available through its sensors, internal components, and/or combination(s) of sensors and/or internal components.

The receiver 710 is configured to receive a signal from a remote control device. The signal may be sent via wireless radio, infrared wireless, wired, and/or the like. The received signal is then sent to the controller or processor 712 for processing and executing actions based on the received signal. Once the signal is processed, the controller 712 then send commands to the appropriate other components of the quadcopter 701. For example, the controller 712 may perform, among other things, conversion of high level flight control commands from the remote control device into low level motor control commands implement the desired flight control operations.

The system may also allow for users input(s) 711 to control various aspects or components of the system. For example, there may be one or more buttons, switches, microphones (for example, for auditory commands to be received by the user), or the like.

The data storage module 713 stores information and data. The data storage module 713 may comprise read-only memory for the processor 712 to execute previously programmed functions (for example, to turn the LED light on when the quadcopter is powered on). The data storage module 713 may also or alternatively comprise writeable memory to store various programmed functions, data received from the various sensors 702, and/or the like. The data storage module 713 need not contain both types of memory, and may in fact be two or more separate elements optionally implemented. For example, the read-only memory may be incorporated and no other writable memory may be provided. Alternatively, there may be no type of memory installed and any instructions may come directly from a controller. Alternatively, there may be read-only memory installed in the quadcopter 702 and the user may install a physical memory card or chip to store additional information, if the user wishes. The data or information that would get stored in the data storage module 713 could, for example, originate from the component that created the information and go through processing prior to being written to the writable memory.

The transmitter 714 may receive data from the processor to be configured into a signal to send externally to another device, such as a remote control, computer, or remote server for storage and/or analysis. Similar to the received signal through the receive 710 as explained above, the signal sent may be via wireless radio, infrared wireless, wired, and/or the like. Although in this embodiment there are separate components for sending and receiving information (for example, a receiver 710 and a transmitter 714), some embodiments may comprise more than one receiver and/or transmitter, and/or may comprise one or more transceivers, which both receives and transmits signals.

The LED(s) 716 may be installed on the quadcopter in various locations to either indicate to the user some information that may be relevant, either through color, blinking, or brightness (for example, which end of the quadcopter is the front versus the back), or solely for aesthetic reasons alone.

The camera module 718 is a device that can be used to generate picture or video data from the quadcopter 701 during flight. The picture or video data may then be transmitted via the transceiver 714 to an external device or server or even the remote control, or the data may be stored in the data storage module 713, or both. In either situation, the camera must send the generated data to the processor 712 first, before the data is sent to the data storage module 713 or transceiver 714.

The light sensor(s) 717 and light generator(s) 719 are similar to the light sensor 1812 and light generator 1810 in FIG. 18, respectively. Any particular drone may comprise at least one light generator 717 and light sensor 719.

The motor driver 720 is configured to receive instructions from the processor 712 which it then uses to control the throttle and speed of the various motors 730 connected to the quadcopter 702. There may be more than one motor driver controlling the motors, however, in the present embodiment, only one is illustrated. The motor(s) 730 are connected to the motor driver 720 and receive instructions to operate at various speeds.

The power source 722 is also included in the quadcopter 701 to power each individual component. Although no line is drawn on FIG. 7 from the power source 722, each component (for example, processor, camera module, and more) desirably connects either directly or indirectly to the power source 722. This can also be done by connecting some or all devices to a circuit, or motherboard, which may contain the processor 712, and which is then connected to the power source 722. The power source 722 may be a battery (for example, Lithium Ion or Lithium Polymer battery that may be recharged, regular batteries such as AAA or AA, and/or the like), or there may be alternative power provided through other means, such as a wired connection or solar, among others.

In some embodiments, the separate components of FIG. 21 may be combined into fewer components to achieve the same purpose. For example, as stated above, the transmitter 714 and receiver 710 may be combined into one component, such as a transceiver.

Flying Device Signal Receiving, Processing, and Executing

Figure 22:
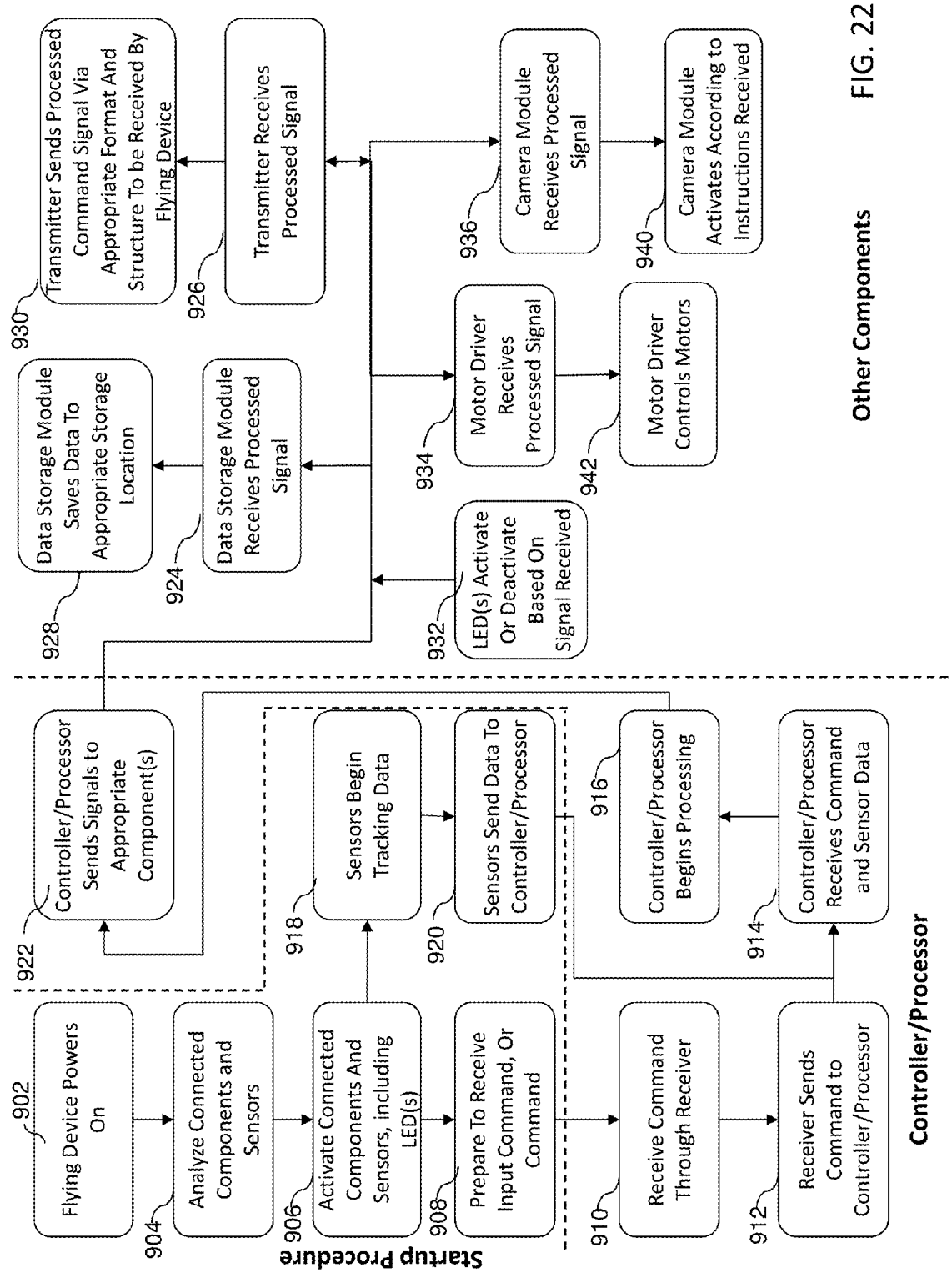
FIG. 22 illustrates a flow chart diagram of one embodiment of the steps that a flying device would take to process and execute a signal.

FIG. 22 illustrates a flow chart diagram of one embodiment of a process that a flying device may take upon receipt to process and execute a signal. Many of the methods and systems described herein may produce the same results with either software programming, mechanical means, or through circuitry. It is not a requirement to use one means over another to achieve the same result. However, where one method is impractical, or not possible to implement without great expense, to one skilled in the art, then the more practical approach would be the preferred approach. Also, although not shown in the figure, in some embodiments, the flying device may allow for calibration of one or more of its sensors by setting the device on a flat surface and pressing a button on the controller or on the flying device itself, for example, as described above.

Blocks 902 through 908 pertain to a general startup procedure of the flying device. At block 902 the flying device powers on. This may be achieved by the user pressing a button, speaking a command (if a microphone is implemented in the device), flipping a switch, touching a sensor, based on pre-set conditions (for example, time or temperature), receipt of an "on" signal command from another device, or the like.

At block 904, the flying device analyzes the connected components (either internal or external). The controller acknowledges which components are connected. Also, in some embodiments, the analysis of connected components may not be necessary; however, any equivalent analysis method may be inherent within the device (for example, the circuitry may be indicative of any connected components). Connected components may include sensors, cameras, microphones, speakers, receivers (for example, IR, radio, or the like), data storage modules (for example, internal memory or user input memory, such as an SD card), transmitter, motor driver, motors, LED(s), among others.

At block 906, the flying device activates connected components. In some embodiments the flying device may only activate the components that assist in flying to conserve power. For example, any external LED(s) may remain turned off until the user chooses. Another example would be to keep the camera turned off until the user chooses to activate it.

At block 918, the activated sensors begin tracking data in preparation for flight.

At block 920, the activated sensors begin to send data from tracking to the controller/processor.

At block 908, the flying device does any last required steps in order to prepare to receive an input command from a remote control. Steps may include anything necessary to function or the steps may be completely for user preference (for example, special lighting scheme or auditory confirmation that the device is ready).

At block 910, the flying device receives a command through its receiver. The command received may be received through a physical touch by a user, or through any other means (for example, voice, or motion of the controller).

At block 912, the receiver of the flying device sends the received command to the controller or processor. In some embodiments, the flying device will convert the received command into an appropriate signal. For example, in several embodiments, the command may need to be converted into an electrical signal.

At block 914, the controller in the flying device receives the command and various sensor data.

At block 916, the controller in the flying device processes the command and various sensor data. Processing may include analysis of the sensor data and command to send signals to the various components to either: activate, manipulate, or deactivate them. In some embodiments, data received by the controller may also then be written to memory in a data storage module (for example, an internal memory or user input memory, such as an SD card). Additionally, in some embodiments, the controller may also send data to a transmitter to be sent to an external device. Such data may be helpful for tracking, flight, or diagnostics (whether real-time or not).

At block 922, after processing completes, and if required, signals are sent to various components to either: activate, manipulate, or deactivate them. Not all components are necessarily communicated to at the same time. Such components may include, but are limited by: a data storage module, a transmitter, LED(s), a camera module, and a motor driver.

At block 924, the data storage module receives a processed signal from the controller. At block 926, the data storage module accordingly stores any information directed by the controller to the appropriate storage medium.

At block 928, the transmitter receives a processed signal from the controller. At block 930, the transmitter sends the processed signal after any further preparation that may be required. For example, in some embodiments, any sent signal may need to be formatted or converted to a different type of signal (for example, electrical to some type of wireless signal).

At block 932, any connected LED(s) may receive a processed signal from the controller will either activate or deactivate depending on the signal received and the current state of the LED (for example, whether the LED is currently activated or deactivated). For example, in some embodiments, the LED(s) may illuminate to show the user relevant information for flight (for example, the flying device is powered on, or which direction is the front or back of the flying device) or information unrelated to flight (for example, a light show for entertainment purposes).

At block 936, the camera module received a processed signal from the controller. At block 940, the camera module will activate according to the instructions received. This activation may involve some sort of picture or video recording. For example, the camera may snap 1 picture, a burst of pictures, record in slow-motion, or record regular video. The camera may also record or take pictures in varying resolution, or with other varying settings. In some embodiments, there may also be a preset default mode on how to take pictures or record video. The camera module, in some embodiments, may also send data back to the controller to either be saved in the data storage module and/or be transmitted externally via a transceiver.

At block 934, the motor driver receives a processed signal from the controller. In some embodiments, there may be only one motor driver, and in other embodiments there may be more than one. At block 942, the motor driver will activate and send a signal to specific motor(s) in the system. For example, a quadcopter would have four motors to be controlled and at least one will be sent a signal. The signal will force the connected motor(s) to either: turn on, change speed, or turn off. Several motors may receive the same or different signals at the same time. For example, in some embodiments, a change in throttle instruction for a quadcopter would provide the same signal to all motors so that the flying device will increase in elevation. Also, in other embodiments, a change in pitch instruction for a quadcopter would provide a different signal to the two front motors than to the two back motors.

Other Remarks

One of ordinary skill the art will appreciate that flying devices can have various configurations with different shapes and sizes. The figures show example recreational flying devices, but example embodiments can be utilized with both commercial and recreational flying devices of different sizes and shapes.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the disclosures or claims.

In some embodiments, at least some of the techniques disclosed herein related to wireless control of a flying device and/or dynamic configurability of a controller are technically impossible to perform by a human being and/or require the use of a computing device. For example, to enable a reasonable level of controllability of the flying device, it can be desirable to reduce lag time or latency between movement of user inputs on the controller and corresponding flight control adjustments made by the flying device. It can be desirable for these adjustments to occur in real time or substantially in real time, such as, for example, with a lag time or latency of no greater than 1, 5, 10, 20, 50, or 100 milliseconds. Further, if a user wishes to switch the present control mode of the controller while the flying device is in flight, it can be desirable to minimize the amount of time it takes to switch modes, so that, for example, the flying device does not crash or otherwise operate undesirably while the mode switch is being made. This dynamic switch of modes can desirably occur in real time or substantially in real time, such as, for example, with a lag time or latency of no greater than 1, 5, 10, 20, 50, or 100 milliseconds.

The term, "Real-time," can mean any time that is seemingly, or near, instantaneous such that a practiced user of a remote control unit, that is using such remote control unit to operate a flying device, would be able to still fly the device. There is inherently a very small delay in the creation and transmission of a signal by a remote control unit added to another very small inherent delay in the receipt, processing, and execution of that received signal in a flying device. The very small delay is typically a fraction of a second, but may even exceed a second in some circumstances. The delay may also depend on the physical properties of light or other physical phenomenon. The term, "Real-time," encompasses all instances of delay to a point where a practiced user of a remote control unit can still maintain flight of a flying device.

Any ranges disclosed herein also encompass any and all overlap, sub-ranges, and combinations thereof. Language such as "up to," "at least," "greater than," "less than," "between," and the like includes the number recited. Numbers preceded by a term such as "approximately," "about," and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although the features that have been disclosed in the context of certain preferred embodiments and examples, it will be understood by those skilled in the art that the present disclosure extends beyond the specifically disclosed embodiments to other alternative embodiments and/or uses of the disclosure and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present disclosure herein disclosed should not be limited by the particular disclosed embodiments described above.

What is claimed is:

1. An unmanned flying device comprising:
a main body;
a plurality of propulsion units extending in a downward direction from the main body when lateral and longitudinal axes of the main body are oriented horizontally with respect to a ground surface, wherein each of the plurality of propulsion units comprises:
a column having proximal and distal ends, the column attached to a bottom portion of the main body at the proximal end, a vertical axis of the column being perpendicular to the lateral and longitudinal axes of the main body;
a motor positioned within the column and oriented such that an output shaft of the motor extends downward toward the distal end of the column;
a propeller positioned below the distal end of the column, the propeller comprising a hub and radially extending blades, the hub coupled to the output shaft of the motor,
wherein the propeller is positioned below a center of gravity of the unmanned flying device, and the propeller is configured to project thrust downward away from the main body to provide lift for the unmanned flying device,
wherein the hub of the propeller comprises a landing pad for engaging the ground surface when the unmanned flying device is not in flight, the landing pad extending downward beyond a lowermost portion of the radially extending blades, to keep the radially extending blades from contacting the ground surface when the unmanned flying device is not in flight,
the landing pad configured to have a length sufficient to raise the propeller above the ground when the device is in contact with a substantially flat surface, the landing pad further configured to have a length sufficient to provide the propeller sufficient space to provide lift for the device;
a wireless receiver configured to receive data instructions from a wireless remote control unit;
a controller configured to receive said data instructions from said wireless receiver for processing and to control the motors of the plurality of propulsion units to cause the unmanned flying device to fly; and
a power source configured to be inserted into said main body and to provide power to at least the wireless receiver, the controller, and the motors of the plurality of propulsion units,
wherein the main body comprises a shape that extends laterally beyond the columns of the plurality of propulsion units.

2. The unmanned flying device of claim 1, wherein the columns of the plurality of propulsion units are spaced laterally apart sufficiently for none of the propellers to have overlapping operating envelopes.

3. The unmanned flying device of claim 1, further comprising:
one or more light generators configured to project infrared or laser light from the unmanned flying device to simulate firing of a weapon; and
one or more light sensors configured to detect infrared or laser light generated by a second flying device to simulate being hit by a weapon.

4. An unmanned flying device comprising:
a main body;
a plurality of propulsion units extending in a downward direction from the main body when lateral and longitudinal axes of the main body are oriented horizontally with respect to a ground surface, wherein each of the plurality of propulsion units comprises:
a column having proximal and distal ends, the column attached to a bottom portion of the main body at the proximal end, a vertical axis of the column being perpendicular to the lateral and longitudinal axes of the main body;
a motor positioned within the column and oriented such that an output shaft of the motor extends downward toward the distal end of the column;

a propeller positioned below the distal end of the column, the propeller comprising a hub and radially extending blades, the hub coupled to the output shaft of the motor, wherein the propeller is positioned below a center of gravity of the unmanned flying device, and the propeller is configured to project thrust downward away from the main body to provide lift for the unmanned flying device, wherein the hub of the propeller comprises a landing pad for engaging the ground surface when the unmanned flying device is not in flight, the landing pad extending downward beyond a lowermost portion of the radially extending blades, to keep the radially extending blades from contacting the ground surface when the unmanned flying device is not in flight, the landing pad configured to have a length sufficient to raise the propeller above the ground when the device is in contact with a substantially flat surface, the landing pad further configured to have a length sufficient to provide the propeller sufficient space to provide lift for the device;

a wireless receiver configured to receive data instructions from a wireless remote control unit;

a controller configured to receive said data instructions from said wireless receiver for processing and to control the motors of the plurality of propulsion units to cause the unmanned flying device to fly; and a power source configured to be inserted into said main body and to provide power to at least the wireless receiver, the controller, and the motors of the plurality of propulsion units, wherein the columns of the plurality of propulsion units are positioned completely beneath the main body.

5. The unmanned flying device of claim 4, further comprising:

one or more light generators configured to project infrared or laser light from the unmanned flying device to simulate firing of a weapon; and one or more light sensors configured to detect infrared or laser light generated by a second flying device to simulate being hit by a weapon.

6. An unmanned flying device comprising:

a main body;

a plurality of propulsion units extending in a downward direction from the main body when lateral and longitudinal axes of the main body are oriented horizontally with respect to a ground surface, wherein each of the plurality of propulsion units comprises:

a column having proximal and distal ends, the column attached to a bottom portion of the main body at the proximal end, a vertical axis of the column being perpendicular to the lateral and longitudinal axes of the main body;

a motor positioned within the column and oriented such that an output shaft of the motor extends downward toward the distal end of the column;

a propeller positioned below the distal end of the column, the propeller comprising a hub and radially extending blades, the hub coupled to the output shaft of the motor, wherein the propeller is positioned below a center of gravity of the unmanned flying device, and the propeller is configured to project thrust downward away from the main body to provide lift for the unmanned flying device, wherein the hub of the propeller comprises a landing pad for engaging the ground surface when the unmanned flying device is not in flight, the landing pad extending downward beyond a lowermost portion of the radially extending blades, to keep the radially extending blades from contacting the ground surface when the unmanned flying device is not in flight, the landing pad configured to have a length sufficient to raise the propeller above the ground when the device is in contact with a substantially flat surface, the landing pad further configured to have a length sufficient to provide the propeller sufficient space to provide lift for the device;

a wireless receiver configured to receive data instructions from a wireless remote control unit;

a controller configured to receive said data instructions from said wireless receiver for processing and to control the motors of the plurality of propulsion units to cause the unmanned flying device to fly; and a power source configured to be inserted into said main body and to provide power to at least the wireless receiver, the controller, and the motors of the plurality of propulsion units, wherein each of the propellers of the plurality of propulsion units comprises an operating envelope sized and positioned such that a portion of the main body is positioned directly above greater than 40% of the operating envelope, and wherein the main body comprises one or more openings for air to pass therethrough, at least a portion of the one or more openings being positioned directly above the operating envelope of the propeller, wherein the portion of the one or more openings that is positioned directly above the operating diameter of the propeller is not included in a calculation of portion of the main body being positioned directly above greater than 40% of the operating envelope.

7. The unmanned flying device of claim 6, further comprising:

one or more light generators configured to project infrared or laser light from the unmanned flying device to simulate firing of a weapon; and one or more light sensors configured to detect infrared or laser light generated by a second flying device to simulate being hit by a weapon.

8. An unmanned flying device comprising:

a main body;

a plurality of propulsion units extending in a downward direction from the main body when lateral and longitudinal axes of the main body are oriented horizontally with respect to a ground surface, wherein each of the plurality of propulsion units comprises:

a column having proximal and distal ends, the column attached to a bottom portion of the main body at the proximal end, a vertical axis of the column being perpendicular to the lateral and longitudinal axes of the main body;

a motor positioned within the column and oriented such that an output shaft of the motor extends downward toward the distal end of the column;

a propeller positioned below the distal end of the column, the propeller comprising a hub and radially extending blades, the hub coupled to the output shaft of the motor, wherein the propeller is positioned below a center of gravity of the unmanned flying device, and the propeller is configured to project thrust downward away from the main body to provide lift for the unmanned flying device, wherein the hub of the propeller comprises a landing pad for engaging the ground surface when the unmanned flying device is not in flight, the landing pad extending downward beyond a lowermost portion of the radially extending blades, to keep the radially extending blades from contacting the ground surface when the unmanned flying device is not in flight, the landing pad configured to have a length sufficient to raise the propeller above the ground when the device is in contact with a substantially flat surface, the landing pad further configured to have a length sufficient to provide the propeller sufficient space to provide lift for the device;

a wireless receiver configured to receive data instructions from a wireless remote control unit;

a controller configured to receive said data instructions from said wireless receiver for processing and to control the motors of the plurality of propulsion units to cause the unmanned flying device to fly; and a power source configured to be inserted into said main body and to provide power to at least the wireless receiver, the controller, and the motors of the plurality of propulsion units, wherein each of the propellers of the plurality of propulsion units comprises an operating envelope sized and positioned such that a portion of the main body is positioned directly above greater than 70% of the operating envelope.

9. The unmanned flying device of claim 8, further comprising:

one or more light generators configured to project infrared or laser light from the unmanned flying device to simulate firing of a weapon; and one or more light sensors configured to detect infrared or laser light generated by a second flying device to simulate being hit by a weapon.

10. An unmanned flying device comprising:

a main body;

a plurality of propulsion units extending in a downward direction from the main body when lateral and longitudinal axes of the main body are oriented horizontally with respect to a ground surface, wherein each of the plurality of propulsion units comprises:

a column having proximal and distal ends, the column attached to a bottom portion of the main body at the proximal end, a vertical axis of the column being perpendicular to the lateral and longitudinal axes of the main body;

a motor positioned within the column and oriented such that an output shaft of the motor extends downward toward the distal end of the column;

a propeller positioned below the distal end of the column, the propeller comprising a hub and radially extending blades, the hub coupled to the output shaft of the motor, wherein the propeller is positioned below a center of gravity of the unmanned flying device, and the propeller is configured to project thrust downward away from the main body to provide lift for the unmanned flying device, wherein the hub of the propeller comprises a landing pad for engaging the ground surface when the unmanned flying device is not in flight, the landing pad extending downward beyond a lowermost portion of the radially extending blades, to keep the radially extending blades from contacting the ground surface when the unmanned flying device is not in flight, the landing pad configured to have a length sufficient to raise the propeller above the ground when the device is in contact with a substantially flat surface, the landing pad further configured to have a length sufficient to provide the propeller sufficient space to provide lift for the device;

a wireless receiver configured to receive data instructions from a wireless remote control unit;

a controller configured to receive said data instructions from said wireless receiver for processing and to control the motors of the plurality of propulsion units to cause the unmanned flying device to fly; and a power source configured to be inserted into said main body and to provide power to at least the wireless receiver, the controller, and the motors of the plurality of propulsion units, wherein each of the propellers of the plurality of propulsion units comprises an operating envelope sized and positioned such that a portion of the main body is positioned directly above greater than 40% of the operating envelope, and wherein a vertical distance between an uppermost surface of the blades of the propeller and a lowermost surface of the portion of the main body positioned directly above the operating envelope is less than the a diameter of the operating envelope.

11. The unmanned flying device of claim 10, wherein the vertical distance between the uppermost surface of the blades of the propeller and the lowermost surface of the portion of the main body positioned directly above the operating envelope is greater than 30% of the diameter of the operating envelope.

12. The unmanned flying device of claim 10, further comprising:

one or more light generators configured to project infrared or laser light from the unmanned flying device to simulate firing of a weapon; and one or more light sensors configured to detect infrared or laser light generated by a second flying device to simulate being hit by a weapon.

13. An unmanned flying device comprising:

a main body;

a plurality of propulsion units extending in a downward direction from the main body when lateral and longitudinal axes of the main body are oriented horizontally with respect to a ground surface, wherein each of the plurality of propulsion units comprises:

a column having proximal and distal ends, the column attached to a bottom portion of the main body at the proximal end, a vertical axis of the column being perpendicular to the lateral and longitudinal axes of the main body;

a motor positioned within the column and oriented such that an output shaft of the motor extends downward toward the distal end of the column;

a propeller positioned below the distal end of the column, the propeller comprising a hub and radially extending blades, the hub coupled to the output shaft of the motor, wherein the propeller is positioned below a center of gravity of the unmanned flying device, and the propeller is configured to project thrust downward away from the main body to provide lift for the unmanned flying device, wherein the hub of the propeller comprises a landing pad for engaging the ground surface when the unmanned flying device is not in flight, the landing pad extending downward beyond a lowermost portion of the radially extending blades, to keep the radially extending blades from contacting the ground surface when the unmanned flying device is not in flight, the landing pad configured to have a length sufficient to raise the propeller above the ground when the device is in contact with a substantially flat surface, the landing pad further configured to have a length sufficient to provide the propeller sufficient space to provide lift for the device;

a wireless receiver configured to receive data instructions from a wireless remote control unit;

a controller configured to receive said data instructions from said wireless receiver for processing and to control the motors of the plurality of propulsion units to cause the unmanned flying device to fly; and a power source configured to be inserted into said main body and to provide power to at least the wireless receiver, the controller, and the motors of the plurality of propulsion units, wherein each of the propellers of the plurality of propulsion units comprises an operating envelope sized and positioned such that a portion of the main body is positioned directly above greater than 40% of the operating envelope, and wherein a vertical distance between an uppermost surface of the blades of the propeller and a lowermost surface of the portion of the main body positioned directly above the operating envelope is within a range of 25% to 50% of a diameter of the operating envelope.

14. The unmanned flying device of claim 13, further comprising:

one or more light generators configured to project infrared or laser light from the unmanned flying device to simulate firing of a weapon; and one or more light sensors configured to detect infrared or laser light generated by a second flying device to simulate being hit by a weapon.

15. An unmanned flying device comprising:
a main body;
a plurality of propulsion units extending in a downward direction from the main body when lateral and longitudinal axes of the main body are oriented horizontally with respect to a ground surface, wherein each of the plurality of propulsion units comprises:
a column having proximal and distal ends, the column attached to a bottom portion of the main body at the proximal end, a vertical axis of the column being perpendicular to the lateral and longitudinal axes of the main body;
a motor positioned within the column and oriented such that an output shaft of the motor extends downward toward the distal end of the column;
a propeller positioned below the distal end of the column, the propeller comprising a hub and radially extending blades, the hub coupled to the output shaft of the motor,
wherein the propeller is positioned below a center of gravity of the unmanned flying device, and the propeller is configured to project thrust downward away from the main body to provide lift for the unmanned flying device, wherein the hub of the propeller comprises a landing pad for engaging the ground surface when the unmanned flying device is not in flight, the landing pad extending downward beyond a lowermost portion of the radially extending blades, to keep the radially extending blades from contacting the ground surface when the unmanned flying device is not in flight, the landing pad configured to have a length sufficient to raise the propeller above the ground when the device is in contact with a substantially flat surface, the landing pad further configured to have a length sufficient to provide the propeller sufficient space to provide lift for the device;

a wireless receiver configured to receive data instructions from a wireless remote control unit;

a controller configured to receive said data instructions from said wireless receiver for processing and to control the motors of the plurality of propulsion units to cause the unmanned flying device to fly; and a power source configured to be inserted into said main body and to provide power to at least the wireless receiver, the controller, and the motors of the plurality of propulsion units, wherein the unmanned flying device does not comprise any propulsion units coupled to the main body by an arm extending laterally from the main body.

16. The unmanned flying device of claim 15, further comprising:

one or more light generators configured to project infrared or laser light from the unmanned flying device to simulate firing of a weapon; and one or more light sensors configured to detect infrared or laser light generated by a second flying device to simulate being hit by a weapon.

17. An unmanned flying device comprising:
a main body;
a plurality of propulsion units extending in a downward direction from the main body when lateral and longitudinal axes of the main body are oriented horizontally with respect to a ground surface, wherein each of the plurality of propulsion units comprises:
a column having proximal and distal ends, the column attached to a bottom portion of the main body at the proximal end, a vertical axis of the column being perpendicular to the lateral and longitudinal axes of the main body;
a motor positioned within the column and oriented such that an output shaft of the motor extends downward toward the distal end of the column;
a propeller positioned below the distal end of the column, the propeller comprising a hub and radially extending blades, the hub coupled to the output shaft of the motor,
wherein the propeller is positioned below a center of gravity of the unmanned flying device, and the propeller is configured to project thrust downward away from the main body to provide lift for the unmanned flying device, wherein the hub of the propeller comprises a landing pad for engaging the ground surface when the unmanned flying device is not in flight, the landing pad extending downward beyond a lowermost portion of the radially extending blades, to keep the radially extending blades from contacting the ground surface when the unmanned flying device is not in flight, the landing pad configured to have a length sufficient to raise the propeller above the ground when the device is in contact with a substantially flat surface, the landing pad further configured to have a length sufficient to provide the propeller sufficient space to provide lift for the device;

a wireless receiver configured to receive data instructions from a wireless remote control unit;

a controller configured to receive said data instructions from said wireless receiver for processing and to control the motors of the plurality of propulsion units to cause the unmanned flying device to fly; and a power source configured to be inserted into said main body and to provide power to at least the wireless receiver, the controller, and the motors of the plurality of propulsion units, wherein the motor of each of the plurality of propulsion units is slidably coupled to the column such that the motor can translate in a direction parallel to the vertical axis of the column, and each of the plurality of propulsion units further comprises:

a spring positioned within the column and configured to bias the motor toward the distal end of the column, wherein the spring is configured to absorb at least a portion of a landing impact load introduced through the landing pad of the hub of the propeller, and wherein the output shaft of the motor comprises a length sufficient to enable the propeller to translate with respect to the column, as a result of the landing impact load, without the propeller contacting the column.

18. The unmanned flying device of claim 17, wherein the column and output shaft of the motor are sized such that, when the motor is positioned at a distal-most position with respect to the column, the blades of the propeller are positioned at least 10 millimeters away from, but no more than 36 millimeters away from, any portion of the main body located directly above an operating diameter of the propeller.

19. The unmanned flying device of claim 17, further comprising:

one or more light generators configured to project infrared or laser light from the unmanned flying device to simulate firing of a weapon; and one or more light sensors configured to detect infrared or laser light generated by a second flying device to simulate being hit by a weapon.

* * * * *